US012272999B2

(12) United States Patent
Naito

(10) Patent No.: US 12,272,999 B2
(45) Date of Patent: Apr. 8, 2025

(54) ELECTRIC MACHINE

(71) Applicant: Yamaha Hatsudoki Kabushiki Kaisha, Shizuoka (JP)

(72) Inventor: Shinya Naito, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 166 days.

(21) Appl. No.: 18/259,080

(22) PCT Filed: Dec. 29, 2020

(86) PCT No.: PCT/JP2020/049286
§ 371 (c)(1),
(2) Date: Jun. 23, 2023

(87) PCT Pub. No.: WO2022/145035
PCT Pub. Date: Jul. 7, 2022

(65) Prior Publication Data
US 2024/0055963 A1 Feb. 15, 2024

(51) Int. Cl.
*H02K 21/04* (2006.01)
(52) U.S. Cl.
CPC .................. *H02K 21/042* (2013.01)
(58) Field of Classification Search
CPC .... H02K 21/042; H02K 19/103; H02K 37/06; H02K 41/03; H02K 2213/03; H02K 21/44
See application file for complete search history.

(56) References Cited

U.S. PATENT DOCUMENTS 4,700,096 A 10/1987 Epars
5,682,073 A 10/1997 Mizuno
(Continued)

FOREIGN PATENT DOCUMENTS

CN 2207656 Y 9/1995
CN 201336619 Y 10/2009
(Continued)

OTHER PUBLICATIONS

JP-2014007957-A_translate (Year: 2014).*
(Continued)

*Primary Examiner* — Tulsidas C Patel
*Assistant Examiner* — Mohammed Ahmed Qureshi
(74) *Attorney, Agent, or Firm* — HEA Law PLLC

(57) ABSTRACT

An armature portion includes a first and second armature core, and a core coupling portion that magnetically couples the first armature core to the second armature core. The first and second armature core includes magnetic pole groups that are magnetically coupled, respectively. A first and second magnetic flux are formed in the armature portion by magnets. A first magnetic circuit in which the first magnetic flux flows includes three magnetic pole groups, magnetic field cores, and the magnets. A second magnetic circuit in which the second magnetic flux flows includes two magnetic pole groups, a core coupling structure, the magnetic field cores, and the magnets. This structure reduces magnetic saturation of the magnetic circuit formed on the armature portion and eliminate the need to magnetically divide the armature cores in the machine moving direction, thereby increasing the intensity of the armature.

24 Claims, 43 Drawing Sheets

(56) References Cited

U.S. PATENT DOCUMENTS

| | | | |
|---|---|---|---|
| 6,888,272 B2 | 5/2005 | Kastinger | |
| 7,626,308 B2 | 12/2009 | Kang et al. | |
| 7,902,712 B2 | 3/2011 | Nakamasu et al. | |
| 8,624,458 B2 | 1/2014 | Jack et al. | |
| 2009/0212652 A1* | 8/2009 | Nakamasu | H02K 1/276 310/198 |
| 2017/0141626 A1 | 5/2017 | Marosz | |
| 2020/0303973 A1 | 9/2020 | Kang et al. | |

FOREIGN PATENT DOCUMENTS

| | | | | |
|---|---|---|---|---|
| CN | 103633806 A | * | 3/2014 | |
| CN | 108023438 A | | 5/2018 | |
| EP | 2187508 A1 | | 5/2010 | |
| EP | 2317633 A2 | | 5/2011 | |
| JP | S61293142 A | | 12/1986 | |
| JP | H06351206 A | | 12/1994 | |
| JP | 2000041367 A | * | 2/2000 | |
| JP | 2003513599 A | | 4/2003 | |
| JP | 2007185087 A | | 7/2007 | |
| JP | 2007306745 A | * | 11/2007 | |
| JP | 4085059 B2 | | 4/2008 | |
| JP | 2009506738 A | | 2/2009 | |
| JP | 2014007957 A | * | 1/2014 | H02K 1/276 |
| JP | 2015039251 A | | 2/2015 | |
| TW | 498590 B | | 8/2002 | |
| WO | WO-0131766 A1 | * | 5/2001 | H02K 21/14 |
| WO | 2006092924 A1 | | 9/2006 | |
| WO | 2019066487 A1 | | 4/2019 | |

OTHER PUBLICATIONS

JP-2000041367-A_translate (Year: 2000).*
CN-103633806-A_translate (Year: 2014).*
JP-2007306745-A_translate (Year: 2007).*
International Search Report for PCT/JP2020/049286 dated on Mar. 16, 2021, and English translation thereof pp. 1-6.
International Search Report for PCT/JP2020/026303 dated on Sep. 8, 2020, and English translation thereof pp. 1-5.
Written Opinion of The International Searching Authority (PCT/ISA/237) with PCT/IB/338 and PCT/IB/373 for relating PCT Application No. PCT/JP2020/026303, dated Jan. 13, 2022, p. 1-6.
Office Action of Dec. 26, 2022, for corresponding TW Patent Application No. 110148881, pp. 1-5.
Office Action of Aug. 3, 2021, for relating TW Patent Application No. 109122817, p. 1-8.
Search Report of Feb. 24, 2023, for relating EP Patent Application No. 20835084.3, pp. 1-11.
Office Action of Aug. 14, 2024, for related CN Patent Application No. 202080048848.5 with English translation, pp. 1-11.
English translation of the Written Opinion of the International Searching Authority (PCT/ISA/237) mailed Jul. 4, 2023, for corresponding PCT Application No. PCT/JP2020/049286. pp. 1-5.

* cited by examiner

ARMATURE PORTION SIDE (INSIDE)

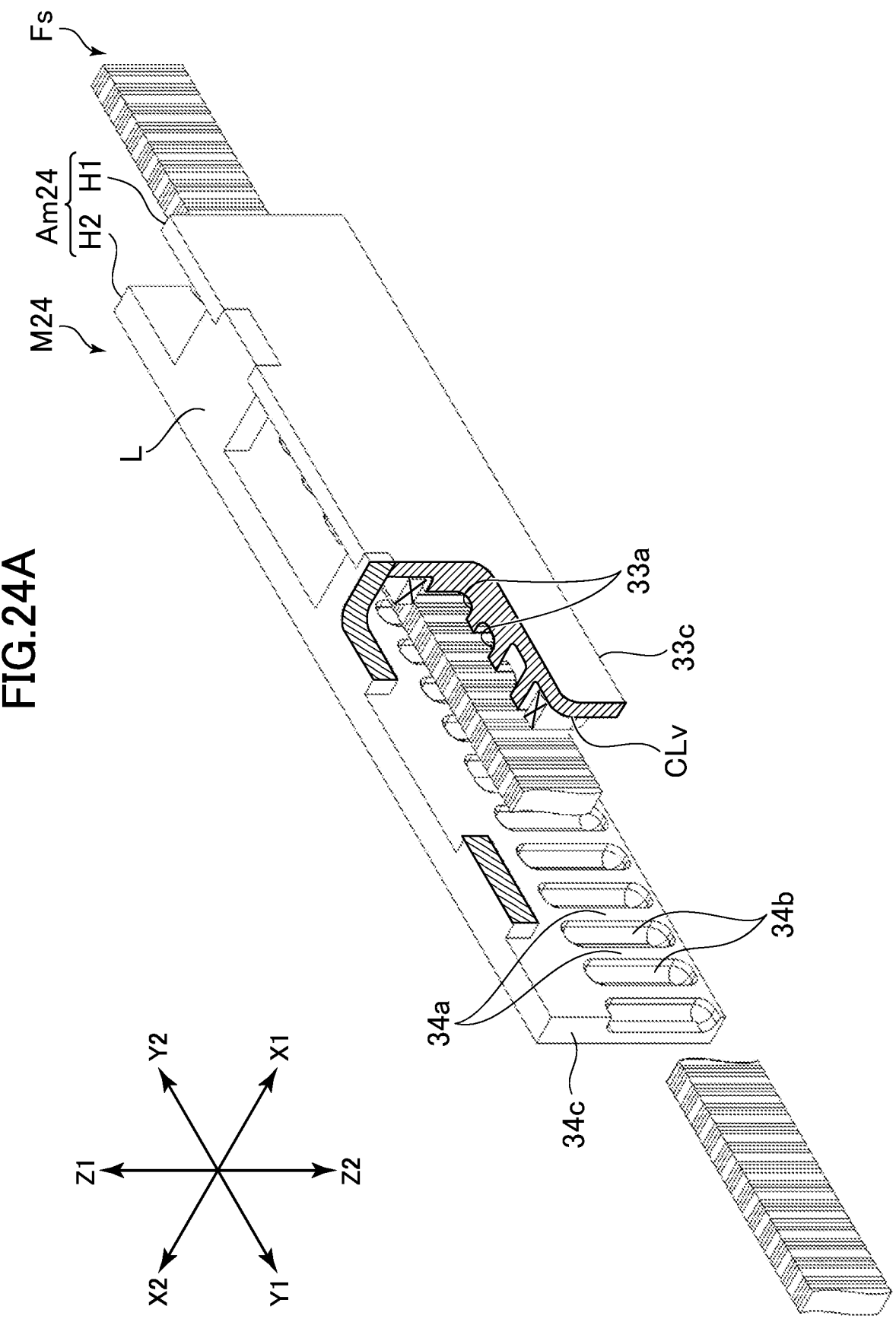

ELECTRIC MACHINE

CROSS REFERENCE TO RELATED APPLICATIONS

This application is a National Stage of International Application No. PCT/JP2020/049286 filed on Dec. 29, 2020. The contents of the above document are incorporated herein by reference in its entirety.

TECHNICAL FIELD

The present disclosure relates to an electric machine.

BACKGROUND ART

In Patent Literatures 1 to 3, a stator core has a plurality of core portions arranged in the rotation direction, and a plurality of coils are respectively provided in the core portions. Each core portion includes two plate-like portions facing each other in the axis direction, and a plurality of magnetic poles protruding radially from each of the two plate-like portions. The two plate-like portions facing each other in the axis direction are magnetically coupled, and the magnetic circuit is formed by the two plate-like portions and the magnet provided in the rotor.

For example, in Patent Literature 1, two stator plates 15 are opposed to each other in the axis direction and magnetically coupled by the bridging cores 10. The magnetic poles (claw poles 12, 13) projecting radially are formed on the respective stator plates 15. Also in Patent Literature 2, the pole teeth 23 and 27 opposed to the rotor are respectively formed on the magnetic pole plates 21 and 25 that are axially opposed to each other. The magnetic pole plates 21 and 25 are magnetically coupled by the magnetic pole core 22d extending in the axis direction. Also in Patent Literature 3, the upper layer portion 2a and the lower layer portion 2b of a stator laminated iron core 2 are opposed to each other in the axis direction, and projecting portions 2c and 2d (magnetic poles) are respectively formed in the upper layer portion 2a and the lower layer portion 2b. The upper layer portion 2a and the lower layer portion 2b are magnetically coupled by the stator powdered iron core 1 extending in the axis direction.

CITATION LIST

Patent Literature

Patent Literature 1: JP2003-513599A
Patent Literature 2: JP2007-306745A
Patent Literature 3: JP2007-185087A

SUMMARY OF INVENTION

Technical Problem

In the structures disclosed in Patent Literatures 1, 2, and 3, the two axially opposed plate portions are magnetically coupled at axially extending portions, thereby forming the closed magnetic circuit. In such a magnetic circuit, if the rotary electric machine is miniaturized, the magnetic path in which the magnetic flux flowing from one plate portion to the other plate portion is formed narrows, and the magnetic path is easily magnetically saturated. To avoid magnetic saturation, it is necessary to keep the current supplied to the coil low. This makes it difficult to obtain a large torque.

Solution to Problem

An example of an electric machine proposed in the present disclosure includes an armature portion and a magnetic field portion that is relatively movable with respect to the armature portion. The magnetic field portion includes a plurality of magnetic field cores arranged in a machine moving direction and a plurality of magnets, where the machine moving direction is a direction of a relative movement between the armature portion and the magnetic field portion, and each magnet is disposed between two adjacent magnetic field cores. The armature portion includes a first armature core and a second armature core that are located away from each other in a direction intersecting with the machine moving direction, a core coupling structure that magnetically couples the first armature core to the second armature core, and a plurality of coils. The first armature core includes a first magnetic pole group and a second magnetic pole group that are arranged in the machine moving direction and magnetically coupled together. The second armature core includes a third magnetic pole group and a fourth magnetic pole group that are arranged in the machine moving direction and magnetically coupled together. A position of the first magnetic pole group in the machine moving direction corresponds to a position of the third magnetic pole group in the machine moving direction. A position of the second magnetic pole group in the machine moving direction corresponds to a position of the fourth magnetic pole group in the machine moving direction. The plurality of coils include a first coil that is provided in one of the first magnetic pole group or the third magnetic pole group. A first magnetic flux that passes through the first coil and a second magnetic flux that passes through the first coil are formed by one or some of the magnets. A first magnetic circuit through which the first magnetic flux passes includes the first magnetic pole group, the second magnetic pole group, the third magnetic pole group, the fourth magnetic pole group, the magnetic field core, and the magnets. A second magnetic circuit through which the second magnetic flux passes includes the first magnetic pole group, the core coupling structure, the third magnetic pole group, the magnetic field core, and the magnets. This electric machine can prevent the magnetic circuit from being magnetically saturated. As a result, the current supplied to the coils can be increased, and a large amount of power can be obtained from the electric machine. Further, the armature cores do not need to be magnetically divided in the machine moving direction, and the intensity of the armature core can be thereby increased.

(1) In one example of the electric machine, the magnetic field portion may include a first surface along the machine moving direction. The first armature core and the second armature core may be positioned in a first direction intersecting with the machine moving direction with respect to the first surface of the magnetic field portion. The core coupling structure includes a plurality of core coupling portions that are arranged in the machine moving direction. The plurality of core coupling portions may include a core coupling portion that is positioned in the first direction with respect to the first magnetic pole group, the third magnetic pole group, and the first coil.

(2) In another example of the electric machine, the magnetic field portion may include a first surface and a second surface along the machine moving direction. The first armature core may be positioned in a first direction intersecting with the machine moving direction with respect to the first surface of the magnetic field portion. The second armature core may be positioned in a second direction intersecting with the machine moving direction with respect to the second surface of the magnetic field portion.

(3) In the electric machine of (1), at least one of the first armature core or the second armature core may be lamination steel including a plurality of laminated steel sheets and include a plurality of fitting holes into which the plurality of core coupling portions are fitted in a lamination direction of the steel sheets. In the at least one of the armature cores, each of the plurality of fitting hole may have a slit extending from the fitting hole in a direction intersecting with the lamination direction of the steel sheets or an opening that is open in a direction intersecting with the lamination direction of the steel sheets. This can prevent generation of an induced current around each core coupling portion.

(4) In the electric machine of (1) or (3), the magnetic field portion may be relatively rotatable to the armature portion about an axis. At least one of the first armature core or the second armature core may be lamination steel including a plurality of laminated steel sheets and include a plurality of fitting holes into which the plurality of core coupling portions are fitted in a lamination direction of the steel sheets. The at least one of the armature cores may include a slit intersecting with a closed curve that passes between the plurality of fitting holes and the plurality of magnetic pole groups formed on the at least one of the armature cores and surrounds the axis. This can prevent generation of an induced current in the rotation direction in the armature core.

(5) In the electric machine of (2), the core coupling structure may include a plurality of core coupling portions that are arranged in the machine moving direction. At least one of the first armature core or the second armature core may be lamination steel including a plurality of laminated steel sheets and include a plurality of fitting holes into which the plurality of core coupling portions are fitted in a lamination direction of the steel sheets. In the at least one of the armature cores, each of the plurality of fitting hole may have a slit extending from the fitting hole in a direction intersecting with the lamination direction of the steel sheets or an opening that is open in a direction intersecting with the lamination direction of the steel sheets. This can prevent generation of an induced current around each core coupling portion.

(6) In the electric machine of (2) or (5), the magnetic field portion may be relatively rotatable to the armature portion about an axis. The core coupling structure may include a plurality of core coupling portions that are arranged in the machine moving direction. At least one of the first armature core or the second armature core may be lamination steel including a plurality of laminated steel sheets and include a plurality of fitting holes into which the plurality of core coupling portions are fitted in a lamination direction of the steel sheets. The at least one of the armature cores may include a slit intersecting with a closed curve that passes between the plurality of fitting holes and the plurality of magnetic pole groups formed on the at least one of the armature cores and surrounds the axis. This can prevent generation of an induced current in the rotation direction in the armature core.

(7) In the electric machine of (1) or (2), the core coupling structure may be integrally formed with one of the first armature core or the second armature core. This can simplify the assembly of the armature portion.

(8) In the electric machine according to any one of (2), (5), and (6), the core coupling structure may include a plurality of core coupling portions that are arranged in the machine moving direction. The first armature core includes a first yoke portion, and the first magnetic pole group and the second magnetic pole group are formed in the first yoke portion on the magnetic field portion side. The second armature core includes a second yoke portion, and the third magnetic pole group and the fourth magnetic pole group are formed in the second yoke portion on the magnetic field portion side. The plurality of core coupling portions may include a core coupling portion that magnetically couples the first yoke portion to the second yoke portion and is disposed at a position corresponding to a position of the first magnetic pole group and a position of the third magnetic pole group in the machine moving direction.

(9) In the electric machine according to any one of (1) to (8), each of the first magnetic pole group, the second magnetic pole group, the third magnetic pole group, and the fourth magnetic pole group includes a plurality of magnetic poles arranged in the machine moving direction. This can increase power that is output from the electric machine.

(10) In the electric machine of (9), each of the plurality of magnetic poles may have a shape projecting toward the magnetic field portion.

(11) In the electric machine of (9), each of the plurality of magnetic poles may include a body having a shape projecting toward the magnetic field portion and a projecting portion extending from the body in a direction intersecting with the machine moving direction. This can reduce the magnetoresistance caused by the space between the magnetic field portion and the magnetic pole.

(12) In the electric machine according to any one of (1) to (11), a number of phases of the electric machine is an odd number of three or more, the armature portion includes, for each phase, one coil or two or more coils having a same winding direction, the first magnetic pole group and the third magnetic pole group constitute a first magnetic pole group pair, the second magnetic pole group and the fourth magnetic pole group constitute a second magnetic pole group pair, the coil is provided to each of the first magnetic pole group pair and the second magnetic pole group pair, when an angle between two magnetic field cores that are adjacent and have a same polarity is defined as 360 degrees in an electrical angle, the first magnetic pole group pair and the second magnetic pole group pair are located away from each other substantially by 360×(n+m/s) degrees in the electrical angle, where "s" is a number of phases, "m" is an integer equal to or greater than 1 and equal to or less than s−1, where the integer is other than a divisor of s (except 1) and other than multiples of the divisor (except 1), and "n" is an integer equal to or greater than 1.

(13) In the electric machine of (12), the magnetic field portion and the armature portion are relatively rotatable, and when (a number of phases of magnetic field portion)/2 is defined as "p", and a number of coils of each phase is defined as "c", "(360/p)×(n+m/s)" is substantially equal to "360/s/c".

(14) In the electric machine of any one of (1) to (11), a number of phases of the electric machine is an odd number of three or more, the armature portion includes a coil pair for each phase, the coil pair including two coils having different winding directions, the first armature core includes a first magnetic pole group, the second magnetic pole group, and a fifth magnetic pole group, the second armature core includes the third magnetic pole group, the fourth magnetic pole group, and a sixth magnetic pole, the first magnetic pole group and the third magnetic pole group constitute a first magnetic pole group pair, the second magnetic pole group and the fourth magnetic pole group constitute a second magnetic pole group pair, the fifth magnetic pole group and the sixth magnetic pole group constitute a third magnetic pole group pair, a winding direction of a coil of the first magnetic pole group pair is a same direction as a winding direction of a coil of the second magnetic pole group pair, and the coil of the first magnetic pole group pair and a coil of the third magnetic pole group pair constitute the coil pair, when an angle between two magnetic field cores that are adjacent and have a same polarity is defined as 360 degrees in an electrical angle, (i) the first magnetic pole group pair and the second magnetic pole group pair are located away from each other substantially by $360\times(n+m/s)$ degrees in the electrical angle, and (ii) the first magnetic pole group pair and the third magnetic pole group pair are located away from each other substantially by $360\times(q+1/2)$ degrees in the electrical angle, where "s" is a number of phases, "m" is an integer equal to or greater than 1 and equal to or less than s−1, where the integer is not a divisor of s (except 1) or multiples of the divisor (except 1), "n" is an integer equal to or greater than 1, and "q" is an integer equal to or greater than 1.

(15) In the electric machine of (14), the magnetic field portion and the armature portion are relatively rotatable, and when (a number of phases of magnetic field portion)/2 is defined as "p", and a number of coil pairs of each phase is defined as "c", "$(360/p)\times(n+m/s)$" is substantially equal to "360/s/c".

(16) In the electric machine of any one of (1) to (11), a number of phases of the electric machine is an even number of two or more, the armature portion includes a coil pair for each phase, the coil pair being constituted by two coils having different winding directions, the first armature core includes the first magnetic pole group, a second magnetic pole group, and a fifth magnetic pole group, the second armature core includes the third magnetic pole group, a fourth magnetic pole group, and a sixth magnetic pole group, the first magnetic pole group and the third magnetic pole group constitute a first magnetic pole group pair, the second magnetic pole group and the fourth magnetic pole group constitute a second magnetic pole group pair, the fifth magnetic pole group and the sixth magnetic pole group constitute a third magnetic pole group pair, a winding direction of a coil of the first magnetic pole group pair is a same direction as a winding direction of a coil of the second magnetic pole group pair, and the coil of the first magnetic pole group pair and a coil of the third magnetic pole group pair constitute the coil pair, when an angle between two magnetic field cores that are adjacent and have a same polarity is defined as 360 degrees in an electrical angle, (i) the first magnetic pole group pair and the second magnetic pole group pair are located away from each other substantially by $360\times(n+m/2)$ degrees in the electrical angle, and (ii) the first magnetic pole group pair and the third magnetic pole group pair are relatively located away from each other substantially by $360\times(q+1/2)$ degrees in the electrical angle, where "s" is a number of phases, "m" is an integer equal to or greater than 1 and equal to or less than s−1, where the integer is other than a divisor of s (except 1) and other than multiples of the divisor (except 1), "n" is an integer equal to or greater than 1, and "q" is an integer equal to or greater than 1.

(17) In the electric machine of (16), the magnetic field portion and the armature portion are relatively rotatable, and when (a number of poles of magnetic field portion)/2 is defined as "p", a number of coil pairs for each phase is defined as "c", "$(360/p)\times(n+m/s/2)$" is substantially equal to "180/s/c".

(18) In the electric machine of any one of (1) to (17), each of the plurality of magnets may be magnetized in the machine moving direction, and each of the plurality of magnetic field cores may include two partial magnetic field cores that are disposed between two adjacent magnets and are located away from each other in the machine moving direction. This reduces accumulated dimensional errors in the magnetic field core and the magnets, thereby improving the positional accuracy of the magnetic field core and the magnets.

BRIEF DESCRIPTION OF DRAWINGS

FIG. 24A is a perspective view of an electric machine according to a thirteenth example, in which a linear electric machine including an armature core formed of a soft magnetic powder material is shown;

DESCRIPTION OF EMBODIMENTS

In the following, embodiments of an electric machine proposed in the present disclosure will be described. In this specification, the electric machine includes a rotary electric machine functioning as an electric motor or a generator, and a linear electric machine, for example. The rotary electric machine includes a radial gap type, in which an armature portion and a magnetic field portion face each other in the radial direction of the rotary electric machine, and an axis direction gap type, in which an armature portion and a magnetic field portion face each other in the axis direction of the rotary electric machine.

Figure 1A:
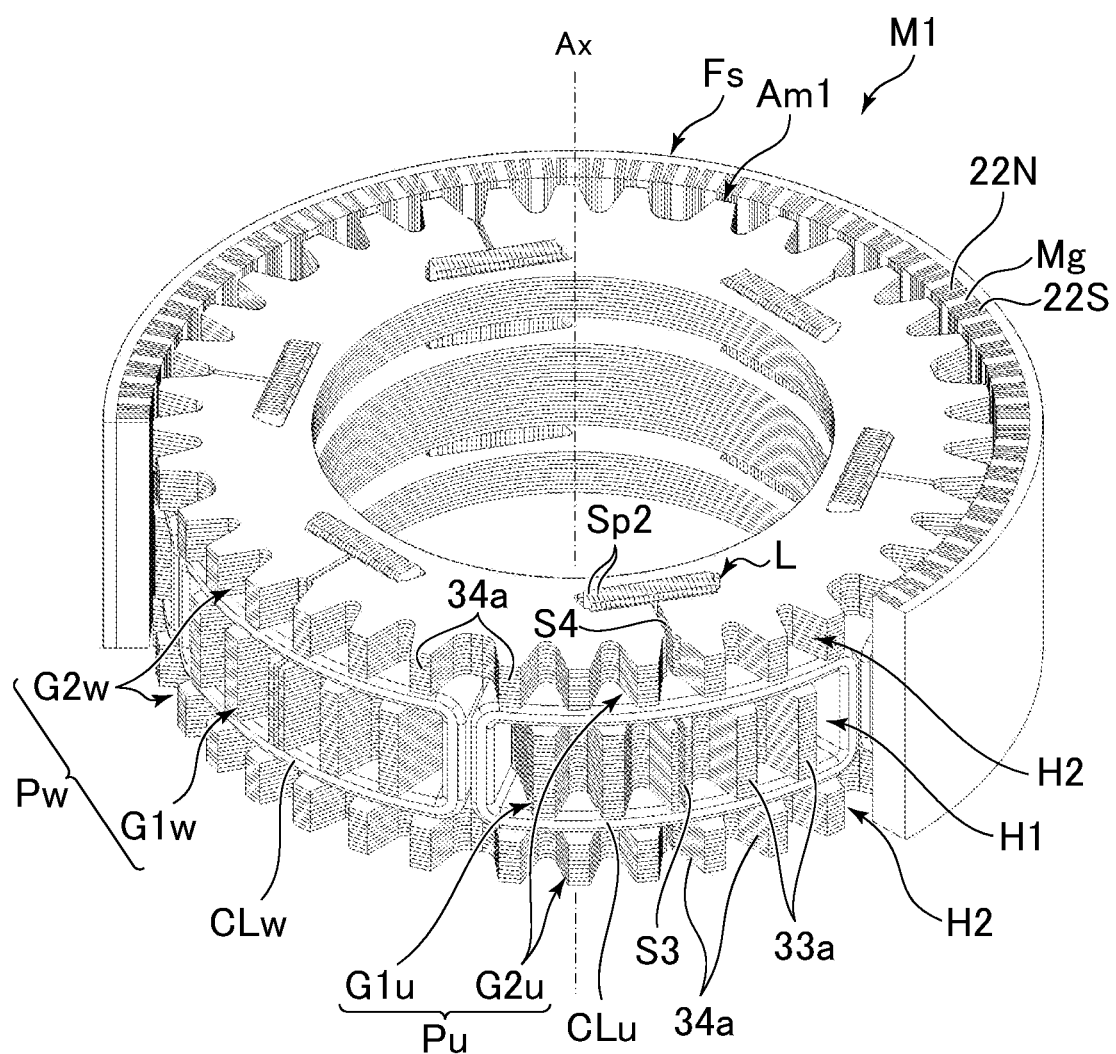
FIG. 1A is a perspective view of a first example of a rotary electric machine as one of electric machines proposed in the present disclosure.

In this specification, a direction along an axis Ax (straight line passing through the rotation center) of the rotary electric machine as shown in FIG. 1A is referred to as "axis direction", and a rotation direction of the rotary electric machine M1 about the axis Ax is simply referred to as "rotation direction." In this specification, "rotation direction" and "axis direction" respectively mean "substantial rotation direction" and "substantial axis direction." As such, for example, the description that a magnetization direction of a magnet is a rotation direction, and the description that a lamination direction of a steel sheet constituting a magnetic field core is a rotation direction, which will be described later, mean that the magnetization direction and the lamination direction include a direction of a tangent of the circle around the axis Ax. Further, in this specification, "machine moving direction" means a rotation direction of a movable portion (armature portion or magnetic field portion) in a rotary electric machine, and means a moving direction of a movable part (armature portion or magnetic field portion) in a linear electric machine. In the rotary electric machine, one of the directions crossing the machine moving direction is an axis direction, and the other is a radial direction of the rotary electric machine. In the linear electric machine, when the machine moving direction is a left-right direction, for example, one of the directions crossing the machine moving direction is a front-rear direction, and the other is a vertical direction. Further, in the linear electric machine, the direction crossing the machine moving direction also includes a direction perpendicular to the machine moving direction and oblique to both the front-rear direction and the vertical direction.

In the present specification, a "mechanical angle" is an angle expressed with reference to one turn around the axis Ax when one turn around the axis Ax is 360 degrees in the rotary electric machine. On the other hand, in the rotary electric machine or the linear electric machine, when an angle (in other words, distance) between two magnetic field cores (e.g., magnetic field cores 22N described later) having the same polarities and adjacent to each other in the machine moving direction of the electric machine (i.e., the direction of the relative movement of the magnetic field portion and the armature portion) is 360 degrees, an "electrical angle" is an angle (distance) expressed with reference to such two magnetic field cores.

[Basic Structure]

A radial gap type rotary electric machine M1 shown in FIG. 1A will be described. As shown in FIG. 1A, the rotary electric machine M1 includes magnetic a field portion Fs and an armature portion Am1 that are relatively rotatable (a part of the rotation direction of the magnetic field portion Fs is not shown in FIG. 1A). For example, the magnetic field portion Fs is a rotor and the armature portion Am1 is a stator. The magnetic field portion Fs is supported so as to be rotatable in a device on which the rotary electric machine M1 is mounted, and the armature portion Am1 is fixed to the structure of the device on which the rotary electric machine M1 is mounted. For example, in a case where the rotary electric machine M1 is mounted on an electric vehicle (e.g., two-wheeled vehicle, four-wheeled vehicle), the magnetic field portion Fs is rotatably supported and coupled to the wheels. The armature portion Am1 is fixed to a vehicle body frame, for example. The armature portion Am1 may be a rotor and the magnetic field portion Fs may be a stator. If the armature portion Am1 is a rotor, a current may be supplied to a coil CL of the armature portion Am1, which will be described later, through brushes and slip rings, and brushes and commutator, for example.

[Outline of Magnetic Field Portion]

Figure 3A:
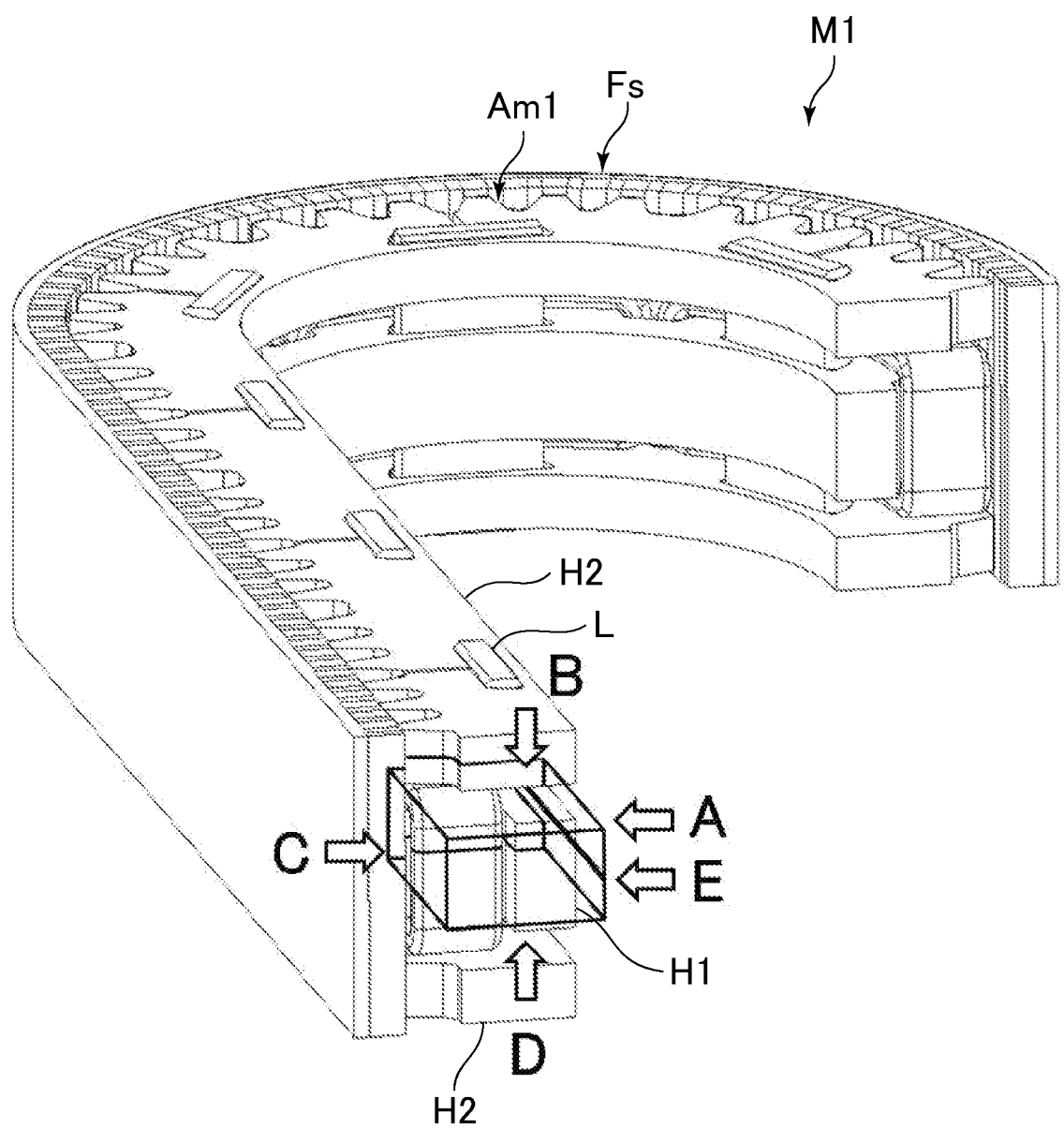
FIG. 3A is a diagram illustrating a positional relation between a magnetic field core of a magnetic field portion and a magnetic pole of an armature portion.
Figure 3B:
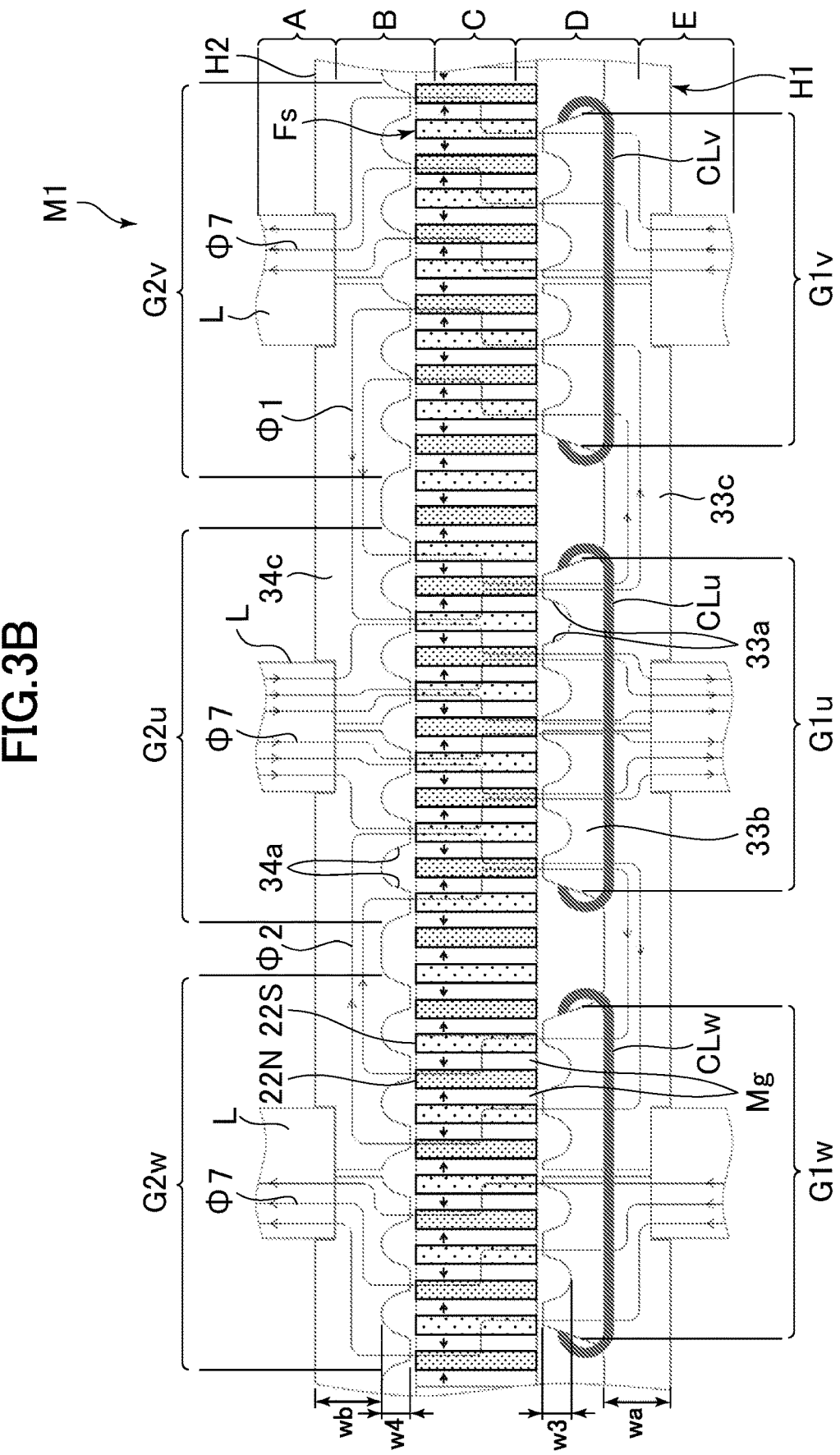
FIG. 3B is a schematic diagram of is a cross-sections A, B, C, and D indicated in FIG. 3A viewed from the directions of the arrows for showing the flow of the magnetic flux of magnets.

In the rotary electric machine M1, the magnetic field portion Fs is disposed so as to surround the outer side of the armature portion Am1. As shown in FIG. 1A, the magnetic field portion Fs includes a plurality of magnetic field cores 22N and 22S arranged in the rotation direction and a plurality of permanent magnets Mg each disposed between two adjacent magnetic field cores. In FIG. 3B, the magnetization direction of the magnets Mg is represented by an arrow. The magnet surface in the direction indicated by the arrow is N pole, and the magnet surface opposite to the surface of the N pole is S pole. As shown in FIG. 3B, the magnets Mg are magnetized in the rotation direction of the rotary electric machine M1 (machine moving direction). In this specification, "the magnet Mg is magnetized in the rotation direction of the rotary electric machine M1" means that the direction of magnetization includes the direction of the tangent of the circle (a circle centered on the axis Ax of the rotary electric machine) at the position of the magnet Mg. The magnetization directions of two adjacent magnets Mg are oppositely oriented, and two adjacent magnets Mg face each other with the magnet surfaces having the same polarity. The magnetic field core 22N is disposed between the N pole surfaces of the two adjacent magnets Mg, and the magnetic field core 22S is disposed between the S pole surfaces of the two adjacent magnets Mg. The magnetic field cores 22N and 22S may be formed of, for example, laminated steel sheets, a powder material, and a combination thereof. The magnetic field cores 22N and 22S have a magnetic focusing effect, and collect the magnetic flux of the entire surfaces of the magnets Mg to the armature portion Am1. This enables effective use of the magnetic flux by the magnets Mg.

[Armature Portion]

As shown in FIG. 1A, the armature portion Am1 includes a plurality of armature cores H1 and H2 arranged in the axis direction and a core coupling structure in which the armature cores H1 and H2 are magnetically coupled. The core coupling structure may include a plurality of core coupling portions L arranged in spaced apart from one another in the machine moving direction.

The armature portion Am1 includes, for example, one first armature core H1 and two second armature cores H2. The first armature core H1 is disposed between the two second armature cores H2. The shapes and sizes of the armature cores H1 and H2 may be different. In the rotary electric machine M1, coils CLu, CLv, and CLw (see FIG. 1B) are provided in the first armature core H1, and coils are not provided in the second armature cores H2. The thickness of the first armature core H1 (width in the axis direction) is greater than the thickness of the second armature core H2 (width in the axis direction). This prevents the density of the magnetic flux flowing through the first armature core H1 from being excessive. In the following description, when the types of coils are not distinguished, "CL" is used for coils.

The number and arrangement of the armature cores are not limited to the example of the rotary electric machine M1. The armature cores H1 and H2 may have the same shape. This can reduce the number of parts and molds of the armature cores H1 and H2. The armature cores of the armature portion may be, for example, only one first armature core H1 and one second armature core H2.

[First Armature Core]

Figure 1B:
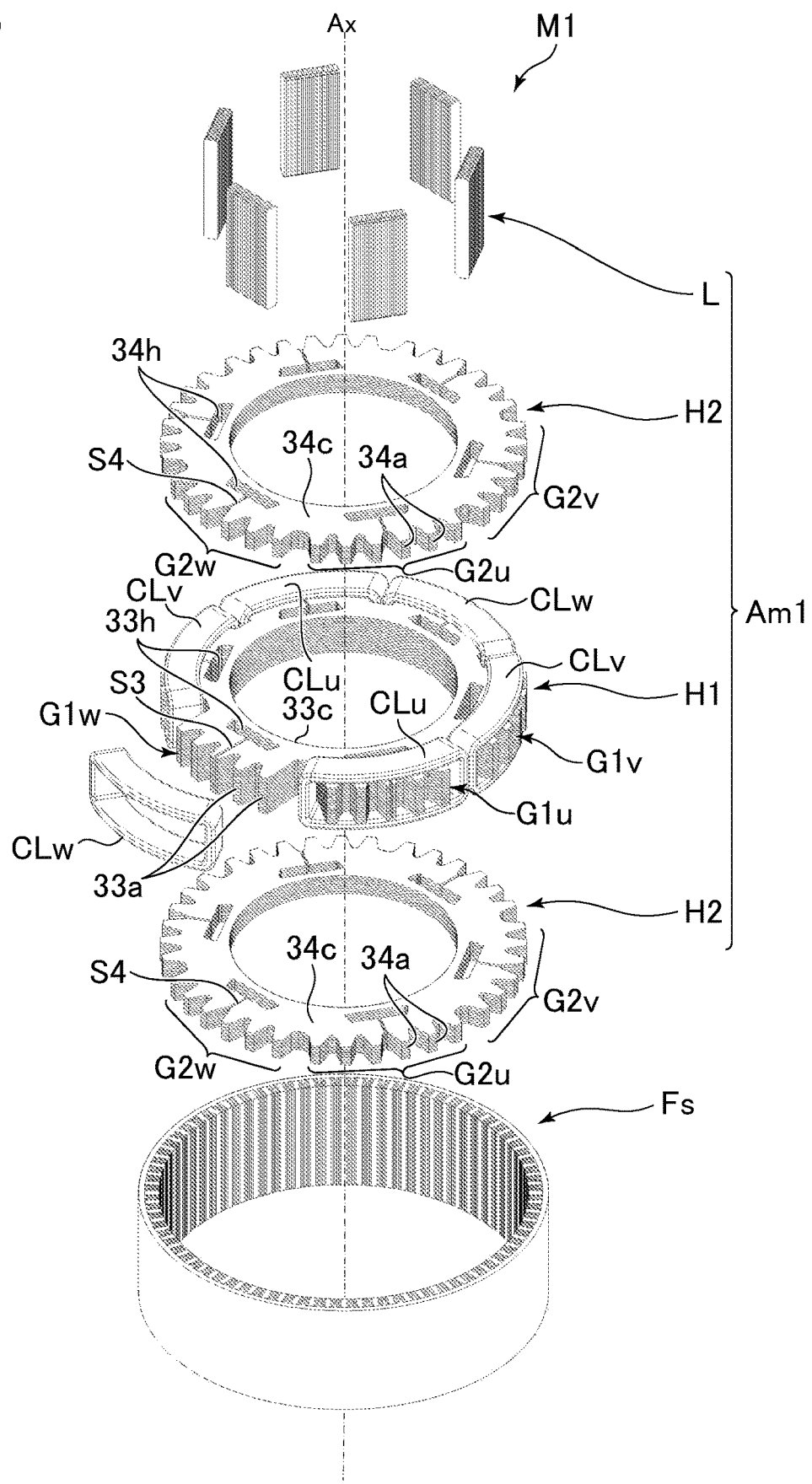
FIG. 1B is an exploded perspective view of the rotary electric machine according to the first example.

As shown in FIG. 1B, the first armature core H1 includes a plurality of magnetic pole groups G1u, G1v, and G1w arranged in the rotation direction (in the following, when the three magnetic pole groups G1u, G1v, G1w are not distinguished, G1 is used for a magnetic pole group). Each magnetic pole group G1 includes a plurality of magnetic poles 33a (see FIG. 1A) arranged in the rotation direction. The number of magnetic poles 33a of each magnetic pole group G1 is preferably two or more. In the rotary electric machine M1, each magnetic pole group G1 is composed of five magnetic poles 33a. The magnetic pole 33a is a projecting portion formed on a surface of the first armature core H1 facing the magnetic field portion Fs. That is, the magnetic 33a has a radially protruding shape. The two adjacent magnetic poles 33a are located away from each other in the rotation direction. The magnetic flux flowing between the magnetic field portion Fs and the first armature core H1 passes through the magnetic poles 33a intensively.

The first armature core H1 has a yoke portion 33c (see FIG. 1B), which is a ring-shaped core centered on the axis Ax. As shown in FIG. 3B, the first armature core H1 may have a common base 33b (see FIG. 3B) to which the magnetic poles 33a constituting each magnetic pole group G1 are connected. The common base 33b may protrude from the yoke portion 33c toward the magnetic field portion Fs, and the magnetic poles 33a protrude from the common base 33b toward the magnetic field portion Fs. The first armature core H1 may not have the common base 33b. In this case, the magnetic poles 33a may be directly connected to the annular portion of the yoke portion 33c.

As will be described later, in the first armature core H1, magnetic fluxes Φ1 and Φ2 flowing between the magnetic pole groups G1 disposed in the rotation direction and a magnetic flux Φ7 flowing toward the core coupling portion L are formed (see FIG. 3B), and in the second armature core H2, magnetic fluxes Φ1 and Φ2 flowing between the magnetic pole groups G2 disposed in the rotation direction and a magnetic flux Φ7 flowing toward the core coupling portion L are formed (see FIG. 3B). The coil CL is disposed in the first armature core H1 such that the magnetic fluxes Φ1, Φ2, and Φ7 pass through the inside of the coil CL. Specifically, as shown in FIG. 1B, the coil CL is provided in the magnetic pole group G1 and is wound around the magnetic poles 33a constituting the magnetic pole group G1. This arrangement of the coil CL enables the magnetic flux formed by the magnets Mg to efficiently intersect the coil CL. The arrangement of the coil CL is not limited to the example of the armature portion Am1. If the magnetic fluxes Φ1, Φ2, and Φ7 are disposed so as to pass through the inside of the coil CL, the coils CL may be disposed on the second armature core H2, or may be disposed on the first armature core H1 and the second armature core H2.

The rotary electric machine M1 is driven by an alternating current. For example, a three-phase alternating current is supplied to the rotary electric machine M1. As such, as shown in FIG. 1B, the first armature core H1 includes a U phase coil CLu, a V phase coil CLv, and a W phase coil CLw. The U phase coil CLu, the V phase coil CLv, and the W phase coil CLw are respectively provided in the magnetic pole groups G1u, G1v, and G1w. In the rotary electric machine M1, two coils CL are provided for each phase. When the rotary electric machine M1 is viewed in the axis direction, the coils CLu, CLv, and CLw are arranged in the rotation direction. This enables balancing of the magnetic forces acting on the armature portion Am1 and the magnetic field portion Fs. The number of coils CL provided in one phase may be one or more than two. Each magnetic pole group G1 may be provided with an outer coil and an inner coil disposed inside the outer coil. For example, the magnetic pole group G1u of the U phase may be provided with an outer coil surrounding all the magnetic poles 33a (five magnetic poles 33a) constituting the magnetic pole group G1u and an inner coil surrounding only some of the magnetic poles 33a (three magnetic poles 33a in the middle). This structure serves to effectively utilize the space between two adjacent magnetic poles 33a and reduce the size of the rotary electric machine. This may be applied to a radial gap type rotary electric machine, an axial gap type rotary electric machine, and a linear electric machine to be described later.

Figure 2:
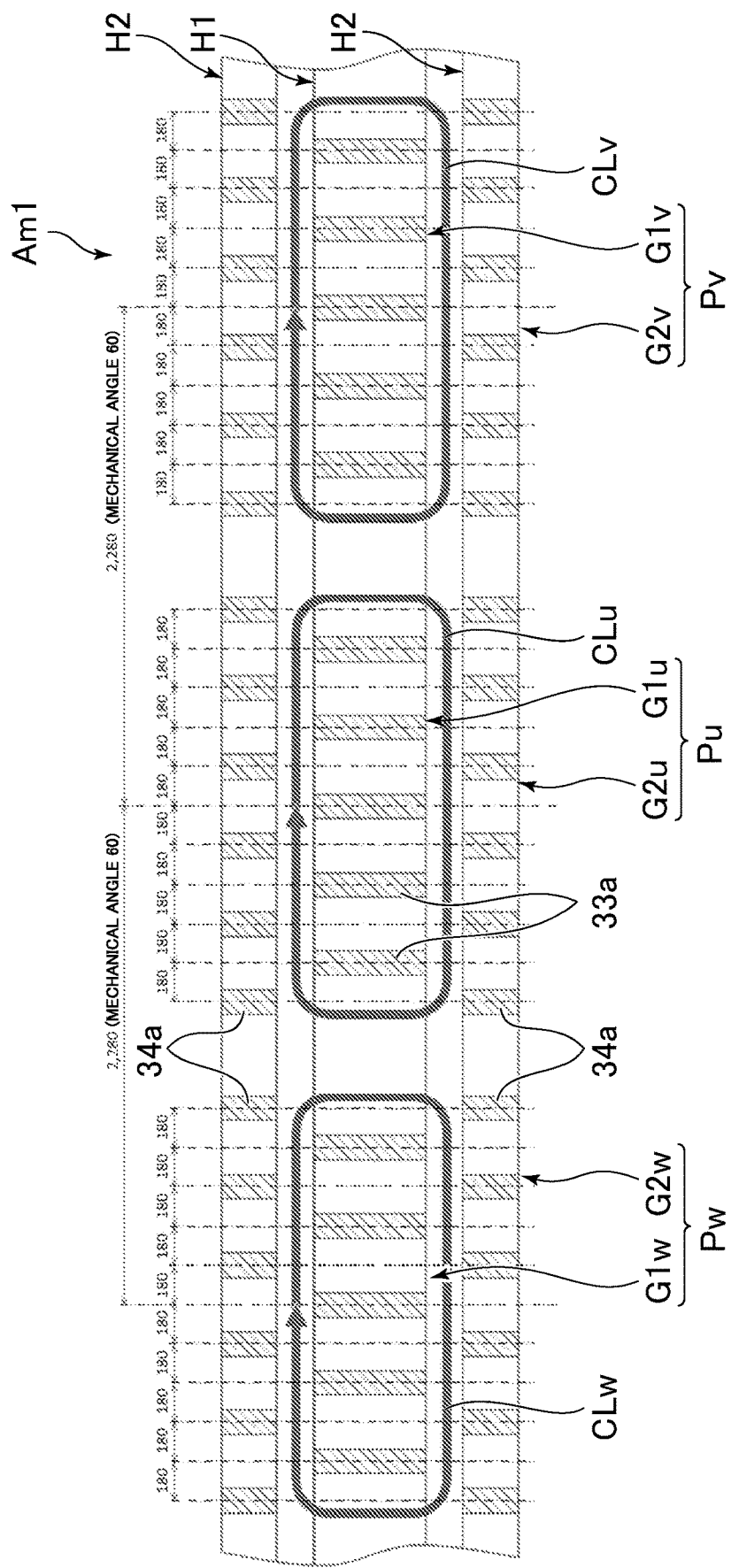
FIG. 2 is a development view of the rotary electric machine according to the first example indicating a position of a magnetic pole of the armature portion of the rotary electric machine.

As shown in FIG. 2, in the rotary electric machine M1, the winding directions of the coils CL provided on each phase are the same (in FIG. 2, arrows of the coils CL indicate the winding direction of the coils). The winding direction corresponds to the direction of the current supplied from an inverter (not shown) to the coil CL. When the direction of the current is positive, the current flows in the direction of the arrows. When the direction of the current is negative, the current flows in the direction opposite to the arrows. The position, number, and winding direction of the coils CL are not limited to the example of the rotary electric machine M1. For example, the number of coils provided for each phase may be one, or three or more. Further, the number of phases may be an odd number of 3 or more, such as 5 and 7, or an even number of 2 or more. The variations of the position, number, and winding direction of the coils are described in detail later.

[Second Armature Core]

As shown in FIGS. 1B and 2, the second armature cores H2 have a plurality of magnetic pole groups G2u, G2v, and G2w arranged in the rotation direction (hereinafter, when the three magnetic pole groups G2u, G2v, and G2w are not distinguished, the reference symbol G2 is used for a magnetic pole group). Each magnetic pole group G2 is composed of a plurality of magnetic poles 34a arranged in the rotation direction. The number of magnetic poles 34a of each magnetic pole group G2 is preferably two or more. In the rotary electric machine M1, each magnetic pole group G2 is composed of six magnetic poles 34a. As shown in FIG. 1B, the magnetic pole 34a is a projecting portion formed on a surface of the second armature core H2 facing the magnetic field portion Fs. In the rotary electric machine M1, the magnetic pole 34a is a radially projecting portion. The second armature core H2 has an annular yoke portion 34c centered on the axis Ax, and the magnetic pole 34a protrudes from the yoke portion 34c toward the magnetic field portion Fs. The two adjacent magnetic poles 34a are located away from each other in the rotation direction. The magnetic flux flowing between the magnetic field portion Fs and the second armature core H2 passes through the magnetic poles 34a intensively.

As shown in FIGS. 1A and 1B, in the rotary electric machine M1, the three magnetic pole groups G2u, G2v, and G2w of the second armature core H2 are respectively positioned with respect to the three magnetic pole groups G1u, G1v, and G1w of the first armature core H1 in the axis direction (the direction intersecting with the machine moving direction). As described above, the rotary electric machine M1 has two second armature cores H2, and each magnetic pole group G1 is positioned between two magnetic pole groups G2 located away from each other in the axis direction.

The distance between the magnetic field portion Fs and the armature cores H1 and H2 is small, and thus, many of the magnetic fluxes move between the armature cores H1 and H2 and the magnetic field portion Fs through the magnetic poles 33a and 34a. The shape of magnetic poles 33a and 34a may be appropriately changed if the shape satisfies such a function. For example, in FIG. 1A, the distal end surface of the magnetic pole 33a is a curved surface along the inner peripheral surface of the magnetic field portion Fs, but may be a curved surface having a greater curvature than the inner peripheral surface of the magnetic field portion Fs. This serves to reduce cogging torque. Further, a groove (recessed portion) between two adjacent magnetic poles 33a may be U-shaped or substantially rectangular. As yet another example, corners of the distal end surface of the magnetic pole 33 may be chamfered or curved in an arc. The magnetic pole 34a of the second armature core H2 may also be shaped similarly to the magnetic pole 33a described herein.

[Position of Magnetic Pole]

The position of the magnetic pole 33a of the first armature core H1 and the position of the magnetic pole 34a of the second armature core H2 are shifted in the rotation direction. As shown in FIG. 2, the position of magnetic pole 33a in the rotation direction is between two magnetic poles 34a adjacent in the rotation direction. Further, the position of the magnetic pole 34a in the rotation direction is between the two magnetic poles 33a adjacent in the rotation direction.

As shown in FIG. 2, the position of the magnetic pole 33a is, for example, in the middle of two adjacent magnetic poles 34a, and the position of the magnetic pole 34a is, for example, in the middle of two adjacent magnetic poles 33a. The numerical values shown in FIG. 2 indicate angles (distances) in the rotation direction expressed in electrical angles. In the rotary electric machine M1, the two magnetic poles 33a adjacent in the rotation direction are located away from each other by 360 degrees in the electrical angle, and the position of the magnetic pole 33a in the rotation direction and the position of the magnetic pole 34a in the rotation direction are located away from each other by 180 degrees in the electrical angle. The relative positions of the magnetic pole 33a and the magnetic pole 34a are not limited thereto. The angles (distances) of the magnetic poles 33a and 34a in the rotation direction may be slightly less than 180 degrees or slightly greater than 180 degrees. The angles (distances) of the magnetic poles 33a and 34a may be 175 degrees or 185 degrees in the electrical angle. The angles (distances) of the magnetic poles 33a and 34a in the rotation direction may gradually decrease or increase as they approach the ends of the magnetic pole groups G1 and G2 in the rotation direction.

[Positional Relationship Between Magnetic Field Core and Magnetic Pole]

When the magnetic field portion Fs is fixed at a certain position, the magnets Mg, the magnetic field cores 22N and 22S, and the magnetic poles 33a and 34a have the positional relationships described below.

As shown in FIG. 3B, the positions of the magnetic poles 33a and 34a of the armature cores H1 and H2 in the rotation direction respectively correspond to the positions of the magnetic field cores 22N and 22S in the rotation direction. For example, the magnetic poles 33a are opposed to the magnetic field core 22N (or 22S) and form a magnetic path between the magnetic poles 33a and the magnetic field core 22N (or 22S). Similarly, the magnetic poles 34a are opposed to the magnetic field core 22S (or 22N) and form a magnetic path between the magnetic poles 34a and the magnetic field core 22S (or 22N). FIG. 3B shows the magnetic fluxes Φ1, Φ2, and Φ7 flowing through the magnetic circuit.

In the case shown in FIG. 3B, the position of magnetic field core 22N coincides with the position of magnetic pole 33a of the magnetic pole group G1u and the position of magnetic field core 22S coincides with the position of magnetic pole 34a of the magnetic pole group G2u. In this case, the magnetic poles 33a of the magnetic pole group G1v and G1w are opposed to the magnetic field core 22S, and the magnetic poles 34a of the magnetic pole groups G2v and G2w are opposed to the magnetic field core 22N. While the position of magnetic field core 22S in the rotation direction is shifted from the positions of magnetic poles 33a of the magnetic pole groups G1v and G1w, the flow of magnetic flux is allowed between the magnetic field core 22S and the magnetic poles 33a of the magnetic pole groups G1v and G1w. Similarly, while the position of magnetic field core 22N in the rotation direction is shifted from the positions of magnetic poles 34a of the magnetic pole groups G2v and G2w, the flow of magnetic flux is allowed between the magnetic field core 22N and the magnetic poles 34a of the magnetic pole groups G2v and G2w. The closed magnetic circuit to be described later is configured by such a positional relationship. In the case shown in FIG. 3, the position of magnetic field core 22S is shifted by 60 degrees by the electrical angle from the positions of magnetic poles 33a of the magnetic pole groups G1v and G1w, and the position of magnetic field core 22N is shifted by 60 degrees by the electrical angle from the positions of magnetic poles 34a of the magnetic pole groups G2v and G2w.

The positions of magnetic pole groups G1 and G2 and the positions of magnetic field cores 22N and 22S in the rotation direction will be described in detail. In this description, a pair of the magnetic pole group G1u and the magnetic pole group G2u arranged in the axis direction is referred to as a magnetic pole group pair Pu (see FIG. 2), a pair of the magnetic pole group G1v and the magnetic pole group G2v arranged in the axis direction is referred to as a magnetic pole group pair Pv (see FIG. 2), and a pair of the magnetic pole group G1w and the magnetic pole group G2w arranged in the axis direction is referred to as a magnetic pole group pair Pw (see FIG. 2). Hereinafter, in the case where these three magnetic pole group pairs Pu, Pv, and Pw are not distinguished from each other, the symbol P is used for the magnetic pole group pair.

The number of magnetic poles 33a and 34a is the same for the magnetic pole group pairs Pu, Pv, and Pw. That is, the number of magnetic poles 33a in each of the magnetic pole groups G1u, G1v, and G1w of the first armature cores H1 is the same, for example, five. The number of magnetic poles 34a in each of the magnetic pole groups G2u, G2v, and G2w of the second armature cores H2 is the same, for example, six. The space between the magnetic poles 33a and 34a is also substantially the same in the magnetic pole group pairs Pu, Pv, and Pw. That is, the space between the magnetic poles 33a (distance between two adjacent magnetic poles 33a) is substantially the same in the three magnetic pole groups G1u, G1v, and G1w of the first armature core H1, and the space between the magnetic poles 34a (distance between two adjacent magnetic poles 34a) is substantially the same in the three magnetic pole groups G2u, G2v, and G2w of the second armature core H2. The distance between two adjacent magnetic poles 33a may not be the same in each of the magnetic pole groups G1, and may be uniformed. In this case as well, the magnetic pole groups G1 have the same structure. That is, each of the magnetic pole groups G1 has a plurality of magnetic poles 33a arranged with non-uniform spacing, and one magnetic pole group G1 and the other magnetic pole group G1 are the same as to the spacing of magnetic poles 33a. Similarly, the distance between two adjacent magnetic poles 34a may not be the same in each of the magnetic pole groups G2, and may be uniformed. In this case as well, the magnetic pole groups G2 have the same structure. That is, each of the magnetic pole groups G2 has a plurality of magnetic poles 34a arranged with non-uniform spacing, and one magnetic pole group G2 and the other magnetic pole group G2 are the same as to the spacing of magnetic poles 34a.

More desirably, the widths and/or heights of magnetic poles 33a and 34a may also be substantially the same in the magnetic pole group pairs Pu, Pv, and Pw. That is, the width and/or the height of the magnetic pole 33a in the rotation direction are substantially the same in the three magnetic pole groups G1u, G1v, and G1w of the first armature core H1. the width and/or the height of the magnetic pole 34a in the axis direction are substantially the same in the three magnetic pole groups G2u, G2v, and G2w of the second armature core H2. That is, the three magnetic pole group pairs Pu, Pv, and Pw have the same structure. As such, it is desirable that one magnetic pole group pair (e.g., Pu) is rotated about the axis Ax1 and becomes another magnetic pole group pair P (e.g., Pv, Pw).

The widths and/or the heights of a plurality of magnetic poles 33a constituting the respective magnetic pole groups G1 may not be uniformed. In this case, the magnetic pole groups G1u, G1v, and G1w have the same structure. That is, each of the magnetic pole groups G1u, G1v, and G1w may be formed of the plurality of magnetic poles 33a having non-uniform widths and/or non-uniform heights. Similarly, the widths and/or the heights of a plurality of magnetic poles 34a constituting the respective magnetic pole groups G2 may not be uniformed. In this case, the magnetic pole groups G2u, G2v, and G2w have the same structure. That is, each of the magnetic pole groups G2 may be formed of the plurality of magnetic poles 34a having non-uniform widths and/or non-uniform heights.

As shown in FIG. 2, the angle between two adjacent magnetic pole group pairs P is substantially "360×(n+m/s)" degrees in electrical angle, where "s" is the number of phases, "m" is an integer equal to or greater than 1 and equal to or less than s−1, where the integer is other than a divisor of s (except 1) and other than multiples of the divisor (except 1), and "n" is an integer equal to or greater than 1.

As such, there is a (360×m/s) degree difference in electrical angle between the angle (distance) between the magnetic poles 33a (or 34a) and the magnetic field core 22N (or 22S) of the magnetic pole group pair Pu and the angle (distance) between the magnetic poles 33a (or 34a) and the magnetic field core 22N (or 22S) of the other magnetic pole group pairs Pv and Pw. In the rotary electric machine M1, s=3, n=6, and m=1. As such, the angle between two adjacent magnetic pole group pairs P is 2,280 degrees in electrical angle. Accordingly, for example, when the magnetic poles 33a of the magnetic pole group pair Pu directly face the magnetic field core 22N (when the angle (distance) between the magnetic poles 33a and the magnetic field core 22N is 0 degrees), the positions of the magnetic poles 33a of the magnetic pole group pairs Pv and Pw are shifted by 120 degrees in electrical angle relative to the magnetic field core 22N. The relative positions of the magnetic pole group pair P and the magnetic field portion Fs may be applied to a linear electric machine or an axial gap type rotary electric machine.

In this description, specifically, the angle (distance) between the two magnetic pole group pairs P is the angle (distance) between the centers of magnetic pole groups G1 in the rotation direction and the angle (distance) between the centers of magnetic pole groups G2 in the rotation direction. The angle (distance) between the centers of magnetic pole groups G1 is, for example, the distance between the center of magnetic pole group G1u in the rotation direction and the center of magnetic pole group G1v in the rotation direction. Similarly, the angle (distance) between the centers of magnetic pole groups G2 is, for example, the distance between the center of magnetic pole group G2u in the rotation direction and the center of magnetic pole group G2v in the rotation direction.

The mechanical angle of "(360/p)×(n+m/s)" degrees is ensured between two adjacent magnetic pole group pairs P. Further, the angle of two adjacent magnetic pole group pairs P can also be expressed as the mechanical angle of "360/s/c" degrees. Here, "p" is (number of poles of magnetic field portion)/2, and "c" is the number of coils for each phase.

Accordingly, "(360/p)×(n+m/s)" is substantially equal to "360/s/c". The "number of poles of magnetic field portion" corresponds to the number of magnetic field cores 22N and 22S of the magnetic field portion Fs, and, for example, 76 in the rotary electric machine M1 (p=38). Further, s=3 and c=2. As such, the angle between two adjacent magnetic pole group pairs P is about 60 degrees in mechanical angle. In other words, the number of poles (p×2) of magnetic field portion Fs, the number of coils (s×c) of armature portion, and the number of magnetic poles 33a and 34a are set such that "(360/p)×(n+m/s)" is substantially equal to "360/s/c".

[Magnetic Coupling in Rotation Direction]

In the first armature core H1, two magnetic pole groups G1 adjacent in the rotation direction are magnetically coupled to each other. In the rotary electric machine M1, the magnetic pole groups G1 are magnetically coupled via a yoke portion 33c formed inside thereof. As such, the magnetic flux formed by the magnets Mg flows between the two magnetic pole groups G1 (see FIG. 3B). Similarly, in the second armature core H2, two magnetic pole groups G2 adjacent in the rotation direction are magnetically coupled to each other. Specifically, the magnetic pole groups G2 are magnetically coupled via a yoke portion 34c formed inside thereof. Therefore, the magnetic flux formed by the magnet Mg flows between the two magnetic pole group G2 (see FIG. 3B).

The yoke portion 33c of the first armature core H1 does not have a structure between two adjacent magnetic pole groups G1 to magnetically separate them. The structure for magnetically separating the two magnetic pole groups G1 is, specifically, a slit formed in the yoke portion 33c, or a portion formed of a material having a large magnetoresistance in comparison with the other portions of the armature core H1. Similarly to the first armature core H1, the yoke portion 34c of the second armature core H2 do not have a structure between two adjacent magnetic pole groups G2 to magnetically separate them. This contributes to the formation of the flow of magnetic fluxes Φ1 and Φ2 (see FIG. 3B) in the rotation direction.

In the rotary electric machine M1, as shown in FIG. 3B, a width Wa of the yoke portion 33c in the radial direction is substantially constant in the rotation direction. Further, a width Wb of the yoke portion 34c in the radial direction is also substantially constant in the rotation direction. This structure also contributes to the formation of the flow of magnetic fluxes Φ1 and Φ2 (see FIG. 3B) in the rotation direction.

In the rotary electric machine M1, as shown in FIG. 3B, the width Wa of the yoke portion 33c in the radial direction is larger than the projecting width W3 of magnetic pole 33a. The width Wa of the yoke portion 33c may be greater than the sum of the width of the magnetic pole 33a and the width of the common base 33b. The width Wb of the yoke portion 34c in the radial directions is larger than the protrusion width W4 of magnetic pole 34a. This structure also contributes to the formation of the flow of magnetic fluxes Φ1 and Φ2 (see FIG. 3B) in the rotation direction.

[Core Coupling Portion]

A core coupling portion L magnetically couples the armature cores H1 and H2. A magnetic flux Φ7 (see FIG. 3B) passing through the core coupling portion L is formed between the armature cores H1 and H2. The armature portion Am1 has a plurality of core coupling portions L (see FIG. 1A), which are spaced apart from one another in the rotation direction (i.e., machine moving direction). As shown in FIG. 3B, the core coupling portions L are respectively provided in a plurality of magnetic pole group pairs P. For example, the core coupling portions L are provided in the magnetic pole group pair Pu (magnetic pole groups G1u and G2u) of the U phase, and a magnetic path via the core coupling portions L is formed between the magnetic pole group G1u of the first armature core H1 and the magnetic pole group G2u of the second armature core H2. Similarly, the core coupling portions L are provided in each of the other two magnetic pole group pairs Pw and Pv.

The armature portion Am1 includes one first armature core H1 and two second armature cores H2. The core coupling portions L magnetically couple these three armature cores H1 and H2. Each core coupling portion L extends from the upper second armature core H2 to the lower second armature core H2. Alternatively, the armature portion Am1 may include two core coupling portions L arranged in the axis direction. The first core coupling portion L may couple the first armature core H1 and the upper second armature core H2, and the second core coupling portion L may couple the first armature core H1 and the lower second armature core H2.

Figure 1C:
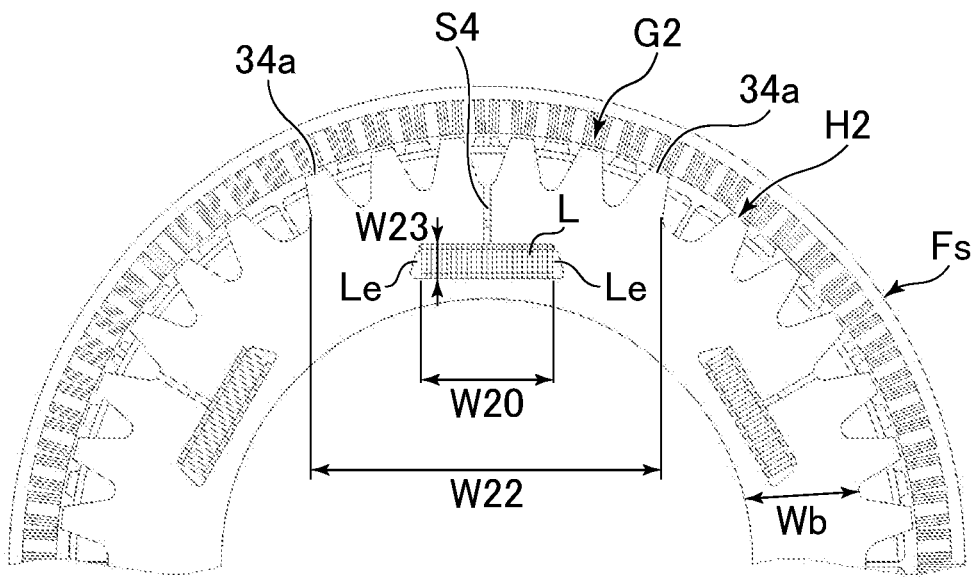
FIG. 1C is a plan view of the rotary electric machine according to the first example and shows a second armature core.
Figure 1D:
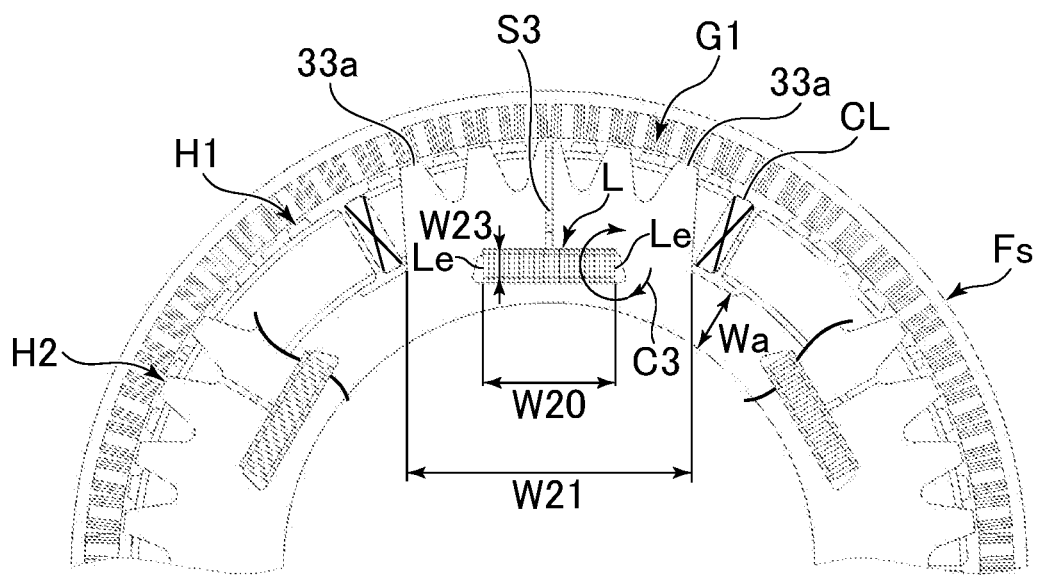
FIG. 1D is a plan view of the rotary electric machine according the first example and shows the partially broken second armature core and a first armature core.

As shown in FIG. 1A, the rotary electric machine M1 is a radial gap type rotary electric machine, and the magnetic pole groups G1 and G2 are located radially with respect to the magnetic field portion Fs. More specifically, the armature portion Am1 is located inside the magnetic field portion Fs, and thus, the magnetic pole groups G1 and G2 are located radially inside with respect to the magnetic field portion Fs. As shown in FIGS. 1C and 1D, the core coupling portion L is located inside the magnetic pole groups G1 and G2. In other words, the core coupling portion L is positioned opposite to the magnetic field portion Fs across the magnetic pole groups G1 and G2 and the coils CL provided thereon. This allows the magnetic flux Φ7 flowing through the coil coupling portion L to pass through the inside of the coil CL and prevents the magnetic fluxes Φ1 and Φ2 flowing through the two magnetic pole groups located away from each other in the rotation direction (e.g., magnetic pole groups G1$u$ and G1$v$) and the magnetic flux Φ7 flowing through the core coupling portion L from interfering with each other. This serves to efficiently use the magnetic flux formed in the magnetic circuit to obtain the torques.

The position of the core coupling portion L in the rotation direction may coincide with the center of the magnetic pole groups G1 and G2 in the rotation direction. In the rotary electric machine M1, the number of magnetic poles 34$a$ constituting each magnetic pole group G2 is different from the number of magnetic poles 33$a$ constituting each magnetic pole group G1 by one. In this way, the position of the center of the magnetic pole group G1 in the rotation direction coincides with the position of the center of the magnetic pole group G2 in the rotation direction. As such, the centers of the three elements (magnetic pole groups G1 and G2, core coupling portion L) are coincident in the rotation direction.

Figure 1E:
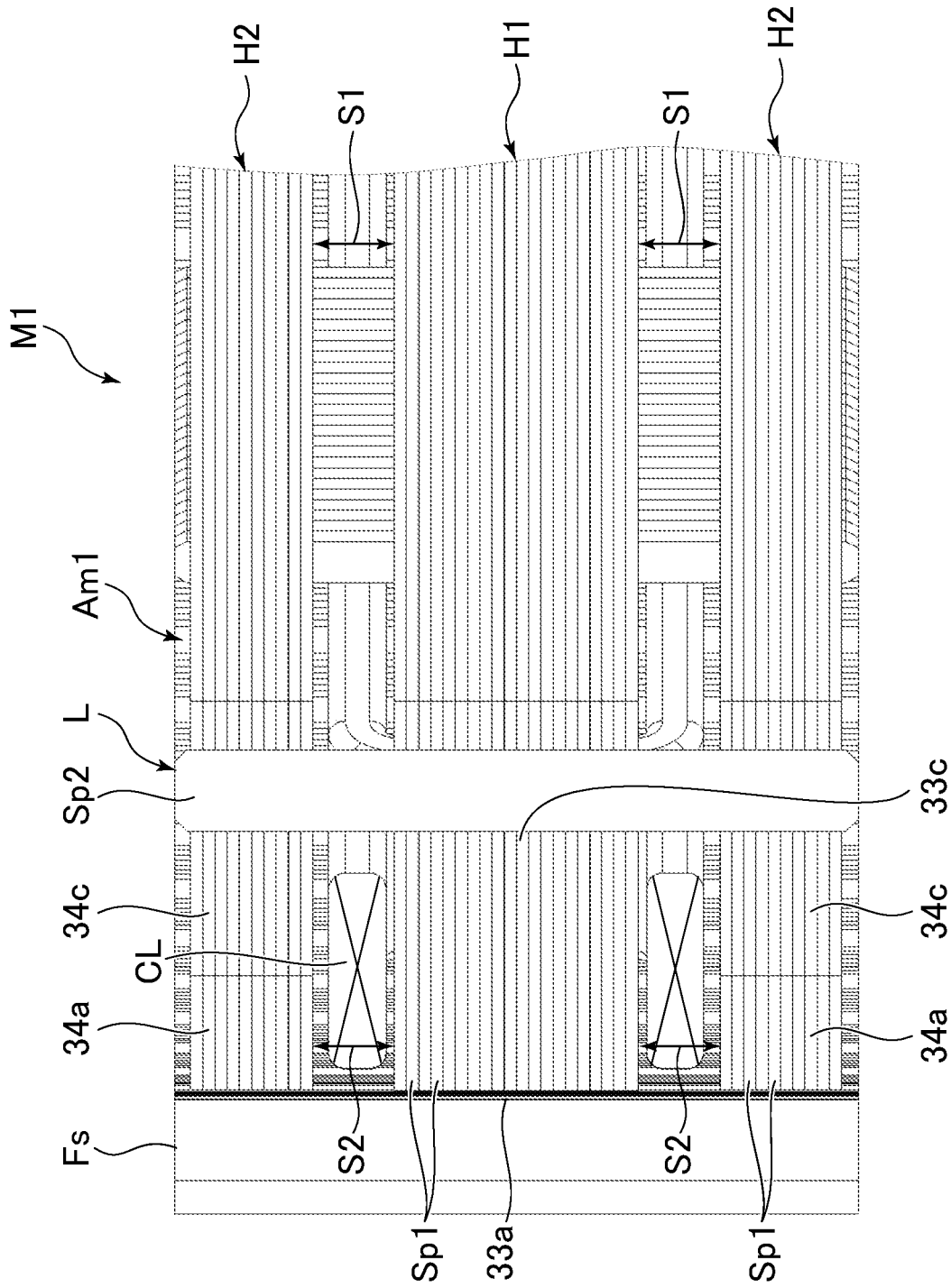
FIG. 1E is a cross-sectional view of the rotary electric machine according to the first example.

As shown in FIGS. 1A and 1E, the core coupling portion L magnetically couples the yoke portions 33$c$ and 34$c$ of the armature cores H1 and H2. In the armature portion Am1, fitting holes 33$h$ and 34$h$ (see FIG. 1B) are formed to pass through the yoke portions 33$c$ and 34$c$ in the axis direction. The core coupling portions L are fitted into the fitting holes 33$h$ and 34$h$. The upper end of the core coupling portion L reaches the upper surface of the armature portion Am1 (the upper surface of the upper armature core H2) and the lower end of the core coupling portion L reaches the lower surface of the armature portion Am1 (the lower surface of the lower armature core H2).

Contrary to the rotary electric machine M1, the armature portion Am1 may be located outside the magnetic field portion Fs. In this case, the magnetic pole groups G1 and G2 are located radially outward with respect to the magnetic field portion Fs, and the core coupling portion L is located outside the magnetic pole groups G1 and G2.

Unlike the armature portion Am1, the core coupling portion L may be integrally formed with one of the armature cores H1 and H2. In the armature portion Am1, the armature cores H1 and H2 are laminated steel sheets as described later, although one or both of the armature cores H1 and H2 may be formed of a soft magnetic powder material. In this case, the armature core formed of a powder material may be integrally formed with the core coupling portion.

As shown in the FIGS. 1C and 1D, a width W20 of the core coupling portion L in the rotation direction (machine moving direction) is smaller than widths W21 and W22 of the magnetic pole groups G1 and G2 in the rotation direction. As such, both the magnetic flux Φ7 (see FIG. 3B) flowing through the core coupling portion L and the magnetic fluxes Φ1 and Φ2 (see FIG. 3B) flowing between the two magnetic pole groups located away from each other in the rotation direction are more effectively formed.

In the first armature core H1, as shown in FIG. 1D, at least two magnetic poles 33$a$ each located at the ends of the magnetic poles 33$a$ constituting the respective magnetic pole groups G1 may be located outwardly from the both ends Le of the core coupling portion L. In the example of FIG. 1D, the magnetic pole 33$a$ located at the right end is located rightward of the right end Le of the core coupling portion L, and the magnetic pole 33$a$ located at the left end is located leftward of the left end Le of the core coupling portion L. Similarly, in the second armature core H2 shown in FIG. 1C, at least two magnetic poles 34$a$ each located at the ends of the magnetic poles 34$a$ constituting the respective magnetic pole groups G2 may be located outwardly from the both ends Le of the core coupling portion L. This serves to easily form the magnetic fluxes Φ1 and Φ2 flowing between the two magnetic pole groups located away from each other in the rotation direction.

Unlike the armature portion Am1, in the armature core H1 (and/or H2), a plurality of magnetic poles may be located outward (rightward and leftward in the drawing) from the both ends Le of the core coupling portion L. For example, a plurality of magnetic poles 33$a$ located at the right end may be located rightward of the right end Le of the core coupling portion L, and a plurality of magnetic poles 33$a$ located at the left end may be located leftward of the left end Le of the core coupling portion L.

As shown in FIG. 1D, a width W23 of the core coupling portion L in the radial direction is smaller than widths Wa and Wb of the yoke portions 33$c$ and 34$c$ in the radial direction. As such, the sizes of the fitting holes 33$h$ and 34$h$ of the yoke portions 33$c$ and 34$c$ into which the core coupling portion L are fitted can be reduced, and the intensity of the armature cores H1 and H2 can be secured.

The first armature core H1 and the second armature core H2 are magnetically coupled by the core coupling portion L alone and magnetically separated in the areas other than the core coupling portion L. Specifically, as shown in FIG. 1E, spaces S1 and S2 are provided between the first armature core H1 and the second armature core H2 (in FIG. 1E, the space S1 is a space between the yoke portion 33$c$ and the yoke portion 34$c$, and the space S2 is a space between the magnetic poles 33$a$ and the magnetic poles 34$a$). In the rotary electric machine M1, the space S1 may be substantially the same as the space S2.

As shown in FIG. 1E, the spaces S1 and S2 are larger than the thickness of the winding of the coil CL. Further, the armature cores H1 and H2 do not have convex portions projecting in the axis direction on the yoke portions 33$c$ and 34$c$. That is, the armature cores H1 and H2 do not have structures to make the space S1 smaller than the space S2 in the yoke portions 33$c$ and 34$c$ other than in the core coupling portion L.

The first armature core H1, the second armature core H2, the coil CL, and core coupling portion L, i.e., the entire armature portion Am1, may be solidified by a material having non-magnetic and insulating property. A resin may be used as such a material, and the armature portion Am1 may be molded with resin. In this case, the spaces S1 and S2 may be filled with the resin. Alternatively, an air layer may be formed in the spaces S1 and S2, for example.

[Magnetic Circuit]

For example, when the angular difference between the magnetic field core 22N of the magnetic field portion Fs and the magnetic pole 33a of the magnetic pole group G1u is 0 degrees (electrical angle), the magnetic fluxes Φ1, Φ2, and Φ7 by the magnets Mg as shown in FIG. 3B are formed on the armature portion Am1 and the magnetic field portion Fs. In these drawings, the magnetic fluxes Φ1, Φ2, and Φ7 formed by the magnets Mg pass through the space between the armature portion Am1 and the magnetic field portion Fs, enter the magnetic pole group G1u of the first armature core H1 from the magnetic field core 22N, and pass through the inside of the coil CLu.

As shown in FIG. 3B, the magnetic circuit in which the magnetic flux Φ1 is formed includes the magnetic pole groups G1u and G1v of the first armature core H1, the magnetic pole groups G2u and G2v of the second armature core H2, the magnetic field cores 22N and 22S, and the magnets Mg therebetween. That is, the magnetic flux Φ1 enters the magnetic pole group G1u of the first armature core H1 from the magnetic field core 22N and flows between the magnetic pole group G1u and the magnetic pole group G1v in the rotation direction in the first armature core H1. Further, the magnetic flux Φ1 flows between the magnetic pole group G2v and the magnetic pole group G2u in the rotation direction in the second armature core H2. The magnetic flux Φ1 flows between the magnetic pole group G1v and the magnetic pole group G2v through the magnetic field cores 22N and 22S and the magnets Mg in the axis direction, and flows between the magnetic pole group G1u and the magnetic pole group G2u through the magnetic field cores 22N and 22S and the magnets Mg in the axis direction. The magnetic flux Φ1 passes through the inside of the U phase coil CLu and the V phase coil CLv. Similarly, the magnetic circuit in which the magnetic flux Φ2 is formed includes the magnetic pole groups G1u and G1w of the first armature core H1, the magnetic pole groups G2u and G2w of the second armature core H2, the magnetic field cores 22N and 22S, and the magnets Mg between the two magnetic field cores.

As shown in FIG. 3B, one of the magnetic circuits through which the magnetic flux Φ7 flows includes the magnetic pole group G1u of the first armature core H1, the core coupling portion L, the magnetic pole group G2u of the second armature core H2, the magnetic field cores 22N and 22S, and the magnets Mg between the two magnetic field cores. That is, the magnetic flux Φ7 enters the magnetic pole group G1u of the first armature core H1 from the magnetic field core 22N, passes through the inside of the U phase coil CLu, and flows through the core coupling portion L to the magnetic pole group G2u of the second armature core H2. The magnetic flux Φ7 also flows between the magnetic pole group G1u of the first armature core H1 and the magnetic pole group G2u of the second armature core H2 through the magnetic field cores 22N and 22S of the magnetic field portion Fs and the magnets Mg in the axis direction. As shown in FIG. 3B, a magnetic flux Φ7 flowing between the magnetic pole group G1v of the first armature core H1 and the magnetic pole group G2v of the second armature core H2 through the core coupling portion L and a magnetic flux Φ7 flowing between the magnetic pole group G1w of the first armature core H1 and the magnetic pole group G2w of the second armature core H2 through core coupling portion L are also formed.

Unlike the conventional rotary electric machine, such a rotary electric machine M1 eliminates the need to magnetically divide the armature cores H1 and H2 in the rotation direction. As such, the intensity of the armature cores H1 and H2 can be increased. Further, magnetic fluxes are formed in two circuits of the magnetic circuit including the core coupling portion L and the magnetic circuit including two magnetic pole groups located away from each other in the rotation direction (e.g., magnetic pole groups G1u, G1v). As such, the magnetic saturation of the magnetic circuit can be reduced. This serves to narrow the width of the yoke portions 33c and 34c and easily reduce the armature portion Am1 in size and weight, for example. This is particularly advantageous when increasing the number of magnetic poles 33a and 34a constituting the magnetic pole groups G1 and G2. Further, the magnetic fluxes that saturate the magnetic circuit can be increased without increasing the width of the yoke portions 33c and 34c, and thus the current supplied to the coil CL can be increased and the output torque of the rotary electric machine can be increased. These advantages can also be obtained in the axial gap type rotary electric machine and the linear electric machine to be described later.

The magnetic pole groups G1 and G2 are located radially inward with respect to the magnetic field portion Fs. As shown in FIGS. 1C and 1D, the core coupling portion L is located inside of the magnetic pole groups G1 and G2. More specifically, the position of the core coupling portion L in the rotation direction coincides with the center of the magnetic pole groups G1 and G2 in the rotation direction. This structure serves to prevent the magnetic fluxes Φ1 and Φ2 flowing through the two magnetic pole groups in the rotation direction and the magnetic flux Φ7 flowing through the core coupling portion L from interfering with each other. This serves to efficiently use the magnetic flux flowing through two magnetic circuits to obtain the torques.

In the rotary electric machine M1, the first armature core H1 is disposed between the two second armature cores H2, and thus, the two magnetic circuits arranged in the axis direction are formed. This arrangement serves to lower the density of the magnetic flux flowing the magnetic field cores 22N and 22S in the axis direction, or reduce the cross-sectional area of magnetic field cores 22N and 22S (cross-sectional area in a plane perpendicular to the axis direction). The coil CL is provided in the first armature core H1 and the coil is not provided in the second armature core H2. As such, an optimum shape for each of the first armature core H1 and the second armature core H2 can be selected, and the flexibility in shape is increased. The position of the coil CL is not limited to the example of the rotary electric machine M1 if both of the two types of magnetic fluxes Φ1, Φ2, and Φ7 described above pass therethrough. For example, the coils CL may be provided in both the magnetic pole group G1 of the first armature core H1 and the magnetic pole group G2 of the second armature core H2, or some of the coils CL may be provided in the magnetic pole group G1 of the first armature core H1 and some of the rest of the coils CL may be provided in the magnetic pole group G2 of the second armature core H2. When the coils CL are provided in both of the magnetic pole group G1 of the first armature core H1 and the magnetic pole group G2 of the second armature core H2, for example, the winding direction of the coils CL provided in the magnetic pole group G1u of the first armature core H1 is opposite to the winding direction of the coils CL provided in the magnetic pole group G2u of the second armature core H2.

[Change in Magnetic Flux]

When the magnetic field portion Fs is rotated by 30 degrees (electrical angle) from the position indicated in FIG. 3B toward the magnetic pole groups G1v and G2v, the magnetic flux formed by the magnets Mg of the magnetic field portion Fs changes. Specifically, the magnetic poles 33a and 34a constituting the magnetic pole groups G1v and G2v face the magnets Mg of the magnetic field portion Fs. As such, the magnetic flux does not flow through the magnetic circuit including the magnetic pole groups G1u and G1v of the first armature core H1, the magnetic field cores 22S and 22N and the magnets Mg of the magnetic field portion Fs, and the magnetic pole groups G2u and G2v of the second armature core H2. Further, the magnetic flux does not flow through the magnetic circuit including the magnetic pole group G1v of the first armature core H1, the core coupling portion L, the magnetic pole group G2v of the second armature core H2, the magnetic field cores 22N and 22S, and the magnets Mg between the two magnetic field cores 22N and 22S.

When the magnetic field portion Fs is rotated by 60 degrees (electrical angle) from the position indicated in FIG. 3B toward the magnetic pole groups G1v and G2v, the magnetic flux formed by the magnets Mg of the magnetic field portion Fs further changes. Specifically, the magnetic poles 33a and 34a constituting the magnetic pole groups G1v and G2v face the magnetic field cores 22N and 22S of the magnetic field portion Fs (the opposing polarity is changed from that in FIG. 3B). As such, the magnetic flux does not flow through the magnetic circuit including the magnetic pole groups G1v and G1w of the first armature core H1, the magnetic field cores 22S and 22N and the magnets Mg of the magnetic field portion Fs, and the magnetic pole groups G2v and G2w of the second armature core H2. Further, the magnetic flux flowing through the magnetic circuit including the magnetic pole group G1v of the first armature core H1, the core coupling portion L, the magnetic pole group G2v of the second armature core H2, the magnetic field cores 22N and 22S, and the magnets Mg between the two magnetic field cores 22N and 22S is formed (the direction in which the magnetic flux flows is opposite to that in FIG. 3B). In this way, as the magnetic field portion Fs rotates, the magnetic path of the magnetic flux passing through the inside of the coils CLu, CLv, and CLw of U, V, and W phases changes. Further, the amount and direction of the magnetic flux flowing through the magnetic path also changes. Specifically, the magnetic flux passing through the inside of the coils CLu, CLv, and CLw of U, V, and W phases changes in a substantially sinusoidal fashion shifted by 120 degrees at electrical angle.

[Material of Armature Portion]

In the rotary electric machine M1, the armature cores H1 and H2 are laminated steel sheets. That is, the entire first armature core H1 is composed of a plurality of steel sheets Sp1 laminated in the axis direction (more specifically, electrical steel sheets) and the entire second armature core H2 is also composed of a plurality of steel sheets Sp1 laminated in the axis direction (more specifically, electrical steel sheets). This structure of the armature cores H1 and H2 prevents the induced current in the armature cores H1 and H2 from occurring due to the magnetic flux flowing between two magnetic pole groups G1 located away from each other in the rotation direction.

The core coupling portion L is also laminated steel sheets including a plurality of laminated steel sheets Sp2 (more specifically, electrical steel sheets). The direction in which the steel sheets Sp2 of the coupling portion L are laminated is different from the direction in which the steel sheets Sp1 of the armature core H1 and H2 are laminated. Specifically, as shown in FIGS. 1A and 1E, the steel sheets Sp2 of the core coupling portion L are disposed along the direction in which the armature core H1 and H2 are separated, in other words, the direction of the magnetic flux Φ7, and the direction in which the steel sheets Sp2 are laminated is the rotation direction (machine moving direction) of the rotary electric machine M1. In the rotary electric machine M1, the steel sheets Sp2 of the core coupling portion L are disposed along the axis direction, and are laminated in the rotation direction (more specifically, in the tangential direction of the rotation). Such structure of the core coupling portion L prevents induced current from occurring in the core coupling portion L due to the magnetic flux Φ7 flowing between the magnetic pole groups G1 and G2 in the axis direction.

As will be described in detail later, the entire armature cores H1 and H2 may be formed of a soft magnetic powder material, or a majority of the armature cores H1 and H2 may be formed of laminated steel sheets and a part of the armature cores may be formed of a soft magnetic powder material. The core coupling portion L may also be formed of a soft magnetic powder material. In this case, the core coupling portion L may be integrally formed with the armature core H1 (or H2) that is also formed of a soft magnetic powder material.

[Modification of the Number of Armature Cores]

The number of armature cores may be more than three. The armature portion may include, for example, two first armature cores H1 that are located away from each other in the axis direction, a third armature core disposed between the two first armature cores H1, and two second armature cores H2 that are respectively disposed above and below the two first armature cores H1. The third armature core may have a structure of two second armature cores H2 combined in the axis direction. For example, the width of the third armature core in the axis direction may be the sum of the widths of the two armature cores H2. The width of the magnetic field portion Fs in the axis direction may correspond to the width of the entire five armature cores in the axis direction. The armature portion may have a structure of more armature cores (e.g., seven or nine armature cores) laminated in the axis direction.

The number of armature cores may be less than three. For example, the armature portion may include one first armature core H1 and one second armature core H2. The second armature core H2 of the armature portion may have a structure of two second armature cores H2, which are described referring to FIG. 1A, combined in the axis direction. That is, the width of the second armature core H2 in the axis direction may be the sum of the widths of the two armature cores H2 shown in FIG. 1A. The second armature core H2 may be disposed on one side (upper side or lower side in these drawings) of the first armature core H1. Such a structure serves to reduce the number of components, and, because the coil CL is exposed, facilitate the work to connect the members for supplying a current to the coil CL (e.g., bus bar) with the coil CL.

In the armature portion, a plurality of armature cores having the same structure may be disposed in the axis direction. This provides advantages such as reduced number of parts and reduction of cost for molding. In this case, the number of magnetic poles of each magnetic pole group included in one armature core and the number of magnetic poles included in each magnetic pole group included in the other armature core are the same. The two armature cores may be disposed such that the positions of the magnetic poles are shifted by 180 degrees at electrical angle.

[Induced Current Prevention Structure]

The armature cores H1 and H2 include fitting holes 33h and 34h penetrating the cores H1 and H2 in the lamination direction of their steel sheets Sp1 (see FIG. 1B). The core coupling portions L are fitted into the fitting holes 33h and 34h. As shown in FIGS. 1C and 1D, the armature cores H1 and H2 have slits S3 and S4. The slits S3 and S4 prevent induced current from occurring in the armature cores H1 and H2 due to the magnetic flux $\Phi7$ (see FIG. 3B) flowing through the core coupling portion L.

Figure 4:
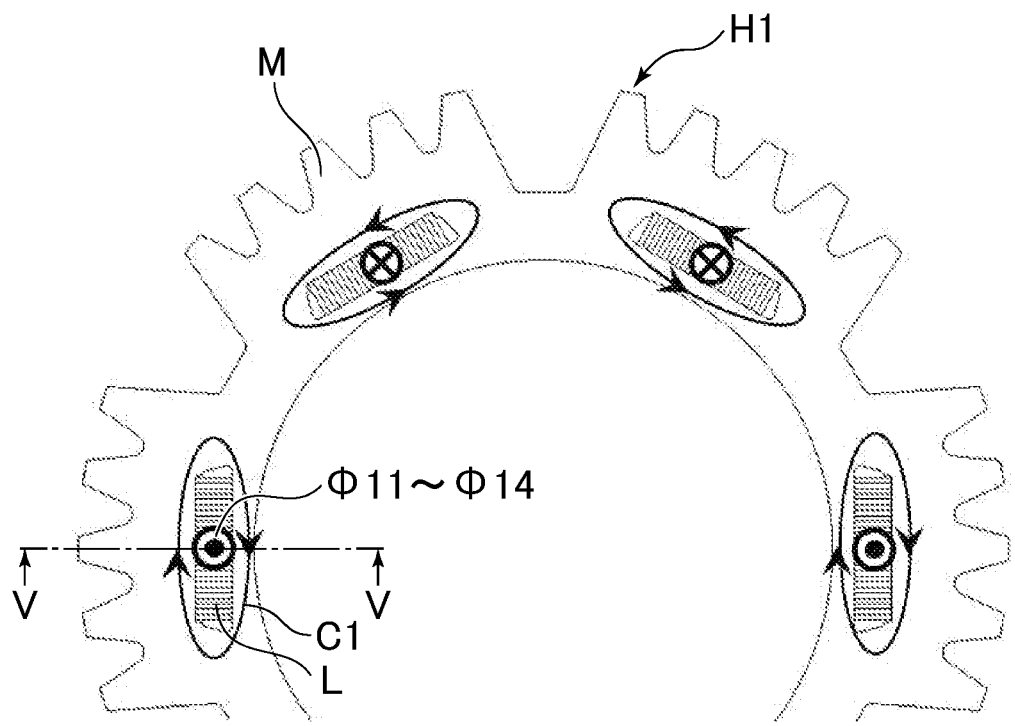
FIG. 4 is a diagram illustrating e structure for preventing generation of an induced current in the armature core.
Figure 5:
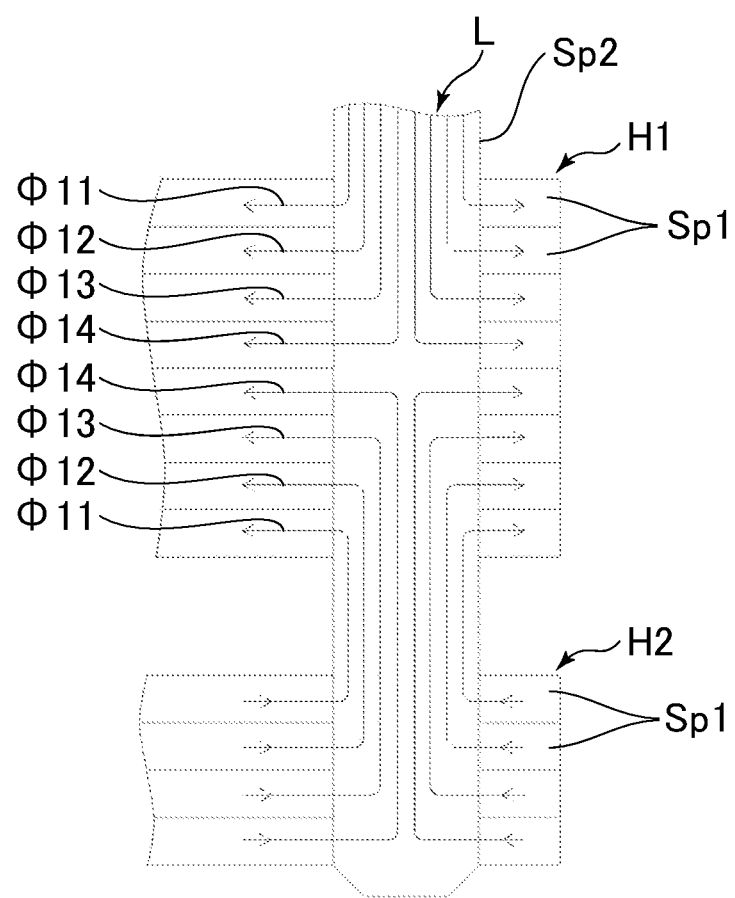
FIG. 5 is a cross section of e structure for preventing generation of an induced current in the armature core.

FIGS. 4 and 5 illustrate structures for preventing the generation of induced current in the armature cores H1 and H2. FIG. 5 is a cross-sectional view of the armature core taken along the V-V line of FIG. 4. The slits S3 and S4 are not formed in the armature cores H1 and H2 in FIGS. 4 and 5. As shown in FIG. 5, the magnetic fluxes $\Phi11$ to $\Phi14$ flowing from the steel sheets Sp2 of the core coupling portion L to the steel sheets Sp1 of the armature core H1 are formed. As shown in FIG. 4, the magnetic fluxes $\Phi11$ to $\Phi14$ generate an induced current C1 around the core coupling portion L. As shown in FIGS. 1C and 1D, the slits S3 and S4 described above are formed in the armature cores H1 and H2. The slits S3 and S4 intersects a closed curve extending from the fitting holes 33h and 34h, in which the respective core coupling portions L are fitted, to the direction intersecting with the lamination direction of the steel sheets Sp1 of the armature core H1 (radial direction in the rotary electric machine M1) and surrounding the fitting holes 33h and 34h. In the present specification, the "closed curve surrounding the fitting holes" is, for example, a circle or an ellipse surrounding the fitting holes 33h and 34h, but is not limited thereto, and may have a shape corresponding to the shape of the fitting holes 33h and 34h into which the core coupling portions L are fitted. In the example of the rotary electric machine M1, the slits S3 and S4 extend towards the magnetic field portion Fs and reach the opening on the side of the magnetic field portion Fs of the armature cores H1 and H2. As such, the slits S3 and S4 can prevent the generating of the induced current C1. In the rotary electric machine M1, the magnetic field portion Fs is disposed outside of the armature portion Am1, and thus the slits S3 and S4 extend radially outward from the fitting holes 33h and 34h.

Figure 6:
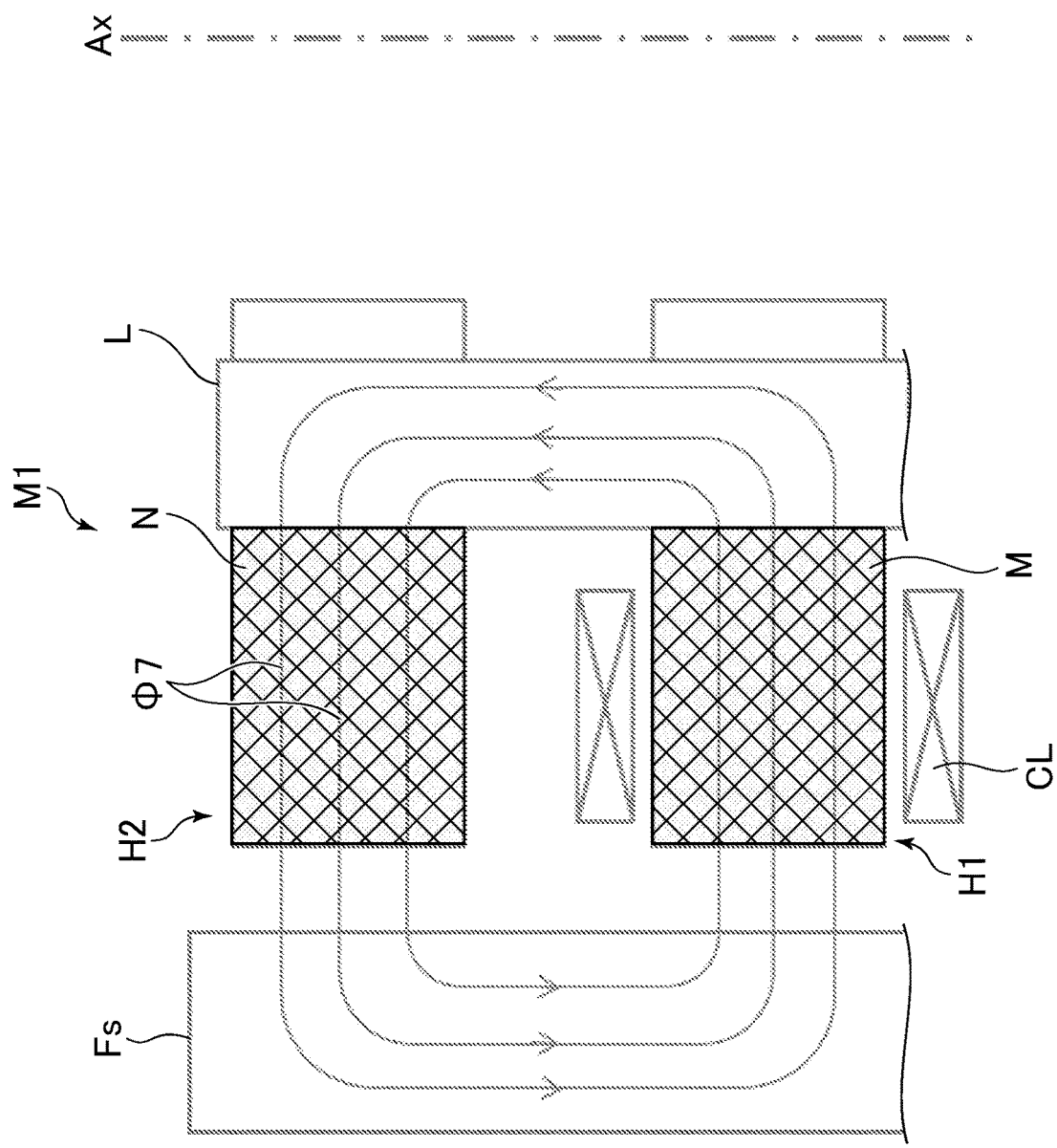
FIG. 6 is a diagram illustrating generation of an induced current and schematically shows cross sections of the armature core and a core coupling portion. The magnetic flux flowing through a magnetic circuit including the core coupling portion is shown.

FIG. 6 is a schematic cross-sectional view of the armature cores H1 and H2 and the core coupling portion L. The magnetic flux $\Phi7$ in FIG. 6 is the magnetic flux flowing through the magnetic circuit including the core coupling portion L as shown in FIG. 3B. In the rotary electric machine M1, there exist a magnetic flux $\Phi7$ flowing through the core coupling portion L and magnetic fluxes $\Phi1$ and $\Phi2$ (see FIG. 3B) passing through the yoke portion 33c and 34c of the armature core H1 and H2. As such, the sum of the magnetic fluxes $\Phi7$ formed respectively for the three phases of the U phase, the V phase, and the W phase is not zero. For example, the magnetic flux $\Phi7$ flowing through the core coupling portions L from the first armature core H1 toward the second armature core H2 is larger than the magnetic flux $\Phi7$ flowing through the core coupling portions L from the second armature core H2 toward the first armature core H1, or vice versa.

If the slit S3 is not formed, a closed circuit (a circuit in which the induced current C2 flows in FIG. 8) is formed between the core coupling portions L and the magnetic field portion Fs and passes through the entire first armature core H1 about the axis Ax. Similarly, If the slit S4 is not formed, a closed circuit is formed between the core coupling portions L and the magnetic field portion Fs and passes through the entire second armature core H2 about the axis Ax. In FIG. 6, the closed circuit in the rotation direction is formed in portions M and N (shaded portions) between the core coupling portion L and the magnetic field portion Fs. As described above, the sum of the magnetic fluxes $\Phi7$ flowing through all the core coupling portions L is not zero, and thus an induced current is formed in the closed circuit due to the magnetic flux $\Phi7$. In this regard, in the rotary electric machine M1, the slits S3 and S4 extend between the fitting holes 33h and 34h disposed in the rotation direction and the magnetic pole groups G1 and G2 disposed in the rotation direction and intersect with the closed curve surrounding the axis Ax. In the present specification, the "closed curve surrounding the axis Ax" is, for example, a circle centered on the axis Ax, but may be a curve having a bypass portion that avoids the fitting holes 33h and 34h (see e.g., line C2 in FIG. 8). The slits S3 and S4 extend towards the magnetic field portion Fs and reach the opening on the side of the magnetic field portion Fs of the armature cores H1 and H2. As such, the closed circuit passing through the entire armature cores H1 and H2 is interrupted by the slits S3 and S4, which prevent the induced current C2 (see FIG. 8) in the rotation direction from occurring in the armature cores H1 and H2.

In the armature cores H1 and H2, the slits S3 and S4 may be filled with an electrically insulating material. For example, in a case where the entire armature cores H1 and H2 are molded with resin, the slits S3 and S4 are filled with resin (electrically insulating material). The slits S3 and S4 may be electrically insulated, and are desirably narrowed in width to reduce the magnetic resistance.

Figure 7:
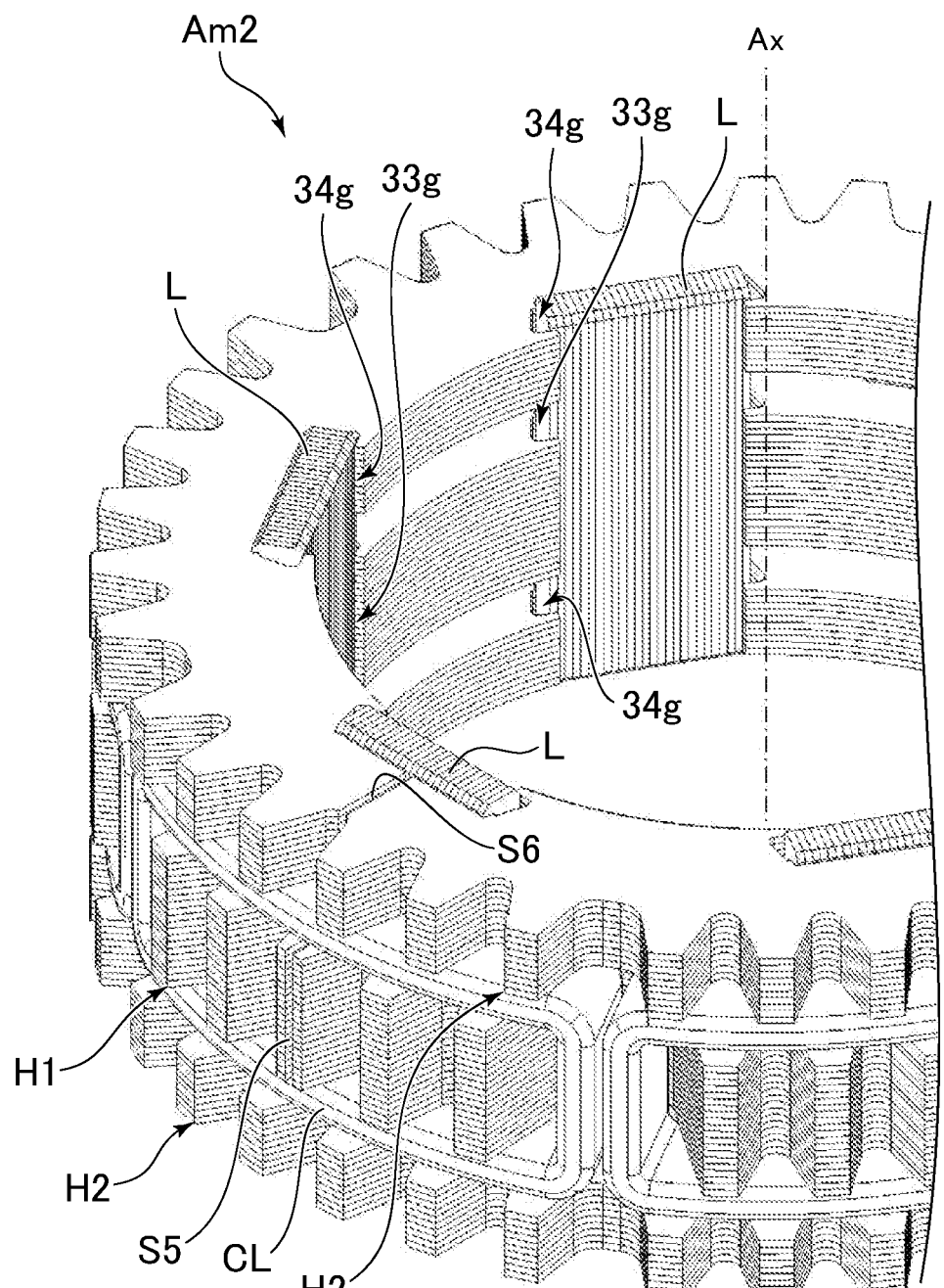
FIG. 7 is a perspective view of a rotary electric machine according to a second example.

The fitting holes 33h and 34h are through holes having a closed inner surface, and the slits S3 and S4 shown in FIGS. 1C and 1D extend from the fitting holes 33h and 34h. The structure for preventing the generation of the induced current is not necessarily limited to the slits S3 and S4. As shown in FIG. 7, the armature cores H1 and H2 may be provided with fitting holes 33g and 34g that are open in a direction intersecting the lamination direction of the steel sheets Sp1. In the example of FIG. 7, the fitting holes 33g and 34g are open opposite to the magnetic field portion Fs. The fitting holes 33g and 34g can prevent the induced current C1 (see FIG. 8) from occurring around the respective core coupling portions L. Further, such an arrangement of the core coupling portions L serves to increase the distance from the magnetic pole groups G1 and G2 to the fitting holes 33g and 34g, and thereby more effectively preventing the yoke portion 33c and 34c from being saturated by the magnetic flux flowing in the rotation direction.

Figure 8:
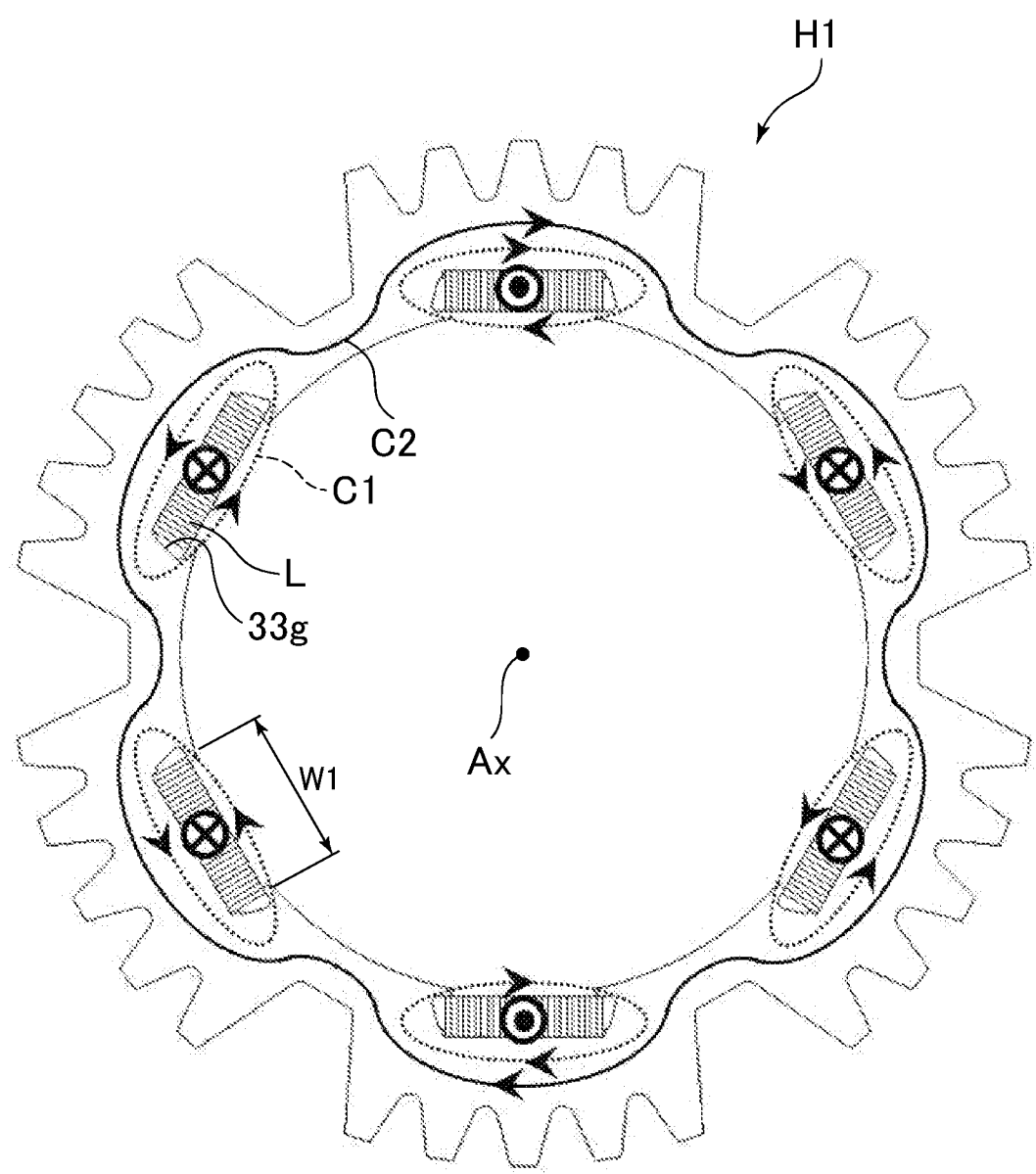
FIG. 8 is a diagram illustrating the generation of an induced current and indicating a closed circuit that circulates around the entire first armature core.

As shown in FIG. 7, the width of the opening of the fitting holes 33g and 34g in the rotation direction (width W1 in the rotation direction in the rotary electric machine M1, see FIG. 8) is greater than half the width in the rotation direction of the core coupling portion L. More preferably, the width W1 of the opening of the fitting holes 33g and 34g in the rotation direction substantially corresponds to the width of the core coupling portion L in the rotation direction. This structure serves to prevent an induced current from occurring around the end portion of the core coupling portion L due to the magnetic flux $\Phi7$ passing through the end portion of the core coupling portion L in the rotation direction. In the example shown in FIG. 7, the edge of the opening of the fitting holes 33g and 34g is in contact with only one or two of the steel sheets Sp2 disposed at the end portion of the core coupling portion L, and the rest of the steel sheets Sp2 is exposed from the opening of the fitting holes 33g and 34g.

The armature cores H1 and H2 may include slits extending from the fitting holes 33h and 34h (see FIG. 1B) into which the core coupling portions L are fitted toward the magnetic field portion Fs instead of the fitting holes 33g and 34g that are open in the radial direction. This structure also serves to prevent an induced current C1 from occurring around the respective core coupling portions L.

Figure 9A:
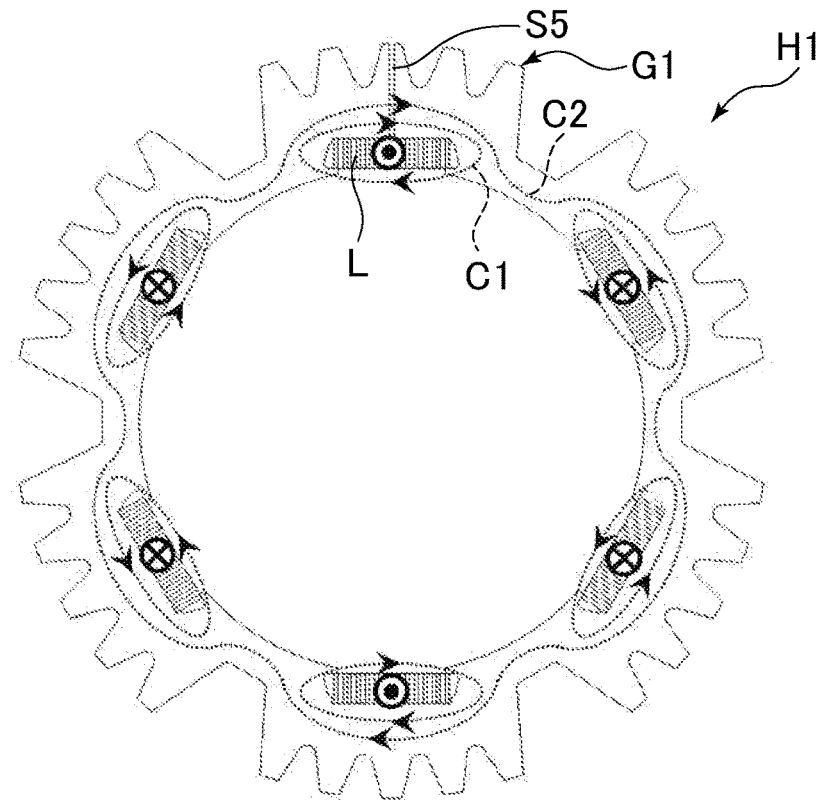
FIG. 9A is a diagram illustrating a slit for preventing generation of an induced current shown in FIG. 8 and is a plane view of the first armature core shown in FIG. 7.

As shown in FIG. 7, in the structure in which the fitting holes 33g and 34g are open toward the opposite side to the magnetic field portion Fs, the closed circuit (a circuit in which the induced current C2 flows in FIG. 8) is formed between the core coupling portions L and the magnetic field portion Fs and passes through the entire armature cores H1 and H2 about the axis Ax. As such, an induced current C2 (see FIG. 8) is generated in the closed circuit due to the magnetic flux Φ7 shown in FIG. 6. In this regard, as shown in FIGS. 7 and 9A, slits S5 and S6 may be formed in the armature cores H1 and H2. The slits S5 and S6 intersect the closed curve passing between the fitting holes 33g and 34g disposed in the rotation direction and the magnetic pole groups G1 and G2 disposed in the rotation direction and surrounding the axis Ax. The closed circuit passing through the entire armature cores H1 and H2 around the axis Ax is interrupted by the slits S5 and S6, which prevent the induced current C2 (see FIG. 8) in the rotation direction from occurring in the armature cores H1 and H2. For example, the slit S5 extends from one of the fitting holes 33g toward the magnetic field portion Fs and reaches the opening of the magnetic field portion Fs. More specifically, the slit S5 extends from the center of the fitting hole 33g in the rotation direction toward magnetic pole group G1. Similarly, a slit S6 (see FIG. 7) extends from one of the fitting holes 34g toward the magnetic field portion Fs and reaches the opening of the magnetic field portion Fs, for example.

Figure 9B:
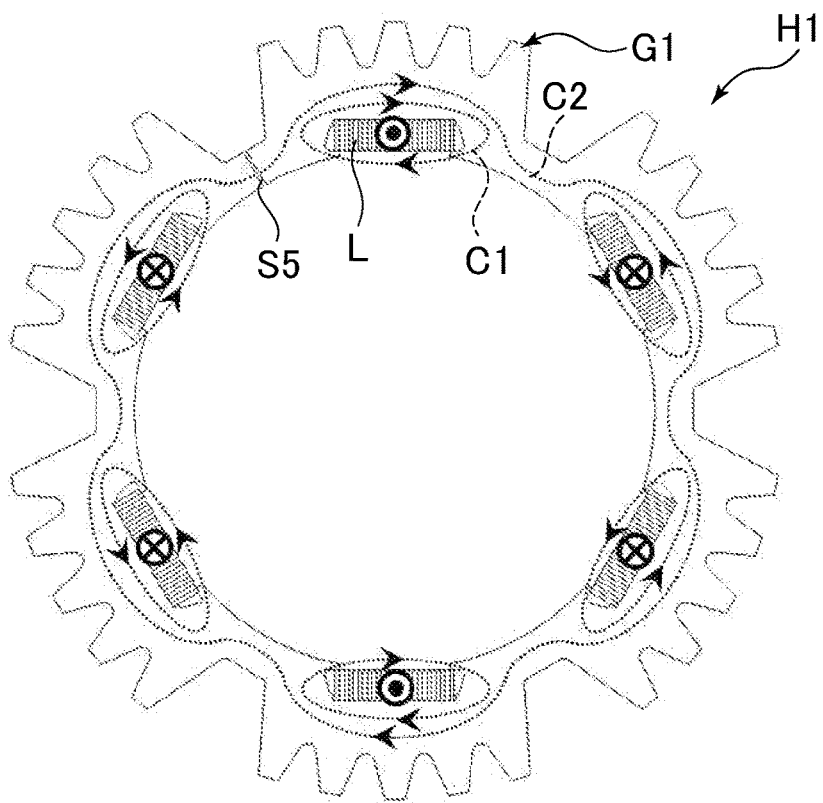
FIG. 9B is a diagram illustrating a modification of the first armature core shown in FIG. 8.

The slits S5 and S6 may not necessarily be connected to the fitting holes 33g and 34g. For example, as shown in FIG. 9B, the slit S5 may be formed between two adjacent magnetic pole groups G1. The slit S5 extends from the edge of the first armature core H1 on the magnetic field portion Fs side and reaches the opposite edge. Similarly to the slit S5 shown in FIG. 9B, the slit S6 of the second armature core H2 may also be formed between two adjacent magnetic pole groups G2. The slits S5 and S6 also extend between the fitting holes 33g and 34g disposed in the rotation direction and the magnetic pole groups G1 and G2 disposed in the rotation direction and intersect with the closed curve surrounding the axis Ax. This structure prevents an induced current from occurring in the rotation direction in the armature cores H1 and H2. The slits S5 and S6 may be electrically insulated, and are desirably narrowed in width to reduce the magnetic resistance.

When the core coupling portion L and the inner surfaces of the fitting holes 33h and 34h are electrically connected to each other, a magnetic flux passing through a portion located rightward of the part of the core coupling portion L (a part located rightward of the slit S3 and a part located leftward of the slit S3) forms a closed circuit surrounding the magnetic flux, and an induced current C3 (see FIG. 1D) may be generated therein. As such, a space (insulating portion) may be partially formed between the core coupling portion L and the inner surfaces of the fitting holes 33h and 34h. This serves to reduce such an induced current C3.

The steel sheets Sp2 (see FIG. 1A) constituting the core coupling portion L are laminated in the machine moving direction (rotation direction) of the rotary electric machine M1. Unlike the example of the rotary electric machine M1, if the steel sheets Sp2 of the core coupling portion L are laminated in the radial direction, an induced current due to the magnetic flux Φ7 is likely to be generated in the steel sheets Sp2 located at the end in the radial direction. In this regard, the steel sheets Sp2 of the core coupling portion L are laminated in the radial direction in the rotary electric machine M21, and such an induced current can be thus prevented.

[Example of Magnetic Field Portion Disposed Inside of Armature Core]

Figure 10:
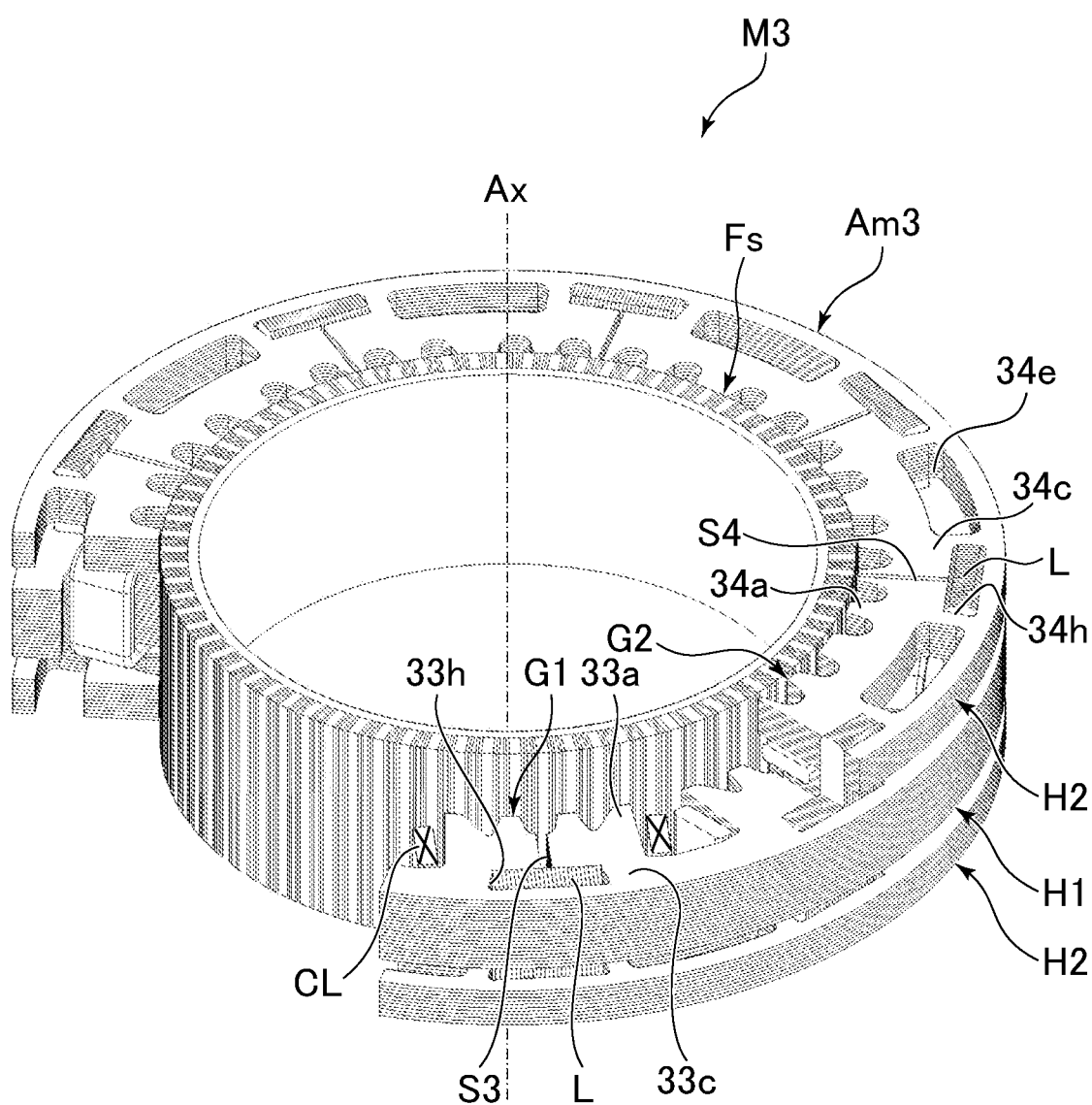
FIG. 10 is a perspective view of a rotary electric machine according to a third example. An armature portion is disposed on the outer side of the magnetic field portion.

FIG. 10 is a perspective view of a rotary electric machine disclosed in the present disclosure indicating an example in which an armature portion Am3 is disposed outside the magnetic field portion Fs. In FIG. 10, a part of the rotation direction of armature portion Am3 is not shown. In the following, differences from the rotary electric machine M1 shown in FIG. 1A will be mainly described. The structure of the rotary electric machine M1 shown in FIG. 1A may be applied to the matters that are not described in the rotary electric machine M3 shown in FIG. 10.

In the armature portion Am3, similarly to the armature portion Am1, the first armature core H1 is also disposed between the two second armature cores H2. The armature cores H1 and H2 has annular yoke portions 33c and 34c and a plurality of magnetic pole groups G1 and G2 formed inside the yoke portions 33c and 34c and disposed in the rotation direction. Each magnetic pole groups G1 and G2 includes a plurality of magnetic poles 33a and 34a protruding toward the magnetic field portion Fs and disposed in the rotation direction. A coil CL is wound around the magnetic poles 33a constituting the magnetic pole group G1. The outer diameter of the yoke portion 34c of the second armature core H2 may coincide with the outer diameter of the yoke portion 33c of the first armature core H1. In this manner, when the armature portion Am3 is fixed to the structure of the device on which the rotary electric machine M3 is mounted, such a fixing structure can be simplified and accurately enhanced.

In the example of FIG. 10, each magnetic pole group G1 has four magnetic poles 33a and each magnetic pole group G2 has five magnetic poles 34a, although these numbers may be changed as appropriate. A magnetic pole 34a disposed at the end of the magnetic pole group G2 may be integral with a magnetic pole 34a of the adjacent magnetic pole group G2.

Conditions for the angle (mechanical angle and electrical angle) between two adjacent magnetic pole group pair P may be similar to the example shown in FIG. 2. As described above, the angle between two adjacent magnetic pole group pairs P is an electrical angle of substantially "360×(n+m/s)" degrees, and a mechanical angle of "(360/p)×(n+m/s)" degrees is ensured between two adjacent magnetic pole group pairs P (as described above, the mechanical angle is also expressed as "360/s/c"), where "s" is the number of phases,
"m" is an integer equal to or greater than 1 and equal to or less than s−1, where the integer is other than a divisor of s (except 1) and other than multiples of the divisor (except 1),
"n" is an integer equal to or greater than 1,
"p" is (number of poles of magnetic field portion)/2, and
"c" is the number of coils for each phase.

In the example of FIG. 10, s=3, n=4, m=1, c=3, and p=39. The winding direction of the coil CL provided in each of the phases may be the same similarly to the winding direction described in FIG. 1A. For example, the winding directions of the coils CLu of three U phases are the same.

The armature portion Am3 also has a plurality of core coupling portions L disposed in the rotation direction (i.e., machine moving direction) at intervals. The armature portion Am3 has one first armature core H1 and two second armature cores H2, and the core coupling portion L magnetically couples these three armature cores H1 and H2. Alternatively, the armature portion Am3 may have a first core coupling portion L that couples the first armature core H1 and the upper second armature core H2, and a second core coupling portion L that couples the first armature core H1 and the lower second armature core H2.

As shown in FIG. 10, the core coupling portion L is located opposite to the magnetic field portion Fs across the magnetic pole group pair P (e.g., magnetic pole groups G1$u$ and G2$u$) and the coil CL provided thereon. In other words, the core coupling portion L is located radially outward of the magnetic pole groups G1 and G2. The position of the core coupling portion L in the rotation direction may coincide with the center of the magnetic pole groups G1 and G2 in the rotation direction. This serves to prevent the magnetic flux flowing through the two magnetic pole groups located away from each other in the rotation direction from interfering with the magnetic flux flowing through the core coupling portion L.

The fitting holes 33$h$ and 34$h$ are formed in the yoke portions 33$c$ and 34$c$ of the armature cores H1 and H2 so as to pass through the yoke portions 33$c$ and 34$c$ in the axis direction. The core coupling portions L are fitted into the fitting holes 33$h$ and 34$h$. In the second armature core H2, a hole 34$e$ may be formed between two adjacent fitting holes 34$h$ (two adjacent core coupling portions L). This can prevent increase in the weight of the second armature core H2.

In the rotary electric machine M3 as well, two types of magnetic circuits are formed. Similarly to the rotary electric machine M1 described in FIG. 3B, one of the first magnetic circuits includes, for example, the magnetic pole groups G1$u$ and G1$v$ of the first armature core H1, the magnetic pole groups G2$u$ and G2$v$ of the second armature core H2, the magnetic field cores 22N and 22S, and the magnets Mg between the two magnetic field cores 22N and 22S. Another one of the first magnetic circuits also includes the magnetic pole groups G1$u$ and G1$w$ of the first armature core H1, the magnetic pole groups G2$u$ and G2$w$ of the second armature core H2, the magnetic field cores 22N and 22S, and the magnets Mg between the two magnetic field cores. The second magnetic circuit includes the magnetic pole group G1$u$ of the first armature core H1, the core coupling portion L, the magnetic pole group G2$u$ of the second armature core H2, the magnetic field cores 22N and 22S, and the magnets Mg between the two magnetic field cores 22N and 22S.

Similarly to the armature portion Am1 in FIG. 1A, in the armature portion Am3, the width of the core coupling portion L in the rotation direction (machine moving direction) is also smaller than widths of the magnetic pole groups G1 and G2 in the rotation direction. As such, both the magnetic flux Φ7 (see FIG. 3B) flowing through the core coupling portion L and the magnetic fluxes Φ1 and Φ2 (see FIG. 3B) flowing between the two magnetic pole groups located away from each other in the rotation direction are more effectively formed.

In the armature portion Am3 as well, similarly to the structure shown in FIGS. 1C and 1D, at least two magnetic poles 33$a$ at both ends of magnetic poles 33$a$ constituting each magnetic pole group G1 are located outward of both ends Le of the core coupling portion L (clockwise direction and counterclockwise direction), and at least two magnetic poles 34$a$ at both ends of magnetic poles 34$a$ constituting each magnetic pole group G2 are located outward of both ends Le of the core coupling portion L (clockwise direction and counterclockwise direction). This serves to easily form the magnetic fluxes Φ1 and Φ2 flowing between the two magnetic pole groups G1 and G2 (see FIG. 3B) located away from each other in the rotation direction.

The armature cores H1 and H2 are laminated steel sheets. As shown in FIG. 10, the armature cores H1 and H2 include slits S3 and S4 respectively extending from the fitting holes 33$h$ and 34$h$. The slits S3 and S4 extend toward the magnetic field portion Fs and reach the edge of the armature cores H1 and H2 on the magnetic field portion Fs side, and are open toward the magnetic field portion Fs. With this structure, the slits S3 and S4 can prevent the induced current C1 (see FIG. 4) from occurring around the respective core coupling portions L. The slits S3 and S4 can prevent the induced current C2 (see FIG. 8) from occurring in the entire armature core H1 in the rotation direction and prevent the induced current from occurring in the entire armature core H2 in the rotation direction.

As opposed to the example of FIG. 7, the fitting holes in which the core coupling portions L are respectively fitted may be open radially outward of the armature cores H1 and H2. In other words, the core coupling portion L may be at least partially exposed radially outward. That is, the fitting holes may be open opposite to the magnetic field portion Fs. This opening prevents the generation of the induced current C1 (see FIG. 4) surrounding the respective core coupling portions L. In such a structure, as shown in FIGS. 9A and 9B, slits S5 and S6 may be formed in the armature cores H1 and H2 so as to pass between the fitting holes in which the core coupling portions L are flitted and the magnetic pole groups G1 and G2 disposed in the rotation direction and intersect the closed curve surrounding the axis Ax.

The armature portion Am1 is disposed inside the magnetic field portion Fs in the example of FIG. 1A, and the armature portion Am3 is disposed outside the magnetic field portion Fs in the example of FIG. 10, although in an example of the rotary electric machine, two armature portions may be disposed inside and outside one magnetic field portion Fs.

[Example of Armature Core Formed of Powder Material]

Figure 11:
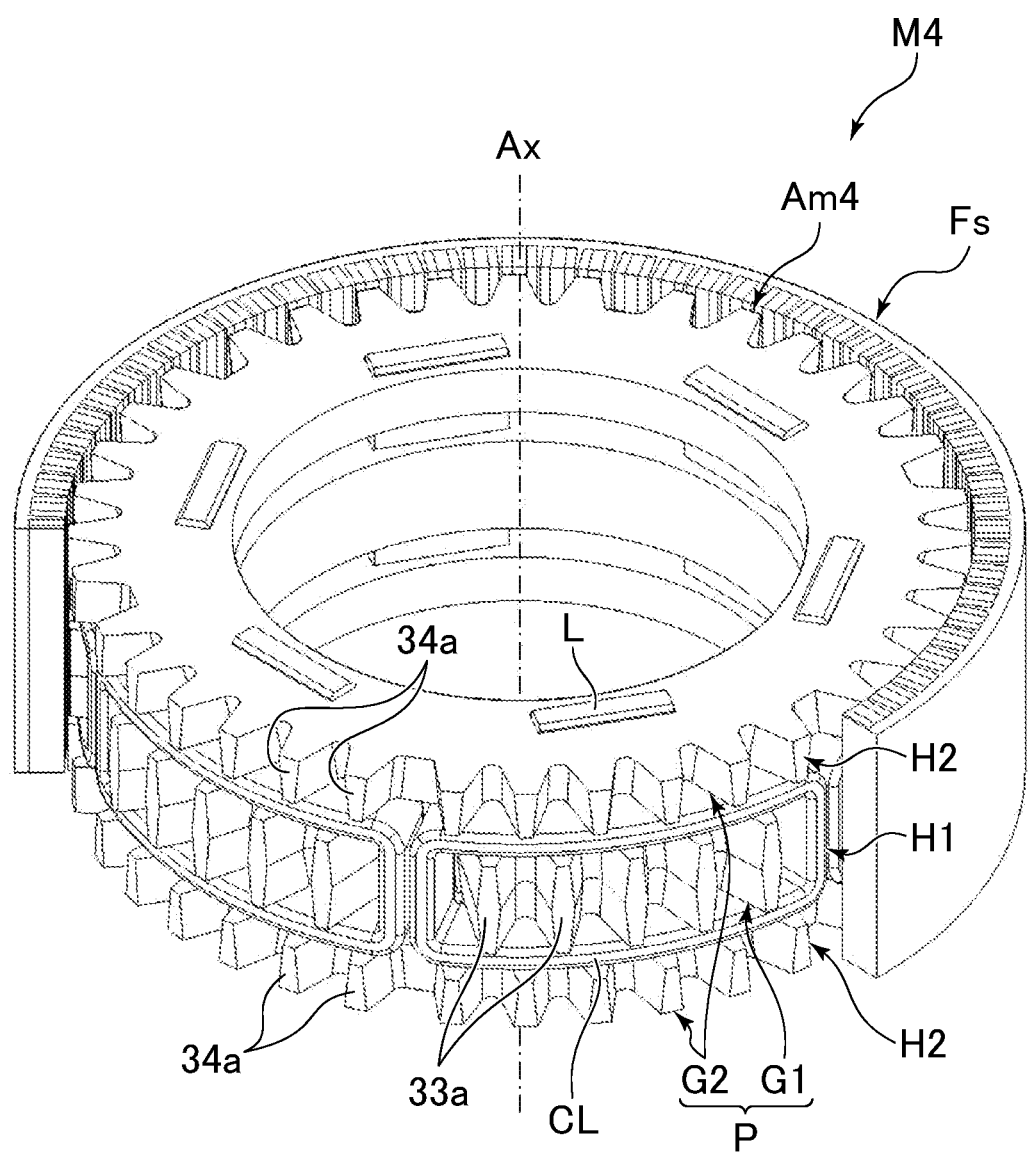
FIG. 11 is a perspective view of a rotary electric machine according to a fourth example. The armature core is formed of a soft magnetic powder material.

The armature core may be formed of a soft magnetic powder material. FIG. 11 shows a rotary electric machine M4 having such a structure as another example of the rotary electric machine proposed in the present disclosure. FIG. 11 is a perspective view of the rotary electric machine M4. A part of the magnetic field portion Fs in the rotation direction is not shown. The structure of the rotary electric machine M1 shown in FIG. 1A may be applied to the matters that are not described in the rotary electric machine M4 shown in FIG. 11. The structure of the armature cores shown in FIG. 11 may be applied not only to the radial gap type rotary electric machine shown therein but also to a linear electric machine and an axial gap type rotary electric machine.

The armature portion Am4 of the rotary electric machine M4 includes armature cores H1 and H2 formed of a soft magnetic powder material (i.e., soft magnetic composite (SMC) material). That is, the armature cores H1 and H2 are formed of a composite material including a soft magnetic powder and an insulating film (e.g., resin film) covering the surface of the powder. The composite material is compression molded and heat treated to form the armature cores H1 and H2. Such armature cores H1 and H2 have a high electrical resistivity, and thus, it is possible to prevent the induced current regardless of the direction of the magnetic flux passing through the armature cores H1 and H2. As such, unlike the rotary electric machine M1 described above, the slits S3, S4, S5, and S6 may not be formed in the armature cores H1 and H2.

Unlike laminated steel sheets, the powder material is produced by using a mold. As such, a high flexibility in the shape of the magnetic poles 33a and 34a can be secured. The widths of the magnetic poles 33a and 34a are changed in the axis direction in the armature portion Am4. The width of the magnetic pole 33a gradually decreases towards the second armature core H2. On the other hand, the width of magnetic pole 34a gradually decreases toward the first armature core H1. This serves to reduce the cogging torque.

The magnetic poles 33a and 34a may also have projecting portions (not shown) extending in the axis direction at the distal ends. This increases the areas of the distal end surfaces of the magnetic poles 33a and 34a (the areas of the surfaces facing the magnetic field portion Fs), and the magnetoresistance caused by the space between the magnetic field portion Fs and the magnetic poles 33a and 34a can be thereby reduced.

The condition on the angle between two adjacent magnetic pole group pairs P (mechanical angle and electrical angle) may be the same as shown in FIG. 2. The winding direction of the coil CL provided in each of the phases may be the same as the winding direction of the example described in FIG. 1, for example. Alternatively, two coils CL having different winding directions may be provided for each of the phases. For example, the winding directions of two U phase coils CLu may be opposite to each other.

As shown in FIG. 11, the rotary electric machine M4 also has a plurality of core coupling portions L disposed in the rotation direction (i.e., machine moving direction) at intervals. The armature portion Am4 has one first armature core H1 and two second armature cores H2, and the core coupling portion L magnetically couples these three armature cores H1 and H2. The core coupling portion L is located opposite to the magnetic field portion Fs across the magnetic pole group pair P (e.g., magnetic pole groups G1 and G2 arranged in the axis direction) and the coil CL provided thereon. The position and size of the core coupling portion L in the rotation direction may be the same as the rotary electric machine M1 shown in FIG. 1A, for example.

The fitting holes 33h and 34h are formed in the yoke portions 33c and 34c of the armature cores H1 and H2 so as to pass through the yoke portions 33c and 34c in the axis direction. The core coupling portions L are fitted into the fitting holes 33h and 34h. Alternatively, the core coupling portions L may be integrally formed with the first armature core H1, for example. In this case, the core coupling portion L may be fitted into the fitting hole 34h formed in the second armature core H2. In contrast, the core coupling portions L may be integrally formed with the second armature core H2. In this case, the core coupling portion L may be fitted into the fitting hole 33h formed in the first armature core H1.

[Example of a Plurality of Core Coupling Portions Provided in Each Magnetic Pole Group]

In the examples of the rotary electric machines M1 to M4, the number of core coupling portions L provided in each magnetic pole group pair P is one. Alternatively, a plurality of core coupling portions L arranged in the rotation direction (machine moving direction) may be disposed in each magnetic pole group pair P. In the examples of the rotary electric machines M1 to M4, the number of magnetic poles 33a and 34a provided in each of the magnetic pole groups G1 and G2 is four to six, although the number of magnetic poles 33a and 34a provided in each of the magnetic pole groups G1 and G2 may be larger. In this case, a plurality of core coupling portions L may be provided in each magnetic pole group pair P. This structure serves to increase the total cross-sectional areas (areas when viewed in the axis direction) of core coupling portions L provided in each magnetic pole group pair P. As such, it is possible to increase the magnetic fluxes passing through the magnetic pole groups G1 and G2 while preventing increase in the width and weight of the yoke portions 33c and 34c.

Figure 12A:
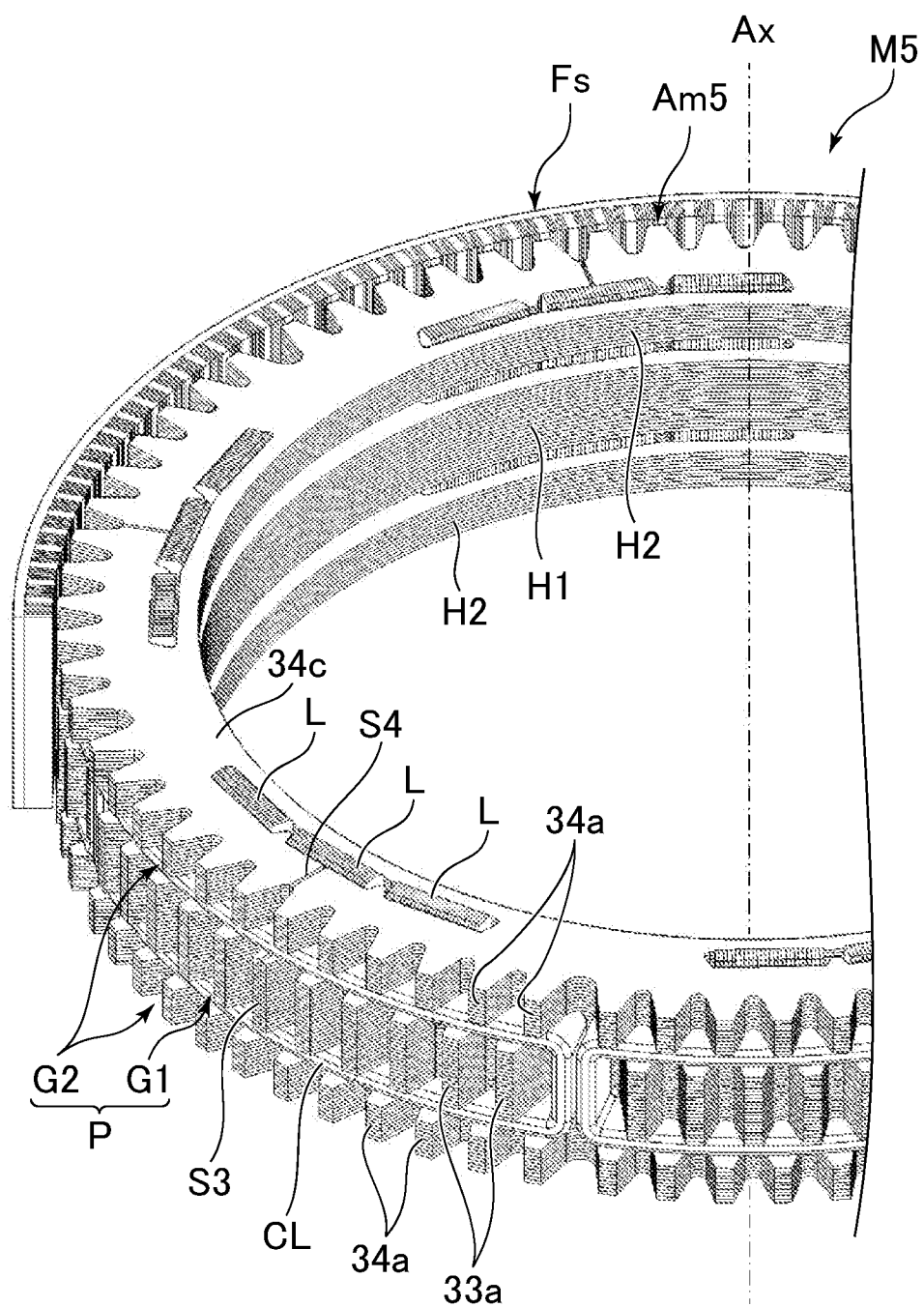
FIG. 12A is a perspective view of a rotary electric machine according to a fifth example. A plurality of core coupling portions are provided in each magnetic pole group pair.
Figure 12B:
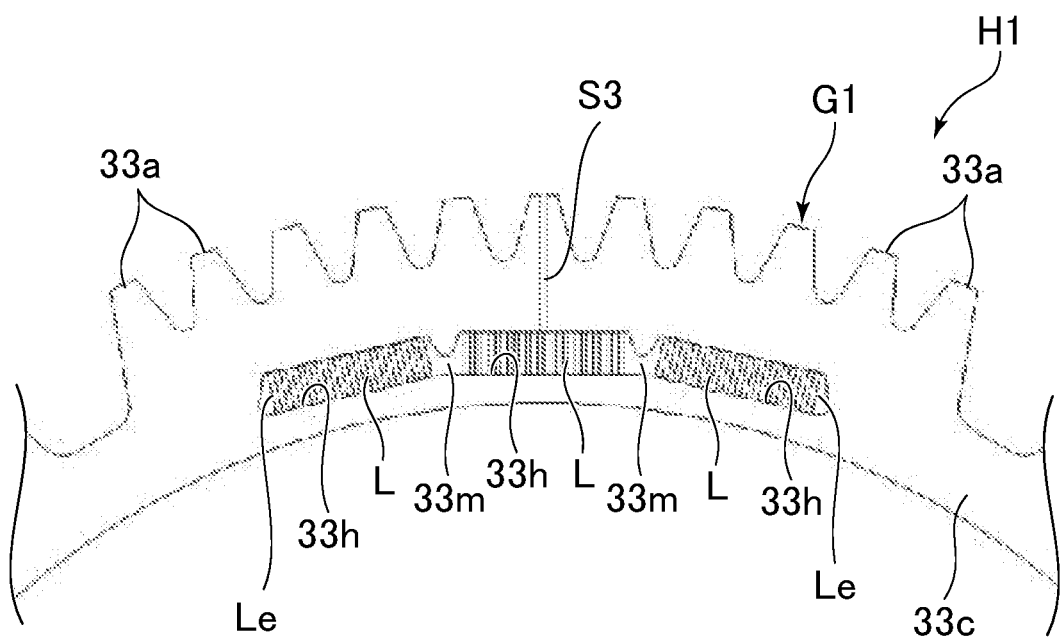
FIG. 12B is a plan view of the armature core of the rotary electric machine shown in FIG. 12A.

FIGS. 12A and 12B are diagrams illustrating a rotary electric machine M5 as an example of a rotary electric machine including an armature core having such a structure. FIG. 12A is a perspective view of a part of the rotary electric machine M5, and FIG. 12B is a plan view of a first armature core H1 of the rotary electric machine M5. In the following, differences from the rotary electric machine M1 shown in FIG. 1A will be mainly described. The structure of the rotary electric machine M1 may be applied to the matters that are not described in the rotary electric machine M5. The structures of the armature cores described herein may be applied not only to the radial gap type rotary electric machine shown therein but also to a linear electric machine and an axial gap type rotary electric machine.

In the rotary electric machine M5, each magnetic pole group G1 has eleven magnetic poles 33a and each magnetic pole group G2 has twelve magnetic poles 34a. Each magnetic pole group G1 includes a coil CL. That is, one coil CL is wound around eleven magnetic poles 33a constituting each magnetic pole group G1. The magnetic pole groups G1 and G2 constituting each magnetic pole group pair P are magnetically coupled by a plurality of core coupling portions L disposed in the rotation direction. In FIG. 12A, the magnetic pole groups G1 and G2 are magnetically coupled with three core coupling portions L. This structure enables changing the angle of two adjacent core coupling portions L and to dispose the core coupling portions L so as to adjust to the curve of the magnetic pole groups G1 and G2 as a whole. The number of core coupling portions L provided in one magnetic pole group pair P may be two or more than three.

As shown in FIG. 12B, it is preferable that at least two magnetic poles 33a located at both ends of the magnetic poles 33a constituting each magnetic pole group G1 are located outward (clockwise direction and counterclockwise direction) of the both ends Le of the three core coupling portions L. In FIG. 12B, the magnetic poles 33a located at the right end (more specifically, two magnetic poles 33a) are located rightward of the right end Le of the three core coupling portions L, and the magnetic poles 33a located at the left end (more specifically, two magnetic poles 33a) are located leftward of the left end Le of the three core coupling portions L. In the second armature core H2, it is preferable that at least two magnetic poles 34a located at both ends of the magnetic poles 34a constituting each magnetic pole group G2 are located outward (clockwise direction and counterclockwise direction) of the both ends Le of the three core coupling portions L. This serves to easily form the magnetic fluxes $\Phi1$ and $\Phi2$ (see FIG. 3B) flowing between the two magnetic pole groups located away from each other in the rotation direction.

As shown in FIG. 12B, three fitting holes 33h into which three core coupling portions L are fitted are connected in the rotation direction through spaces 33m. A slit S3 extending from one of the three fitting holes 33h toward magnetic field portion Fs is formed. The closed curve surrounding the entire three fitting holes 33h intersects with the slit S3. This prevents an induced current surrounding the three core coupling portions L from occurring in the first armature core H1.

Unlike the example of FIG. 12B, the three fitting holes 33*h* may be separated from each other. That is, the space 33*m* may not be formed between two adjacent fitting holes 33*h*. In this case, three slits S3 may respectively extend from the three fitting holes 33*h* toward the magnetic field portion Fs. This prevents an induced current surrounding the three core coupling portions L from occurring in the first armature core H1.

Unlike the example of FIG. 12B, a slit extending from one (or a plurality) of the three fitting holes 33*h* to the opposite side of the magnetic field portion Fs may be formed. In this case, similarly to the example shown in FIG. 9A or 9B, a slit S5 may be formed in the first armature core H1 so as to pass between the fitting holes 33*h* disposed in the rotation direction and the magnetic pole groups G1 disposed in the rotation direction and to intersect with the closed curve surrounding the axis Ax. As shown in FIG. 9A, for example, the slit S5 may extend from one of the fitting holes 33*h* toward the magnetic field portion Fs and open at the edge on the magnetic field portion Fs side. Alternatively, as shown in FIG. 9B, the slit S5 may be formed between two magnetic pole groups G1, for example. The structure described here may be applied to the second armature core H2 of the rotary electric machine M5.

In the rotary electric machine M5, the angle between two adjacent magnetic pole group pairs P is substantially "360× (n+m/s)" degrees in electrical angle, where "s" is the number of phases, "m" is an integer equal to or greater than 1 and equal to or less than s−1, where the integer is other than a divisor of s (except 1) and other than multiples of the divisor (except 1), and "n" is an integer equal to or greater than 1.

In the rotary electric machine M5, s=3, m=1, and n=12. As such, the angle between two adjacent magnetic pole group pairs P is 4,440 degrees in electrical angle.

The mechanical angle of "(360/p)×(n+m/s)" degrees is ensured between two adjacent magnetic pole group pairs P. Further, the angle of two adjacent magnetic pole group pairs P can also be expressed as the mechanical angle of "360/s/c" degrees, where "p" is (number of poles of magnetic field portion)/2, and "c" is the number of coils for each phase.

Accordingly, "(360/p)×(n+m/s)" is substantially equal to "360/s/c". The "number of poles of magnetic field portion" corresponds to the number of magnetic field cores 22N and 22S of the magnetic field portion Fs, and, for example, 148 in the rotary electric machine M1 (p=74). Further, s=3 and c=2. As such, the angle between two adjacent magnetic pole group pairs P is about 60 degrees in mechanical angle. In other words, the number of poles (p×2) of magnetic field portion Fs, the number of coils (s×c) of armature portion, and the number of magnetic poles 33*a* and 34*a* are set such that "(360/p)×(n+m/s)" is substantially equal to "360/s/c".

[Example of Armature Core Composed of a Plurality of Partial Cores]

Figure 13A:
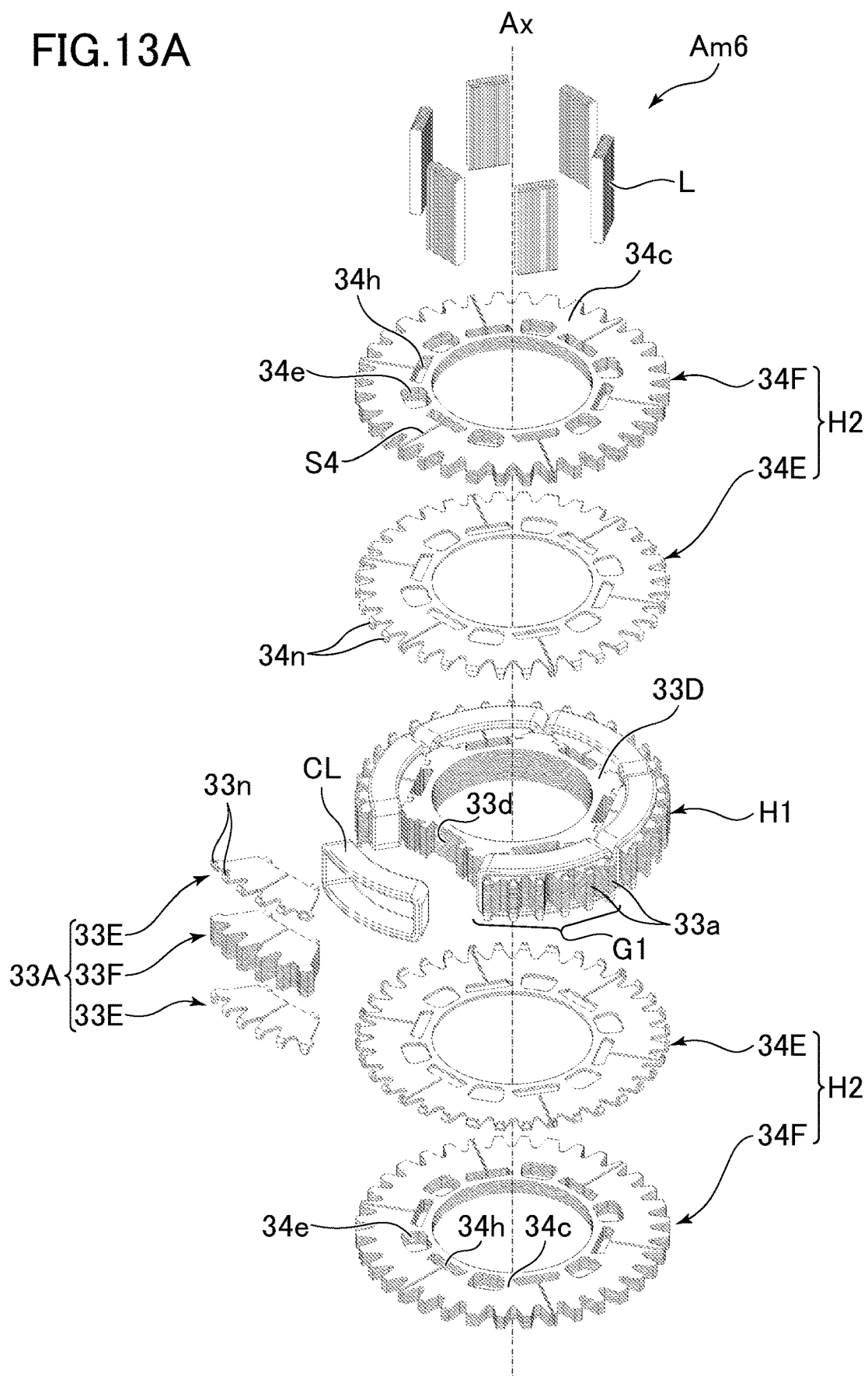
FIG. 13A is an exploded perspective view of a rotary electric machine according to a sixth example. The armature core is composed of partial armature cores.
Figure 13B:
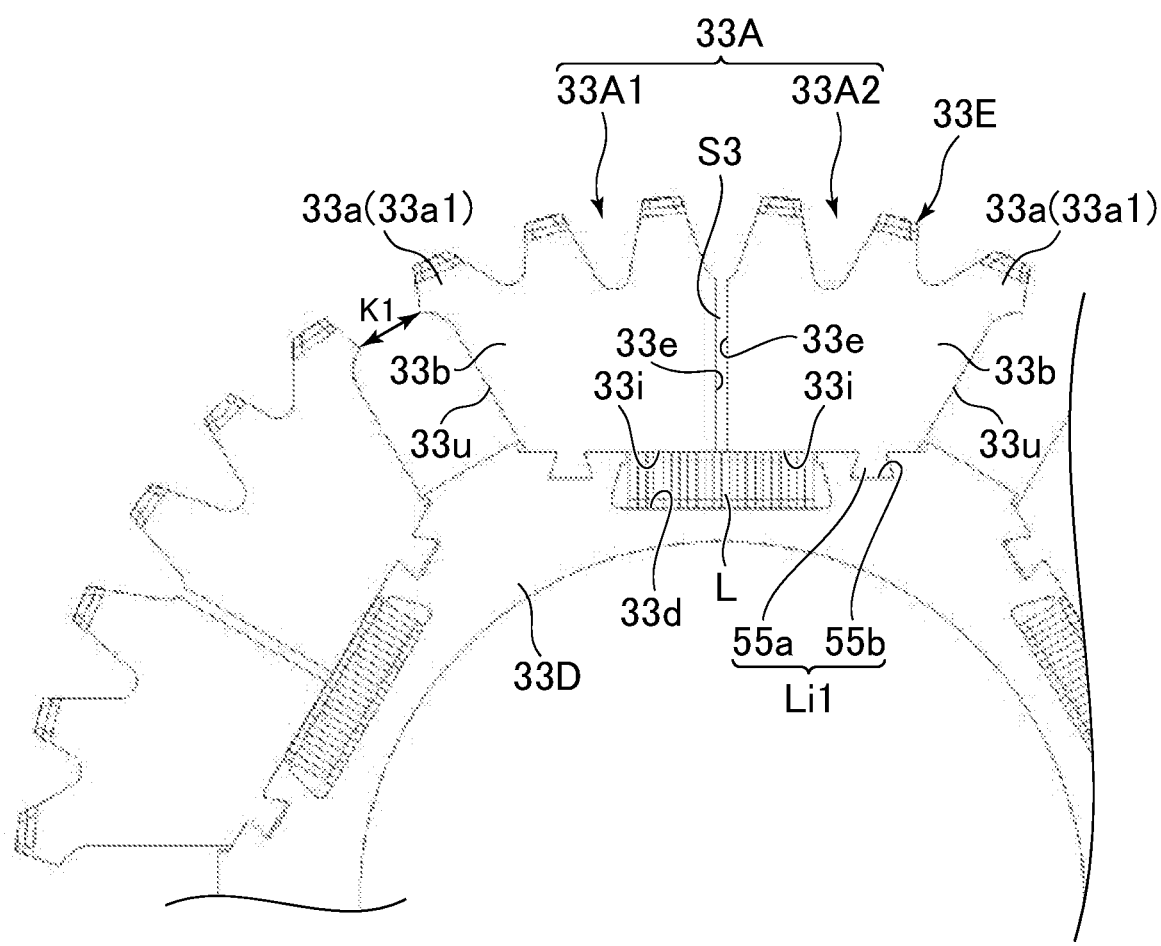
FIG. 13B is a plan view of the first armature core H1 constituting the armature portion shown in FIG. 13A.

The armature core may be composed of a plurality of separately formed and coupled portions (partial armature core). FIGS. 13A and 13B are diagrams for illustrating an armature portion Am6 of a rotary electric machine having such a structure as another example of the rotary electric machine proposed in the present disclosure. FIG. 13A is an exploded perspective view of the armature portion Am6. FIG. 13B is a plan view of the first armature core H1 constituting the armature portion Am6. Similarly to the armature portions of the other rotary electric machines described above, the armature portion Am6 has a first armature core H1, two second armature cores H2, and core coupling portions L that magnetically couple the armature cores H1 and H2. The structures of the armature cores described herein may be applied not only to the radial gap type rotary electric machine shown therein but also to a linear electric machine and an axial gap type rotary electric machine.

The first armature core H1 has a plurality of magnetic pole group partial cores 33A (see FIG. 13A) disposed in the rotation direction. The magnetic pole group partial core 33A includes a plurality of magnetic poles 33*a* (see FIG. 13B) arranged in the rotation direction and a common base 33*b* (see FIG. 13B) at the base of the magnetic poles 33*a*. The plurality of magnetic poles 33*a* forms a magnetic pole group G1. The first armature core H1 has an annular yoke partial core 33D (see FIG. 13A).

As shown in FIG. 13A, the magnetic pole group partial cores 33A are disposed on the outer side of the yoke partial core 33D. Each magnetic pole group partial core 33A is formed separately from the yoke partial core 33D and is connected to the yoke partial core 33D by the coupling mechanism Li1 (engaging portion 55*a* and engaged portion 55*b*, see FIG. 13B). Each of the magnetic pole group partial core 33A and the yoke partial core 33D is formed of laminated steel sheets. Such a first armature core H1 can improve the yield of the core material at the time of manufacturing the first armature core H1, as compared with the case where the entire armature core is composed of single laminated steel sheets.

As shown in FIG. 13A, in the armature portion Am6, a coil CL is provided to the magnetic pole group G1 as in the example of the rotary electric machine M1. In other words, in the armature portion Am6, a portion where the coil CL is provided (i.e., magnetic pole group partial core 33A) is formed separately from the yoke partial core 33D. As such, in the manufacturing process of the armature portion Am6, for example, it is possible to attach a bobbin-wound or an air-core-wound coil CL to the magnetic pole group partial core 33A, and then connect the magnetic pole group partial core 33A to the yoke partial core 33D. As such, a distance K1 (see FIG. 13B) between adjacent magnetic pole group partial cores 33A can be reduced. As a result, the number of magnetic poles 33*a* constituting one magnetic pole group G1 can be increased, and thus the magnets Mg can be more efficiently used and the output torque of the rotary electric machine can be increased.

As shown in FIG. 13B, a plurality of magnetic poles 33*a* constituting each magnetic pole group G1 includes a magnetic pole 33*a*1 located outermost in the rotation direction. The magnetic pole 33*a*1 protrudes more than a side surface 33*u* of the common base 33*b* in the rotation direction. With this structure of the magnetic pole group partial core 33A, the number of magnetic poles 33*a* constituting one magnetic pole group G1 can be increased.

As shown in FIG. 13B, the magnetic pole group partial core 33A includes a slit S3 to prevent the generation of an induced current caused by the magnetic flux flowing through the core coupling portion L. The magnetic pole group partial core 33A includes a first partial core 33A1 and a second partial core 33A2 that are separated in the rotation direction. The two partial cores 33A1 and 33A2 have surfaces 33*e* that are located away from each other (hereinafter, the surface 33*e* is referred to as a slit surface). The slit S3 is formed between the two slit surfaces 33*e*. The two partial cores 33A1 and 33A2 are symmetrical with respect to the slit S3. The slit S3 reaches the surface of the magnetic pole group partial core 33A on the magnetic field portion Fs side.

As shown in FIG. 13B, each of the first partial core 33A1 and the second partial core 33A2 is connected to the annular yoke partial core 33D by the coupling mechanism Li. Three partial cores 33A1, 33A2, and 33D form the slit S3 and a fitting hole into which the core coupling portion L is fitted. Specifically, the yoke partial core 33D has recessed portions 33d (see FIG. 13A) on the surface facing the magnetic field portion Fs. Each of the partial cores 33A1 and 33A2 has a surface 33i facing the yoke partial core 33D (hereinafter, the surface 33i is referred to as a "coupling surface"). The coupling surface 33i has an engaging portion 55a constituting the coupling mechanism Li1. The coupling surface 33i and the inner surface of the recessed portion 33d form a fitting hole into which the core coupling portion L is fitted, and the slit S3 formed between the two partial cores 33A1 and 33A2 is connected to the fitting hole.

The structure for forming the fitting hole in which the slit S3 and the core coupling portion L are fitted is not limited to the example described herein. For example, the fitting hole into which the core coupling portion is fitted may be formed in the common base 33b of the magnetic pole group partial core 33A. In this case, the slit S3 may extend from the fitting hole towards the magnetic field portion Fs. In this case, the magnetic pole group partial core 33A may not need to have two partial cores 33A1 and 33A2 that are separated from each other. In other words, the two partial cores 33A1 and 33A2 may be connected to each other at a portion other than the slit S3.

In yet another example, a fitting hole 33g similar to the example shown in FIG. 7 may be formed on the inner peripheral surface (the surface opposed to the magnetic field portion Fs) of the yoke partial core 33D. In this case, a slit S5 (see FIGS. 9A and 9B) may be formed in the yoke partial core 33D so as to intersect the closed curve that passes between the fitting holes 33g and the magnetic pole groups G1 and surrounds the axis Ax.

As shown in FIG. 13B, the coupling mechanism Li1 includes an engaging portion 55a and an engaged portion 55b. In the example of FIG. 13B, the engaging portions 55a are formed in the partial cores 33A1 and 33A2, and the engaged portions 55b are formed in yoke partial core 33D. The engaging portion 55a is a convex portion protruding from the coupling surface 33i of the magnetic pole group partial core 33A. On the other hand, the engaged portion 55b is a recessed portion in which the engaging portion 55a is fitted. In contrast to the example of the armature portion Am6, the engaging portion 55a, which is a convex portion, may be formed in the yoke partial core 33D, and the engaged portion 55b, which is a recessed portion, may be formed in the magnetic pole group partial core 33A.

As shown in FIG. 13B, in the state where the magnetic pole group partial core 33A is magnetically coupled to the yoke partial core 33D via the coupling mechanism Li1, the coupling surface 33i of the magnetic pole group partial core 33A is in contact with the yoke partial core 33D, and the magnetic pole group partial core 33A is magnetically coupled with the yoke partial core 33D.

The coupling structure between the magnetic pole group partial core 33A and the yoke partial core 33D is not limited to the example shown in FIGS. 13A and 13B. For example, the magnetic pole group partial core 33A and the yoke partial core 33D may be coupled to each other by bonding or brazing their joint surfaces or being molded with resin without using the coupling mechanism Li1.

The structure for dividing the armature core is not limited to the example shown in FIGS. 13A and 13B. For example, the armature core may include a plurality of partial cores disposed in the rotation direction. In this case, magnetic pole groups G1 and G2 may be formed in each partial core. Further, a fitting hole into which the core coupling portion L is fitted and a slit S3 extending from the fitting hole toward the magnetic field portion Fs may be formed in each partial core. The plurality of partial cores are formed separately from each other, and two partial cores adjacent to each other in the rotation direction may be coupled by the coupling mechanism Li1 and magnetically coupled to each other. The plurality of partial cores may constitute an annular armature core as a whole. Such an armature core can also improve the yield of the core material at the time of manufacturing the armature core, as compared with the case where the entire armature core is composed of single laminated steel sheets.

As shown in FIG. 13A, the magnetic pole 33a of the magnetic pole group partial core 33A may have a body projecting toward the magnetic field portion Fs and a projecting portion 33n extending in the axis direction from the body. Such a structure can increase the distal end surface area of the magnetic pole 33a (the area of the surface facing the magnetic field portion Fs) and reduce the magnetoresistance caused by the space between magnetic field portion Fs and the magnetic pole 33a. In addition to the magnetic field cores 22N and 22S, the projecting portion 33n can also function as a part of the flow path of the magnetic flux flowing in the axis direction. This serves to alleviate the magnetic saturation of the magnetic field cores 22N and 22S.

As shown in FIG. 13A, the magnetic pole group partial core 33A includes a plurality of end steel sheets 33E disposed at ends (upper end and lower ends in FIG. 13A) in the axis direction, and a plurality of body steel sheets 33F disposed therebetween. The distal end of the magnetic pole of the end steel sheet 33E is bent toward the second armature core H2 to form the projecting portion 33n. In the example shown in FIG. 13A, the distal ends of the two end steel sheets 33E disposed at the upper end and the distal ends of the two end steel sheets 33E disposed at the lower end are bent. The number of the end steel sheets 33E constituting the projecting portion 33n may be one or more than two. The shape of the magnetic pole 33a (projecting portion 33n) may be applied to an armature core formed integrally (e.g., armature core H1 having no partial core shown in FIG. 1A).

As shown in FIG. 13A, a fitting hole 34h in which the core coupling portion L is fitted is formed on the yoke portion 34c of the second armature core H2. The second armature core H2 has a slit S4 extending from the fitting hole 34h toward the magnetic field portion Fs. Further, a hole 34e is formed between two adjacent fitting holes 34h. The hole 34e serves to reduce the weight of the armature portion Am6.

The inner diameter of the second armature core H2 (the inner diameter of the yoke portion 34c) may coincide with the inner diameter of the first armature core H1 (the inner diameter of the yoke partial core 33D). This enables a cylindrical support member to be placed inside the second armature core H2 and the first armature core H1, thereby firmly fixing these members.

As shown in FIG. 13A, the magnetic pole 34a of the second armature core H2 also has a body projecting toward the magnetic field portion Fs and a projecting portion 34n extending in the axis direction from the body. The second armature core H2 is formed of laminated steel sheets and includes an end steel sheet 34E and a body steel sheet 34F. The end steel sheet 34E is disposed on the first armature core H1 side with respect to the body steel sheet 34F. Similarly to the first armature core H1, the second armature core H2 includes a plurality of end steel sheets 34E (two in the example in FIG. 13A) at the end in the axis direction. The number of the end steel sheets 34E may be one or more than two. In the end steel sheet 34E, the distal end of the magnetic pole 34a is longer than the length of the other steel sheets, and is bent toward the first armature core H1 to form the projecting portion 34n. This increases the areas of the distal end surfaces of the magnetic pole 34a (the areas of the surfaces facing the magnetic field portion Fs), and the magnetoresistance caused by the space between the magnetic field portion Fs and the magnetic pole 34a can be thereby reduced. In addition to the magnetic field cores 22N and 22S, the projecting portion 34n can also function as a part of the flow path of the magnetic flux flowing in the axis direction. This serves to alleviate the magnetic saturation of the magnetic field cores 22N and 22S.

[Example of Two In-Phase Coils of Different Winding Directions]

Figure 14A:
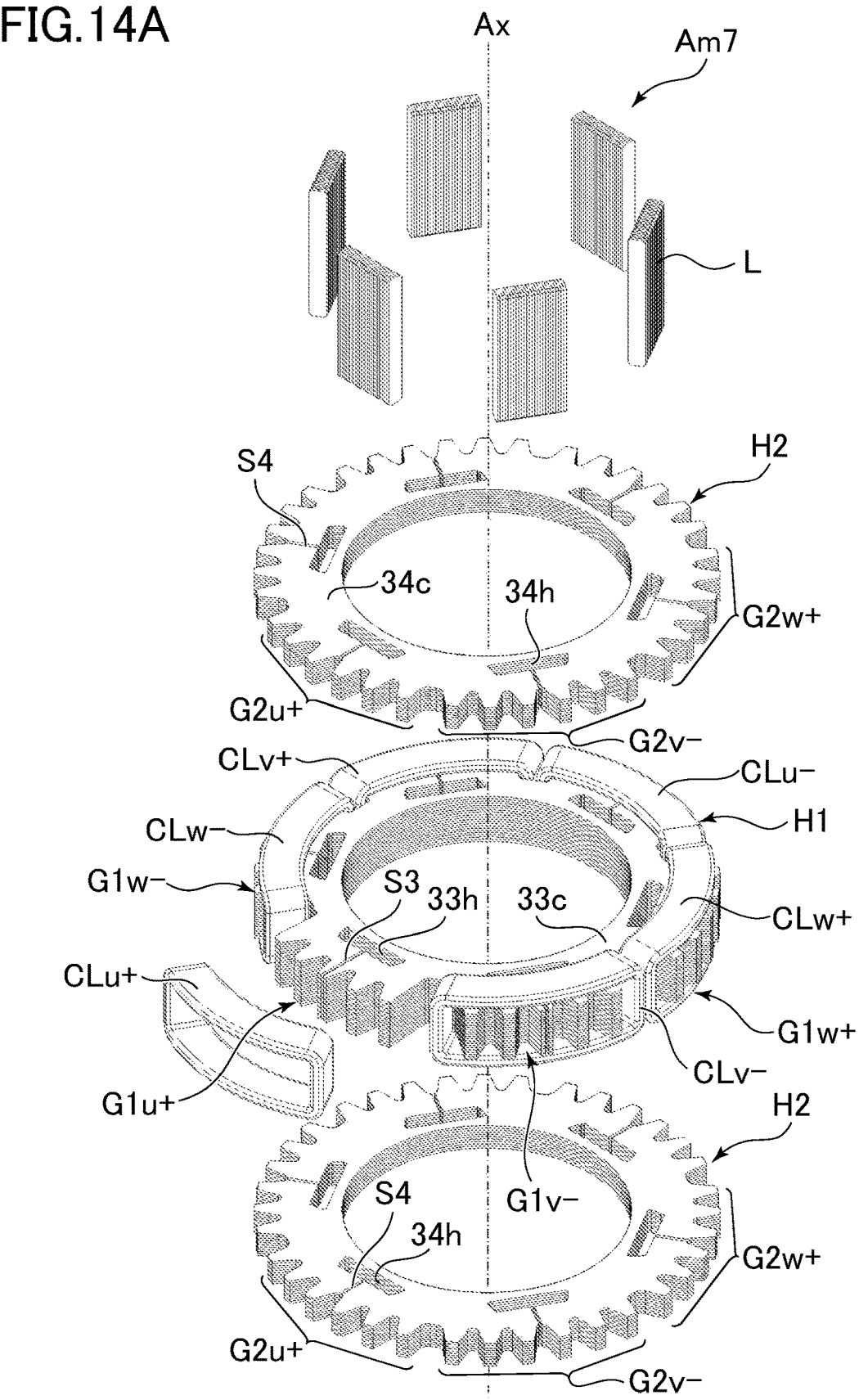
FIG. 14A is a decomposition perspective view of a rotary electric machine according to a seventh example. The armature portion includes two coils having opposite winding directions for each phase.
Figure 14B:
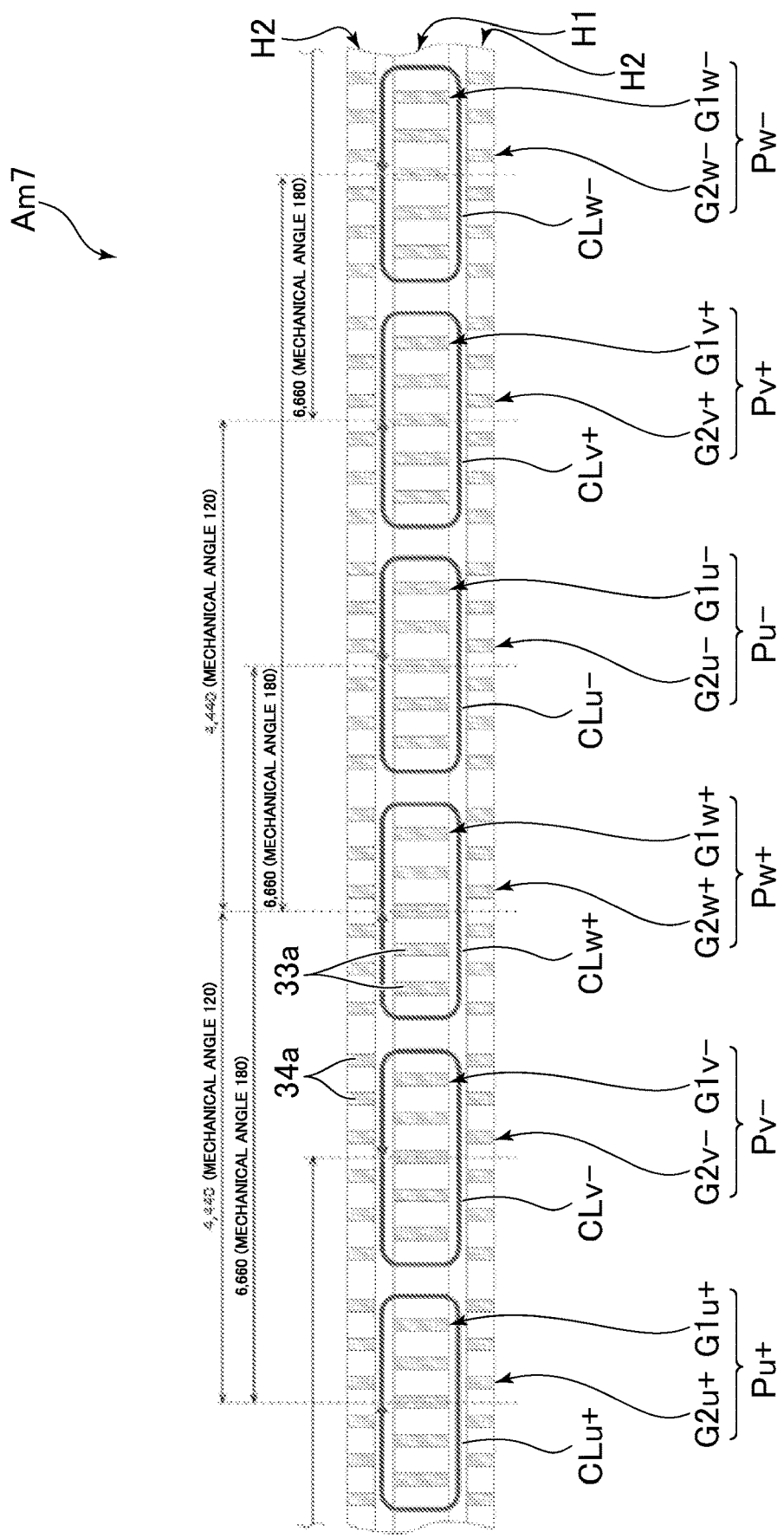
FIG. 14B is a development view of the armature portion showing positions of magnetic poles of the armature portion shown in FIG. 14A.

The rotary electric machine may have two coils that are opposite in the winding directions for each phase (e.g. U phase, V phase, W phase). FIGS. 14A and 14B are diagrams for illustrating an armature portion Am7 of a rotary electric machine having such a structure as another example of the rotary electric machine proposed in the present disclosure. FIG. 14A is an exploded perspective view of the armature portion Am7 and FIG. 14B is an exploded view of the armature portion Am7 indicating the position of the magnetic pole of the armature portion Am7. The numerical values in the drawings are angles (distances) in the rotation direction represented in electrical angles. Here, the differences from the armature portion Am1 of the rotary electric machine M1 described with reference to FIG. 1A will be mainly described. The structure of the rotary electric machine M1 shown in FIG. 1A may be applied to the matters that are not described about the armature portion Am7 shown in FIGS. 14A and 14B. The structure of the armature portion described herein may be applied not only to the radial gap type rotary electric machine shown therein but also to a linear electric machine and an axial gap type rotary electric machine.

The plurality of coils CL included in the armature portion Am7 include two coils CL having opposite winding directions for each phase. The rotary electric machine having the armature portion Am7 is supplied with a three-phase alternating current. As such, the plurality of coils CL include, as shown in FIG. 14A, a U+ phase coil CLu+, a U− phase coil CLu−, a V+ phase coil CLv+, a V− phase coil CLV−, a W+ phase coil CLw+, and a W− phase coil CLw−. These six coils CL are respectively provided in the magnetic pole groups G1 of the first armature core H1 and are disposed in the rotation direction. (FIGS. 14A and 14B show G1u+, G1v+, G1w+, G1u−, G1v−, and G1w− as a magnetic pole group G1).

As shown in FIG. 14B, six magnetic pole group pairs P each provided with six coils CL are referred to as a magnetic pole group pair Pu+, a magnetic pole group pair Pv+, a magnetic pole group pair Pw+, a magnetic pole group pair Pu−, a magnetic pole group pair Pv−, and a magnetic pole group pair Pw−. These six magnetic pole group pairs P have the same structure. That is, the number of magnetic poles 33a and 34a is the same in the magnetic pole group pairs Pu+, Pv+, Pw+, Pu−, Pv−, and Pw−. The intervals of the magnetic poles 33a and 34a are also substantially the same in the magnetic pole group pairs Pu+, Pv+, Pw+, Pu−, Pv−, and Pw−. The widths and heights of the magnetic pole 33a and 34a are also substantially the same in the magnetic pole group pairs Pu+, Pv+, Pw+, Pu−, Pv−, and Pw−. Each of the magnetic pole group pairs Pu+, Pv+, Pw+, Pu−, Pv−, and Pw−. includes a core coupling portion L. Each coupling portion L is positioned opposite to the magnetic field portion Fs across the coil CL, and the position of the core coupling portion L in the rotation direction coincides with the center of the magnetic pole groups G1 and G2 in the rotation direction. As such, it is desirable that one magnetic pole group pair (e.g., Pu+) is rotated about the axis Ax1 and becomes another magnetic pole group pair P (e.g., Pv+, Pw+, Pu−, Pv−, Pw−).

In FIG. 14B, attention is now directed to two magnetic pole group pairs P in which the coils CL having the same phase and opposite winding directions are provided. For example, the magnetic pole group pair Pu+ and the magnetic pole group pair Pu− are located away from each other substantially by "360×(q+1/2)" degrees in electrical angle (q is an integer of 1 or more). That is, in the first armature core H1, there is a difference of 180 degrees in electrical angle between the angle (distance) between the magnetic pole 33a and the magnetic field core 22N of the magnetic pole group pair Pu+ and the angle (distance) between the magnetic pole 33a and the magnetic field core 22N of the magnetic pole group pair Pu. As such, for example, when the magnetic pole 33a of the magnetic pole group pair Pu+ is directly opposite to the magnetic field core 22N (when the angle (distance) between the magnetic pole 33a and the magnetic field core 22N is 0 degrees), the magnetic pole 33a of the magnetic pole group pair Pu− is shifted by 180 degrees in electrical angle with respect to the magnetic field core 22N and is directly opposite to the magnetic field core 22S. In the second armature core H2, there is also a difference of 180 degrees in electrical angle between the angle (distance) between the magnetic pole 34a and the magnetic field core 22S of the magnetic pole group pair Pu+ and the angle (distance) between the magnetic pole 34a and the magnetic field core 22S of the magnetic pole group pair Pu. In the armature portion Am7, q=18. Accordingly, the angle between the magnetic pole group pair Pu+ and the magnetic pole group pair Pu− is 6,660 degrees in electrical angle. In this description, the angle between the magnetic pole group pair Pu+ and the magnetic pole group pair Pu− is specifically an angle (distance) between the center of the magnetic pole group G1u+ and the center of the magnetic pole group G1u− in the rotation direction, and an angle (distance) between the center of the magnetic pole group G2u+ and the center of the magnetic pole group G2u− in the rotation direction. These are the same for other magnetic pole group pairs Pv+, Pv−, Pw+, and Pw−.

Further, attention is paid to two magnetic pole group pairs P provided with the coils CL having the same winding direction. For example, attention is directed to the magnetic pole group pair Pv+ and the magnetic pole group pair Pw+. In the first armature core H1, there is a difference of 120 degrees in electrical angle between the angle (distance) between the magnetic pole 33a of the magnetic pole group pair Pv+ and the magnetic field core 22N and the angle (distance) between the magnetic pole 33a of the magnetic pole group pair Pw+ and the magnetic field core 22N in electrical angle. Accordingly, for example, when the magnetic pole 33a of the magnetic pole group pair Pv+ directly faces the magnetic field core 22N (when the angle (distance) between the magnetic poles 33a and the magnetic field core 22N is 0 degrees), the position of the magnetic pole 33a of the magnetic pole group pairs Pw+ is shifted by 120 degrees in electrical angle relative to the magnetic field core 22N. In the second armature core H2, there is a difference of 120 degrees in electrical angle between the angle (distance) between the magnetic pole 34a of the magnetic pole group pair Pv+ and the magnetic field core 22S and the angle (distance) between the magnetic pole 34a of the magnetic pole group pair Pw+ and the magnetic field core 22S in electrical angle. That is, as shown in FIG. 14B, the magnetic pole group pair Pv+ and the magnetic pole group pair Pw+ are located away from each other substantially by "360×(n+m/s)" degrees in electrical angle, where "s" is the number of phases, "m" is an integer equal to or greater than 1 and equal to or less than s−1, where the integer is other than a divisor of s (except 1) and other than multiples of the divisor (except 1), and "n" is an integer equal to or greater than 1.

In the armature portion Am7, s=3 and n=12. When m=1, the magnetic pole group pair Pv+ and the magnetic pole group pair Pw+ are located away from each other by 4,440 degrees in electrical angle. The same applies to the angle between the other two magnetic pole group pairs P provided with the coils CL having the same winding directions (e.g. the angle between the magnetic pole group pair Pu+ and the magnetic pole group pair Pv+, or the angle between the magnetic pole group pair Pw+ and magnetic pole group pair Pu+). The relative positions of the magnetic pole group pair P and the magnetic field portion Fs may be applied to a linear electric machine or an axial gap type rotary electric machine.

Further, "(360/p)×(n+m/s)" degrees in mechanical angle are ensured between two magnetic pole group pairs P provided with the coils CL having the same winding direction. The angle between the two magnetic pole group pairs P can also be represented as "360/s/c" degrees in mechanical angle, where "p" is (number of poles of magnetic field portion)/2, and "c" is number of coil pairs for each phase.

Accordingly, "(360/p)×(n+m/s)" is substantially equal to "360/s/c". In armature portion Am7, the number of poles of magnetic field portion Fs is 74 (p=37), for example. Further, s=3 and c=1. As such, the angle between two adjacent magnetic pole group pairs P provided with the coils CL having the same winding direction is 120 degrees in mechanical angle. In other words, the number of poles (p×2) of magnetic field portion Fs, the number of coil pairs (s×c), the number of magnetic poles 33a and 34a are determined so that "(360/p)×(n+m/s)" is substantially equal to "360/s/c."

In the example shown in FIGS. 14A and 14B, a coil is obtained by a concentrated winding in which one coil (e.g., CLu−) is wound around one magnetic pole group (e.g., magnetic pole group G1u−). However, coils may be obtained by lap winding or wave winding, for example.

In an armature core having a coil of lap winding, for example, the U+ phase coil CLu+ is wound around three adjacent magnetic pole groups G1w−, G1u+, and G1v−, and U− phase coil CLu− is wound around three adjacent magnetic pole groups G1w+, G1u−, and G1v+. The coils CLv+, CLv−, CLw+, and CLw− of the remaining phases are likewise wound in three adjacent magnetic pole groups.

In an armature core having a coil of wave winding, for example, three adjacent magnetic pole groups G1w+, G1u−, and G1v+ are disposed between the U+ phase coil CLu+ (wire of U+ phase) and the U-phase coil CLu− (wire of U-phase). The three adjacent magnetic pole groups G1u−, G1v+, and G1w− are disposed between the V+ phase coil CLv+ (wire of V+ phase) and the V− phase coil CLv− (wire of V-phase). The three adjacent magnetic pole groups G1v+, G1w−, and G1u+ are disposed between the W+ phase coil CLw+(wire of W+ phase) and the W-phase coil CLw− (wire of W-phase).

The arrangement of the coils CL included in the armature portion Am7 is not limited to the example shown in the drawings. For example, two magnetic pole group pairs P (e.g., magnetic pole group pairs Pu+, Pu−), which are respectively provided with two coils CL generating magnetic fields of opposite poles because of the different winding directions and having the same phase, may be adjacent in the rotation direction. In this case, the magnetic pole group pair Pv+ and the magnetic pole group pair Pv− may also be adjacent to each other in the rotation direction, and the magnetic pole group pair Pw+ and the magnetic pole group pair Pw− may also be adjacent to each other in the rotation direction.

[Example when Number of Phases is Even Number]

Figure 15A:
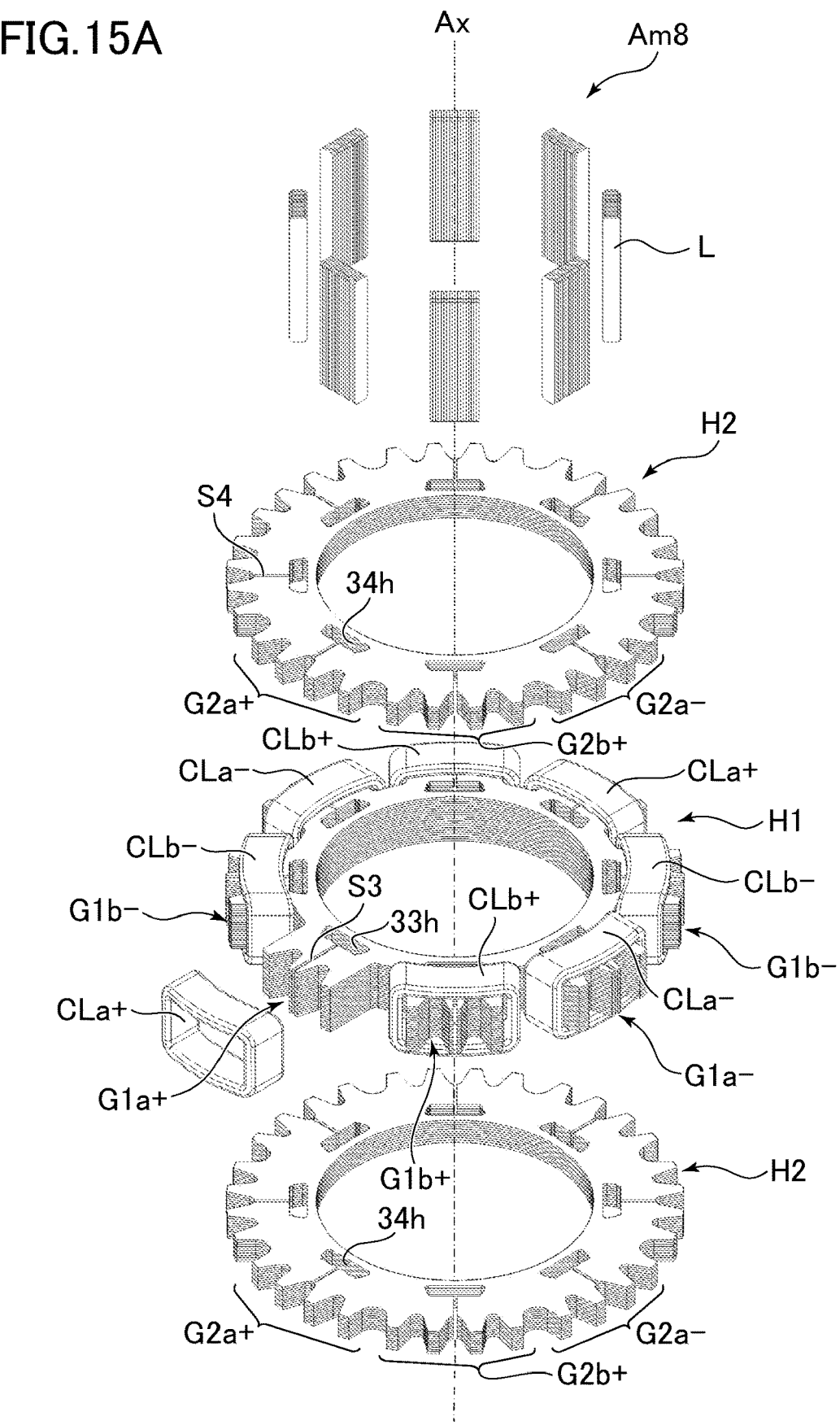
FIG. 15A is an exploded perspective view of a rotary electric machine according to an eighth example. The number of phases of the alternating current supplied to the rotary electric machine is an even number.
Figure 15B:
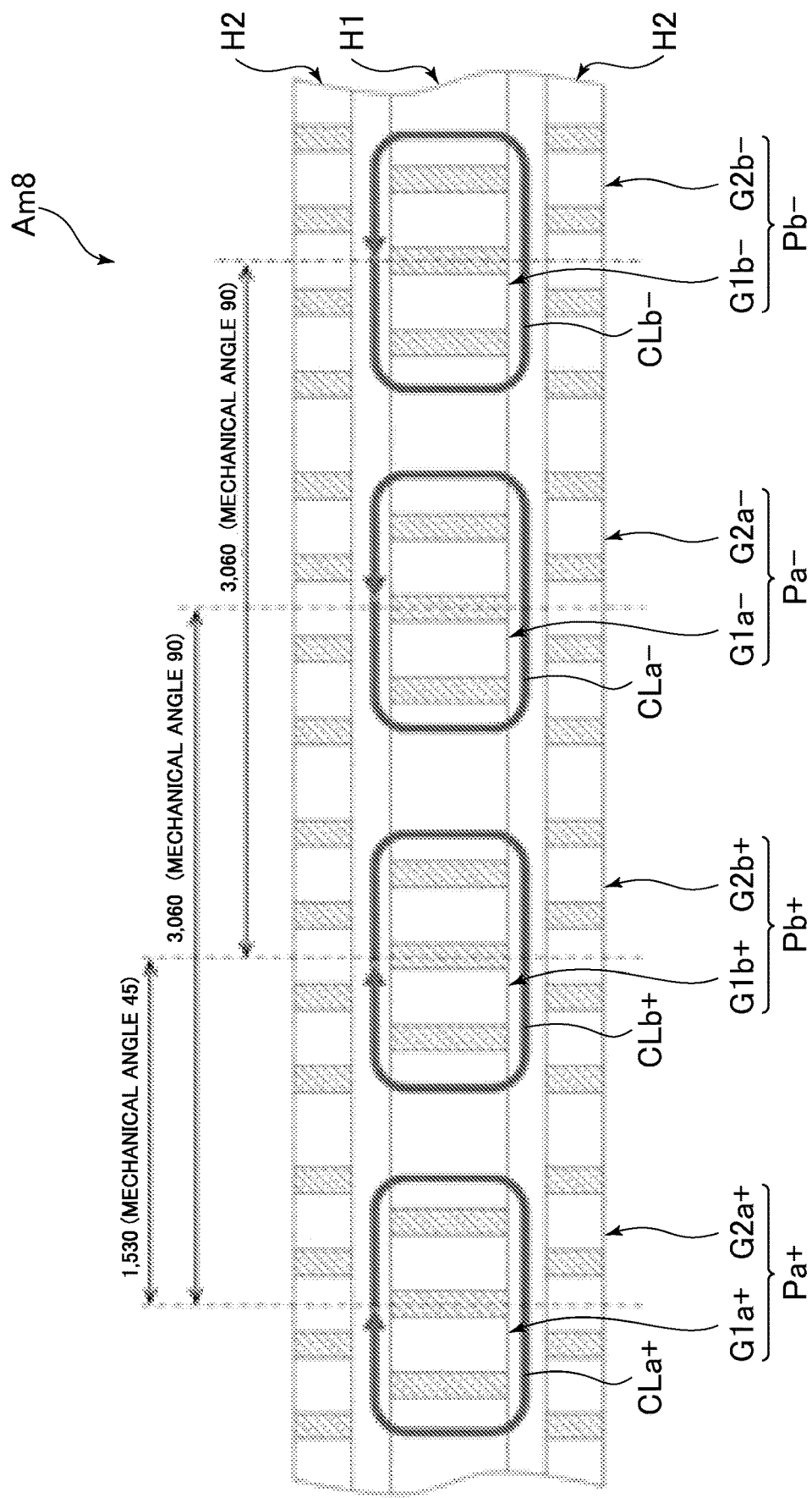
FIG. 15B is a development view of the armature portion showing positions of magnetic poles of the armature portion shown in FIG. 15A.

The number of phases of the alternating current supplied to the rotary electric machine may be an even number. For example, the number of phases of the alternating current may be two. FIGS. 15A and 15B are diagrams for illustrating an armature portion Am8 of a rotary electric machine having such a structure as another example of the rotary electric machine proposed in the present disclosure. FIG. 15A is an exploded perspective view of the armature portion Am8. FIG. 15B is an exploded view of the armature portion Am8 indicating the position of the magnetic pole of the armature portion Am7. The numerical values in FIG. 15B are angles (distances) in the rotation direction represented in electrical angles. Here, the differences from the armature portion Am1 of the rotary electric machine M1 described with reference to FIG. 1A will be mainly described. The structure of the rotary electric machine M1 may be applied to the matters that are not described about the armature portion Am8 shown in FIGS. 15A and 15B. The structure of the armature portion described herein may be applied not only to the radial gap type rotary electric machine shown therein but also to a linear electric machine and an axial gap type rotary electric machine.

In the armature portion Am8, as shown in FIG. 15B, the coils CL includes A+ phase coil CLa+, B+ phase coil CLb+, A− phase coil CLa−, and B-phase coil CLb−. The A− phase coil CLa− and the B-phase coil CLb− have the winding direction opposite to that of the A+ phase coil CLa+ and the B+ phase coil CLb+. The first armature core H1 has four coils CL for each phase. A coil CL is wound around magnetic pole group G1 (FIG. 15A shows G1a+, G1a−, G1b+, and G1b− as the magnetic pole group G1).

The magnetic pole group G1 constitutes a magnetic pole group pair P together with the magnetic pole group G2 arranged in the axis direction. The four magnetic pole group pairs P each provided with four coils CLa+, CLb+, CLa−, and CLb− are referred to as a magnetic pole group pair Pa+, a magnetic pole group pair Pb+, a magnetic pole group pair Pa−, and a magnetic pole group pair Pb−. These four magnetic pole group pairs P have substantially the same structure. That is, the numbers of magnetic poles 33a and 34a are the same in the magnetic pole group pairs Pa+, Pb+, Pa−, and Pb−. The spacing of the magnetic poles 33a and 34a is also substantially the same in the magnetic pole group pairs Pa+, Pb+, Pa−, and Pb−. Further, the width and/or height of the magnetic poles 33a and 34a are also substantially the same in the magnetic pole group pairs Pa+, Pb+, Pa−, and Pb−. Each of the magnetic pole group pairs Pa+, Pb+, Pa−, and Pb− has a core coupling portion L. Each coupling portion L is positioned opposite to the magnetic field portion Fs across the coil CL, and the position of the core coupling portion L in the rotation direction coincides with the center of the magnetic pole groups G1 and G2 in the rotation direction. One magnetic pole group pair (e.g., Pa+) is rotated about the axis Ax and becomes another magnetic pole group pair P (e.g., Pb+, Pa−, Pb−).

Attention is now directed to two magnetic pole group pairs P in which the coils CL having the same phase and opposite winding directions are provided. For example, when focusing on the magnetic pole group pair Pa+ and the magnetic pole group pair Pa−, in the first armature core H1, there is a difference of 180 degrees in electrical angle between the angle (distance) between the magnetic pole 33*a* of the magnetic pole group pair Pa+ and the magnetic field core 22N and the angle (distance) between the magnetic pole 33*a* of the magnetic pole group pair Pa− and the magnetic field core 22N. As such, for example, when the magnetic pole 33*a* of the magnetic pole group pair Pa+ is directly opposite to the magnetic field core 22N (when the angle (distance) between the magnetic pole 33*a* and the magnetic field core 22N is 0 degrees), the magnetic pole 33*a* of the magnetic pole group pair Pa− is shifted by 180 degrees in electrical angle with respect to the magnetic field core 22N and is directly opposite to the magnetic field core 22S. In the second armature core H2, there is also a difference of 180 degrees in electrical angle between the angle (distance) between the magnetic pole 34*a* of the magnetic pole group pair Pa+ and the magnetic field core 22S and the angle (distance) between the magnetic pole 34*a* of the magnetic pole group pair Pa− and the magnetic field core 22S.

That is, as shown in FIG. 15B, the magnetic pole group pair Pa+ and the magnetic pole group pair Pa− are located away from each other substantially by "360×(q+1/2)" degrees in electrical angle (q is an integer greater than or equal to 1). In the armature portion Am8, q=8, and the magnetic pole group pair Pa+ and the magnetic pole group pair Pa− are located away from each other by 3,060 degrees in electrical angle. In this description, the angle between the magnetic pole group pair Pa+ and the magnetic pole group pair Pa− is specifically an angle (distance) between the center of the magnetic pole group G1*a*+ and the center of magnetic pole group G1*a*− in the rotation direction, and an angle (distance) between the center of the magnetic pole group G2*a*+ and the center of the magnetic pole group G2*a*− in the rotation direction. These are the same for other magnetic pole group pairs Pb+ and Pb−. In the rotary electric machine M8, the number of poles of the magnetic field portion Fs is 68 (p=34). As such, the angle (distance) between the magnetic pole group pair Pa+ and the magnetic pole group pair Pa− is 90 degrees (=3,060/34) in mechanical angle.

Attention is directed to two magnetic pole group pairs P provided with the coils CL having the same winding direction. For example, attention is directed to the magnetic pole group pair Pa+ and the magnetic pole group pair Pb+. In the first armature core H1, there is a difference of 90 degrees in electrical angle between the angle (distance) between the magnetic pole 33*a* of the magnetic pole group pair Pa+ and the magnetic field core 22N and the angle (distance) between the magnetic pole 33*a* of the magnetic pole group pair Pb+ and the magnetic field core 22N. As such, for example, when the magnetic pole 33*a* of the magnetic pole group pair Pa+ is directly opposite to the magnetic field core 22N (when the angle (distance) between the magnetic pole 33*a* and the magnetic field core 22N is 0 degrees), the magnetic pole 33*a* of the magnetic pole group pair Pb+ is shifted by 90 degrees in electrical angle with respect to the magnetic field core 22N. In the second armature core H2, there is a difference of 90 degrees in electrical angle between the angle (distance) between the magnetic pole 34*a* of the magnetic pole group pair Pa+ and the magnetic field core 22N and the angle (distance) between the magnetic pole 34*a* of the magnetic pole group pair Pb+ and the magnetic field core 22S. That is, as shown in FIG. 15B, the magnetic pole group pair Pa+ and the magnetic pole group pair Pb+ are located away from each other substantially by "360×(n+m/s/2)" degrees in electrical angle, where "s" is the number of phases, "m" is an integer equal to or greater than 1 and equal to or less than s−1, where the integer is other than a divisor of s (except 1) and other than multiples of the divisor (except 1), and "n" is an integer equal to or greater than 1.

In the armature portion Am8, s=2 and n=4. When m=1, the magnetic pole group pair Pa+ and the magnetic pole group pair Pb+ are located away from each other by 1,530 degrees in electrical angle. The same applies to the angle between other magnetic pole group pairs P provided with two coils CL having the same winding direction (e.g. the angle between the magnetic pole group pair Pa− and the magnetic pole group pair Pb−). The relative positions of the magnetic pole group pair P and the magnetic field portion Fs may be applied to a linear electric machine or an axial gap type rotary electric machine.

Further, "(360/p)×(n+m/s/2)" degrees in mechanical angle are ensured between two magnetic pole group pairs P provided with the coils CL having the same winding direction. The angle of the two magnetic pole group pairs P can also be expressed as "180/s/c" degrees in mechanical angle, where "p" is (number of poles of magnetic field portion)/2, and "c" is number of coil pairs for each phase.

Accordingly, "(360/p)×(n+m/s/2)" is substantially equal to "180/s/c". In the armature portion Am8, the number of poles of the magnetic field portion Fs is 68 (p=34), for example. Further, s=2 and c=2. As such, the angle between two adjacent magnetic pole group pairs P is 45 degrees in mechanical angle. In other words, the number of poles (p×2) of magnetic field portion Fs, the number of coil pairs (s×c), the number of magnetic poles 33*a* and 34*a* are determined so that "(360/p)×(n+m/s/2)" is substantially equal to "180/s/c."

[Examples Regarding Partial Magnetic Field Core]

Figure 16:
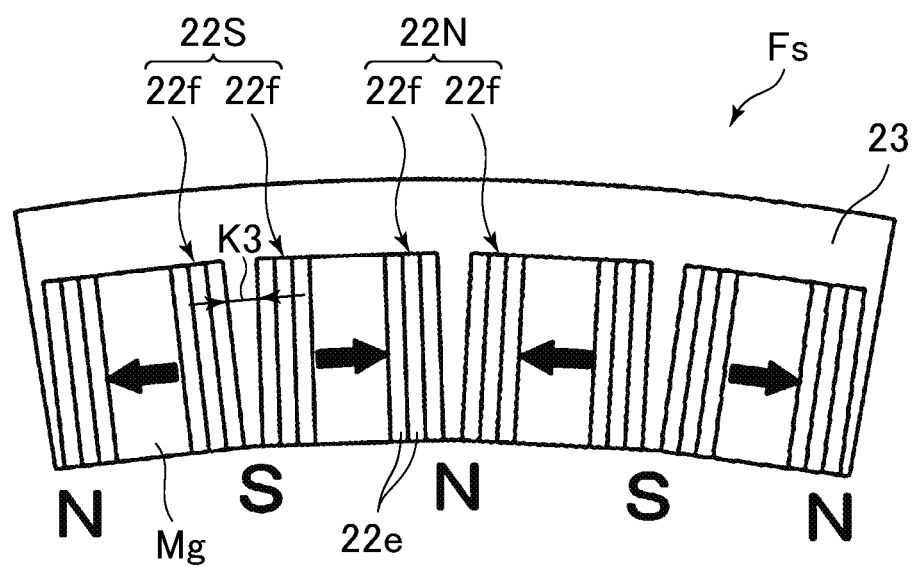
FIG. 16 is a cross-sectional view of an example of the magnetic field portion.

FIG. 16 is a cross-sectional view of an example of the magnetic field portion Fs (the cut surface is parallel to the rotation direction). As shown in FIG. 16, for example, the magnetic field cores 22N and 22S may be composed of a plurality of partial cores disposed between two adjacent magnets and separated in the rotation direction. Specifically, the magnetic field cores 22N and 22S may be composed of two partial magnetic field cores 22*f* that are located away from each other in the rotation direction, and a space K3 between the two partial magnetic field cores 22*f* may be ensured. This structure serves to reduce accumulated dimensional errors in the magnetic field cores 22N and 22S and the magnets Mg, thereby improving the positional accuracy of the magnetic field cores 22N and 22S and the magnets Mg. The magnetic field portion Fs shown in FIG. 16 is disposed radially outward of the armature portion. As such, the widths of the magnets Mg and the partial magnetic field core 22*f* are constant in the radial direction, while the space K3 is gradually increased toward the outer radial direction. This makes a cylindrical shape of the magnetic field portion Fs as a whole.

As shown in FIG. 16, the space K3 is filled with a non-magnetic and insulating material, for example. For example, the magnetic field cores 22N and 22S and the magnets Mg are fixed to each other by a fixing portion 23. The fixing portion 23 is formed of resin, for example. The space K3 between the adjacent partial magnetic field cores 22f is filled with the fixing portion 23. This structure can improve the positional accuracy of the magnetic field cores 22N and 22S and the workability of the rotary electric machine assembly operation. That is, when the number of poles of magnetic field portions is increased and the distance (mechanical angle) between the magnetic field cores 22N and 22S is reduced, the impact of the positional accuracy of the magnetic field cores 22N and 22S on the performance of rotary electric machine is increased. Further, when the number of parts is increased by the increased number of poles and the parts are fixed in close contact, the accumulated errors in dimension of the parts may occur and reduce the positional accuracy of the magnetic field cores. In this regard, in the structure of the magnetic field portion Fs shown in FIG. 16, the magnetic field cores 22N and 22S each are composed of two partial magnetic field cores 22f, and the space K3 is provided between such two partial magnetic field cores 22f. As such, the accumulation of the dimensional errors is reduced, and the positional accuracy of the magnetic field cores 22N and 22S and the magnets Mg can be improved. Further, the magnetic field portion Fs can be handled integrally during the assembly operation of the rotary electric machine, and the workability of the assembly operation can be thereby improved.

In the manufacturing process of magnetic field portion Fs, for example, a plurality of magnets Mg and a plurality of partial magnetic field cores 22f are positioned by jigs or fixtures. Thereafter, the magnets Mg and the partial magnetic field cores 22f are molded with a non-magnetic and insulating material (specifically, resin 23) and fixed. At this time, all of the magnets Mg and partial magnetic field cores 22f may be positioned and molded with the resin 23, or the magnetic field portion Fs may be divided into a plurality of parts and each part may be molded with the resin 23. In this case, the parts, each of which is molded, are disposed in the rotation direction and fixed to one another to form an annular magnetic field portion Fs. Each of the parts may be fixed to the fixing member to form the annular magnetic field portion Fs.

Each partial magnetic field cores 22f is disposed close to the surface of the magnet Mg (surfaces of N pole and S pole). Each partial magnetic field core 22f may be in contact with the surface (N pole surface or S pole surface) of the magnet Mg. Each partial magnetic field core 22f may be fixed to the surface of the magnet Mg with an adhesive. This makes no space between the magnet Mg and the magnetic field cores 22N and 22S, thereby preventing a decrease in magnetic force.

Each partial magnetic field core 22f is formed of laminated steel sheets. That is, each partial magnetic field core 22f is formed of a plurality of steel sheets 22e laminated in the rotation direction. In the present specification, the "direction in which a plurality of steel sheets 22e are laminated" includes not only the literal rotation direction centered on the axis Ax but also a direction of a tangent of the circle around the axis Ax at the position of the partial magnetic field core 22f. The plurality of steel sheets 22e forming the partial magnetic field core 22f have the same width (thickness) in the rotation direction. Each partial magnetic field core 22f may be composed of only one steel sheet.

As shown in FIG. 10, the structures of the magnetic field portion Fs described above may be applied to the magnetic field portion Fs disposed inside the armature portion in the radial direction of the rotary electric machine. Further, the present invention may be applied to a linear electric machine or an axial gap type rotary electric machine described later.

In the magnetic field cores 22N and 22S, the partial magnetic field core 22f may be formed of a soft magnetic powder material. In this case, the space between the two partial magnetic field cores 22f forming the magnetic field cores 22N and 22S may be filled with a nonmagnetic and insulating material. For example, magnetic field core 22N and 22S and the magnets Mg are molded with resin, and the space is filled with resin. As yet another example, the magnetic field cores 22N and 22S may not have a plurality of partial magnetic field cores 22f. In this case, the partial magnetic field core 22f may be formed of a soft magnetic powder material instead of the laminated steel sheets.

[Linear Electric Machine]

Figure 17:
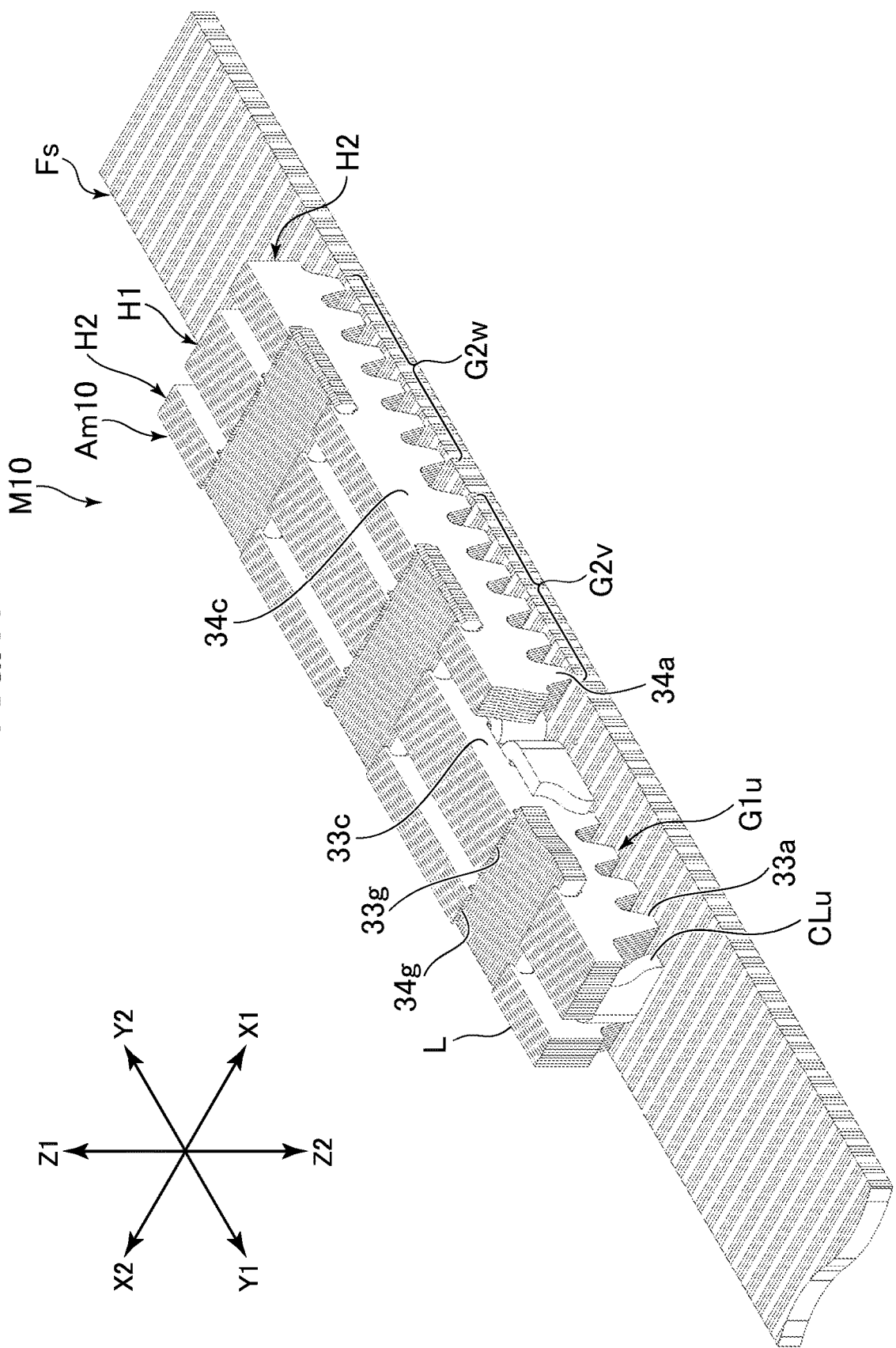
FIG. 17 is a perspective view of a linear electric machine as a ninth example in which the armature portion and the magnetic field portion are relatively movable along a straight line.

The structure of the electric machine proposed in the present disclosure may be applied to a linear electric machine in which an armature portion and a magnetic field portion are relatively movable in a direction along a straight line. FIG. 17 is a perspective view of a linear electric machine M10 as an example of a linear electric machine to which the structure proposed in the present disclosure is applied.

In the linear electric machine M10 as well, the armature core having a partial core, the armature core using a soft magnetic powder material, the armature core having two coils CL having different winding directions for each phase, and the armature core having a projecting portion at the end of magnetic pole may also be applied.

The linear electric machine M10 has a magnetic field portion Fs and an armature portion Am10. The magnetic field portion Fs and the armature portion Am10 are relatively movable in a direction along a straight line (machine moving direction, in Y1-Y2 direction in FIG. 17). Hereinafter, Y1-Y2 direction is referred to as a "front-rear direction." For example, the magnetic field portion Fs is fixed to a structure of the device on which the linear electric machine M10 is mounted, and the armature portion Am10 is guided to move in the front-rear direction. In this case, the magnetic field portion Fs has a length corresponding to the range of motion of the armature portion Am10. In contrast, the armature portion Am10 may be fixed to the structure of the device on which the linear electric machine M10 is mounted, and the magnetic field portion Fs may be guided to move in the direction along the straight line.

The magnetic field portion Fs includes a plurality of magnets Mg disposed in the front-rear direction. The magnets Mg are magnetized in the front-rear direction. In the magnetic field portion Fs, the magnets Mg are arranged so that the surfaces of the same polarity (magnetic pole surfaces) face each other similarly to the magnetic field portion Fs of the rotary electric machine M1, for example. The magnet Mg is disposed between two adjacent magnetic field cores 22N and 22S. Each of the magnetic field cores 22N and 22S may be formed of partial magnetic field cores 22f that are located away from each other in the front-rear direction. The partial magnetic field core 22f may be formed of laminated steel sheets or a soft magnetic powder material.

The armature portion Am10 includes a plurality of armature cores H1 and H2 that are disposed in the left-right direction (X1-X2 direction in FIG. 17) and the core coupling portion L. As shown in FIG. 17, the armature portion Am10 includes, for example, a first armature core H1 and two second armature cores H2. The first armature core H1 is disposed between the two second armature cores H2. The first armature core H1 and the second armature core H2 are magnetically coupled by the core coupling portion L alone and magnetically separated in the areas other than the core coupling portion L.

The armature portion Am10 may be molded with resin. In this case, the resin for molding the armature cores H1 and H2 may be filled in the space between the first armature core H1 and the second armature core H2. The number of armature cores constituting the armature Am10 is not limited to the example shown in FIG. 17. For example, the armature portion Am10 may include one first armature core H1 and one second armature core H2. The armature cores H1 and H2 are laminated steel sheets such as electrical steel sheets laminated in the left-right direction.

As shown in FIG. 17, the first armature core H1 has a plurality of magnetic pole groups G1 arranged in the front-rear direction, and each of the magnetic pole groups G1 has a plurality of magnetic poles 33a disposed in the front-rear direction. The second armature core H2 also has a plurality of magnetic pole groups G2 arranged in the front-rear direction. Each of the magnetic pole groups G2 has a plurality of magnetic poles 34a arranged in the front-rear direction. Each coil CL is wound around the magnetic poles 33a constituting the magnetic pole group G1.

The first armature core H1 includes a yoke portion 33c extending in the front-rear direction. The second armature core H2 includes a yoke portion 34c extending in the front-rear direction. The magnetic poles 33a and 34a project from the yoke portions 33c and 34c toward the magnetic field portion Fs, and the magnetic pole groups G1 and G2 are formed on the yoke portion 33c and 34c on the magnetic field portion Fs side. The magnetic pole groups G1 arranged in the front-rear direction are magnetically connected via the yoke portion 33c. Further, the magnetic pole groups G2 arranged in the front-rear direction are magnetically connected via the yoke portion 34c.

The linear electric machine M10 is a linear motor driven by three-phase alternating current, for example, and the first armature core H1 includes a U phase coil CLu, a V phase coil CLv (not shown), and a W phase coil CLw (not shown). These three coils CL are provided in each of the three magnetic pole groups G1. The number of phases of the alternating current supplied to the linear electric machine is not limited to three.

As shown in FIG. 17, the magnetic pole group G2 of the second armature core H2 is positioned in the left-right direction with respect to the magnetic pole group G1 of the first armature core H1, and forms a magnetic pole group pair P together with the magnetic pole group G1. The positional relationship between the magnetic poles 33a constituting the magnetic pole group G1 and the magnetic poles 34a constituting the magnetic pole group G2 may be the same as the relationship between the magnetic poles 33a and 34a of the rotary electric machine M1. That is, the positions of the magnetic poles 33a of the magnetic pole group G1 are apart from the positions of the magnetic poles 34a of the magnetic pole group G2 by 180 degrees in electrical angle, for example.

The core coupling portion L extends in the left-right direction and magnetically couples the armature cores H1 and H2. The linear electric machine M10 has a plurality of core coupling portions L disposed in the front-rear direction at intervals. The core coupling portions L are provided in each of the magnetic pole group pairs P (pairs of magnetic pole groups G1 and G2 positioned correspondingly in the front-rear direction). As such, a magnetic path is formed between the magnetic pole group G1 of the first armature core H1 and the magnetic pole group G2 of the second armature core H2 through the core coupling portion L.

As described above, the armature portion Am10 has one first armature core H1 and two second armature cores H2. The core coupling portions L magnetically couple these three armature cores H1 and H2. Each core coupling portion L extends from the right end of the second armature core H2 on the right side to the left end of the second armature core H2 on the left side. Alternatively, the armature portion Am10 may include two core coupling portions L arranged in the left-right direction. The first core coupling portion L may couple the first armature core H1 and one of the second armature cores H2, and the second core coupling portion L may couple the first armature core H1 and the other one of the second armature cores H2.

The core coupling portion L is positioned opposite to the magnetic field portion Fs across the magnetic pole groups G1 and G2 and the coils CL provided thereon. In FIG. 17, the magnetic field portion Fs is disposed below the armature cores H1 and H2, and the core coupling portion L is disposed above the armature cores H1 and H2. This structure can prevent the magnetic fluxes Φ1 and Φ2 (see FIG. 3B), which flow through the two magnetic pole groups G1 located away from each other in the front-rear direction and the two magnetic pole groups G2 located away from each other in the front-rear direction, from interfering with the magnetic flux Φ7 (see FIG. 3B) flowing through the core coupling portion L.

The core coupling portion L is laminated steel sheets including a plurality of steel sheets laminated in the direction intersecting with the lamination direction of the steel sheets of the armature cores H1 and H2. Specifically, the core coupling portion L is laminated steel sheets including a plurality of steel sheets laminated in the front-rear direction. This prevents the generation of an induced current in the steel sheets of the core coupling portion L.

The core coupling portion L magnetically couples the yoke portions 33c and 34c. In the armature portion Am10, the yoke portions 33c and 34c have fitting holes 33g and 34g on the surface opposite to the magnetic field portion Fs (in FIG. 17, the upper surfaces of the armature cores H1 and H2). The core coupling portions L are fitted into the fitting holes 33g and 34g. The fitting holes 33g and 34g are open in the direction intersecting the lamination direction of the steel sheets constituting the armature cores H1 and H2. The fitting holes 33g and 34g are open (upward) toward the opposite side of the magnetic field portion Fs. This structure can prevent the generation of an induced current in the armature cores H1 and H2 due to the magnetic flux flowing through the core coupling portion L.

Unlike the armature portion Am10, the fitting hole into which the core coupling portion L is fitted may have a closed inner surface through the yoke portions 33c and 34c similarly to the rotary electric machine M1 in FIG. A. That is, the fitting hole may not be open upward. In this case, slits S3 and S4 (see FIGS. 1C and 1D) extending from the fitting hole toward the magnetic field portion Fs may be formed.

As yet another example, the core coupling portion L may be integrally formed with one of the armature cores H1 and H2. In the armature portion Am10, one or both of the armature cores H1 and H2 may be formed of a soft magnetic powder material. In this case, the armature core formed of a powder material may be integrally formed with the core coupling portion.

The width of the core coupling portion L in the front-rear direction is smaller than the width of the magnetic pole groups G1 and G2 in the front-rear direction. Accordingly, the magnetic flux Φ7 P (see FIG. 3B) flowing through the core coupling portion L between the two magnetic pole groups G1 and G2 constituting the magnetic pole group pair and the magnetic fluxes Φ1 and Φ2 (see FIG. 3B) flowing between the two magnetic pole groups G1 located away from each other in the front-rear direction (and two magnetic pole groups G2 located away from each other in the front-rear direction) are more effectively formed.

For example, similarly to the examples shown in FIGS. 1C and 1D, it is preferable that one or a plurality of magnetic poles 33a disposed at the front end of the magnetic poles 33a constituting the magnetic pole group G1 are disposed forward of the front end of the core coupling portion L, and one or a plurality of magnetic poles 33a disposed at the rear end of the plurality of magnetic poles 33a are disposed rearward of the rear end of the core coupling portion L. Similarly, it is preferable that one or a plurality of magnetic poles 34a disposed at the front end of the magnetic poles 34a constituting the magnetic pole group G2 are disposed forward of the front end of the core coupling portion L, and one or a plurality of magnetic poles 34a disposed at the rear end of the plurality of magnetic poles 34a are disposed rearward of the rear end of the core coupling portion L.

Similarly to the rotary electric machine described above (e.g., rotary electric machine M1), the linear electric machine M10 has two types of magnetic circuits. That is, a first magnetic circuit includes two magnetic pole groups G1 located away from each other in the front-rear direction, two magnetic pole groups G2 located away from each other in the front-rear direction, magnetic field cores 22N and 22S facing the magnetic pole groups G1 and G2, and magnets Mg between the magnetic field cores 22N and 22S. For example, as shown in FIG. 3B, when the difference in angles between the magnetic field core 22N of the magnetic field portion Fs and the magnetic pole 33a of the magnetic pole group G1u is 0 degrees (electrical angle), the magnetic fluxes Φ1 and Φ2 are formed by the magnets Mg in the first magnetic circuit.

The second magnetic circuit includes a core coupling portion L, magnetic pole groups G1 and G2 aligned in the left-right direction and magnetically coupled via the core coupling portion L, magnetic field cores 22N and 22S opposite to the magnetic pole group G1 and the magnetic pole group G2, and magnets Mg between the magnetic field cores 22N and 22S. For example, as shown in FIG. 3B, when the difference in angles between the magnetic field core 22N of the magnetic field portion Fs and the magnetic pole 33a of the magnetic pole group G1u is 0 degrees (electrical angle), the magnetic flux Φ7 is formed by the magnets Mg in the second magnetic circuit. The magnetic fluxes Φ1, Φ2, and Φ7 pass inside the coils CL provided in the magnetic pole group G1.

The linear electric machine M10 eliminates the need to magnetically divide the armature cores H1 and H2 in the front-rear direction. As such, the intensity of the armature cores H1 and H2 can be increased. Further, magnetic fluxes are formed in the magnetic circuit including the core coupling portion L and the magnetic circuit including the two magnetic pole groups G1 and G2 disposed in the front-rear direction. As such, the magnetic saturation of the magnetic circuit can be reduced. This serves to narrow the width of the yoke portions 33c and 34c and easily reduce the armature portion Am10 in size and weight, for example. This is particularly advantageous when increasing the number of magnetic poles 33a and 34a constituting the magnetic pole groups G1 and G2. Further, the magnetic fluxes that saturate the magnetic circuit can be increased without increasing the width of the yoke portions 33c and 34c, and thus the current supplied to the coil CL can be increased and the output torque of the rotary electric machine can be increased.

[Armature Cores Disposed in Different Positions Relative to Magnetic Field Portion]

In the electric machine described above (e.g., rotary electric machine M1 shown in FIG. 1A), the armature cores H1 and H2 are positioned in the same direction with respect to the magnetic field portion Fs. Alternatively, the first armature core H1 may be positioned in a first direction relative to the first surface of the magnetic field portion Fs, and the second armature core H2 may be positioned in a second direction relative to the second surface of the magnetic field portion Fs. The first direction and the second direction are two directions facing away from each other or intersecting each other, for example. In this structure as well, the armature portion may have a core coupling structure (e.g., a plurality of core coupling portions L disposed in the machine moving direction) in which the armature cores H1 and H2 and are magnetically coupled. Such a structure may be applied to the rotary electric machine or the linear electric machine.

In the following, the structure will be described with reference to the drawings in which the angle between the first direction and the second direction is 180 degrees (i.e., the first direction and the second direction are opposite to each other) and the structure in which the angle between the first direction and the second direction is 90 degrees. The angles between the first direction and the second direction are not limited thereto, and may be an angle smaller than 90 degrees or an angle larger than 90 degrees and smaller than 180 degrees.

[Examples of Armature Cores Arranged Oppositely with Magnetic Field Portion]

Figure 18A:
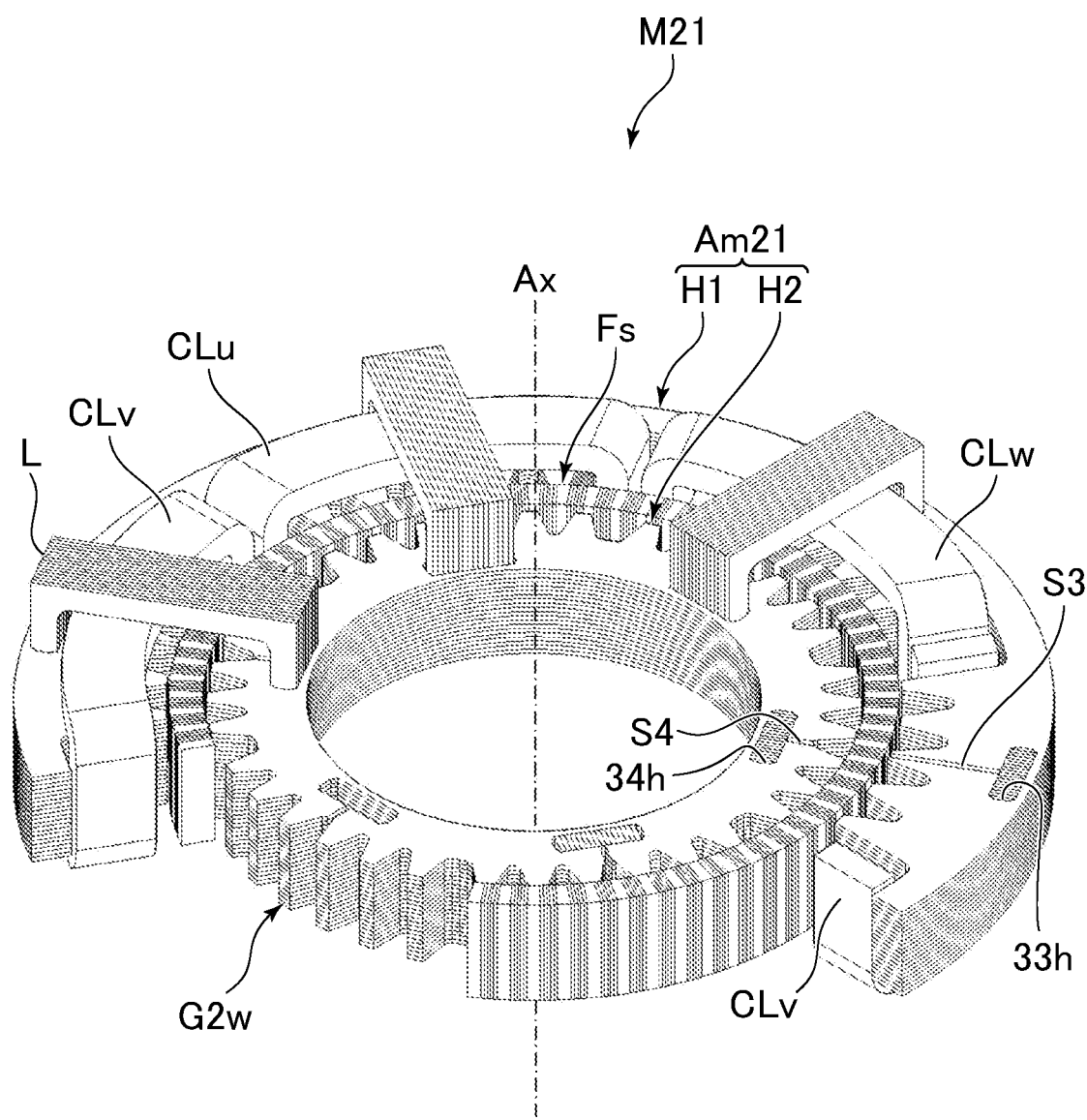
FIG. 18A is a perspective view of a radial gap type electric machine according to a tenth example having two armature cores positioned opposite to each other across the magnetic field portion.
Figure 18B:
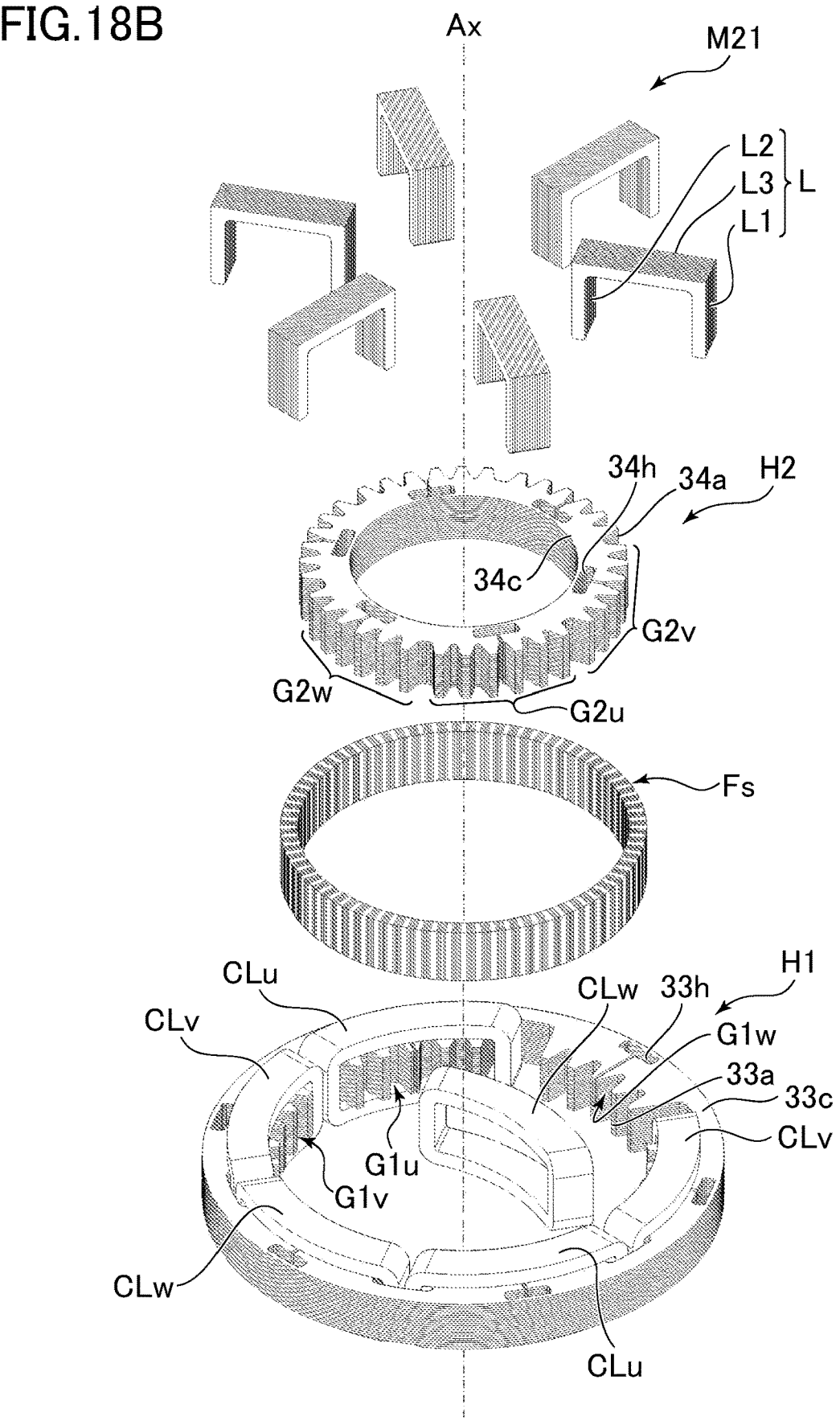
FIG. 18B is an exploded perspective view of the rotary electric machine shown in FIG. 18A.
Figure 18C:
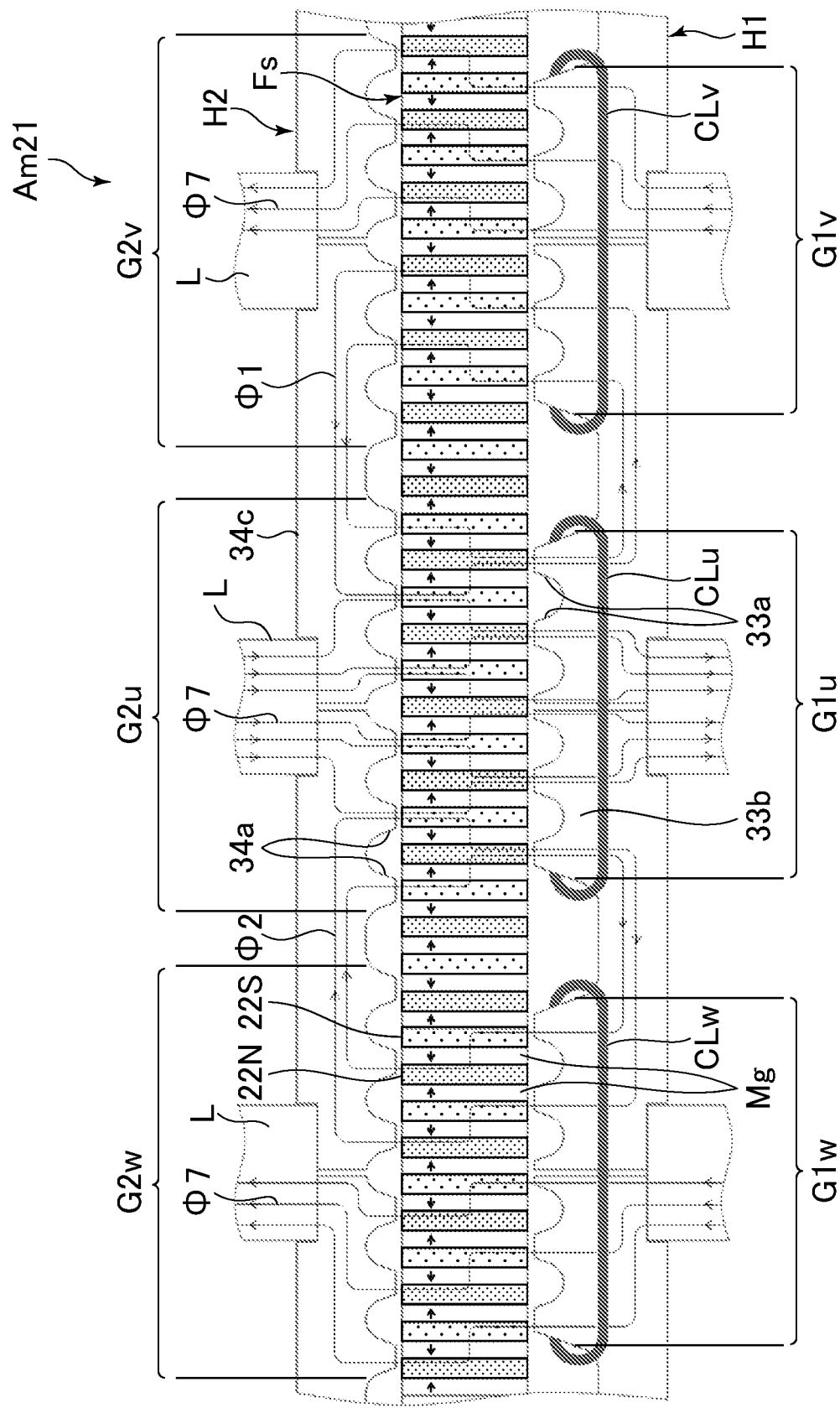
FIG. 18C is a diagram showing a magnetic flux formed in the rotary electric machine shown in FIG. 18A.

FIGS. 18A to 18C are diagrams illustrating a radial gap type rotary electric machine M21 as an example of the electric machine having the first armature core H1 and the second armature core H2 that are differently positioned relative to the magnetic field portion Fs. FIG. 18A is a perspective view of the rotary electric machine M21 and FIG. 18B is an exploded perspective view of the rotary electric machine M21. FIG. 18C is a diagram illustrating magnetic fluxes formed in the rotary electric machine M21. In the following, differences from the rotary electric machine M1 described with reference to FIG. 1A will be mainly described. The examples of FIG. 1A may be applied to the matters that are not described in the electric machine M21 shown in FIGS. 18A to 18C.

As shown in FIG. 18A, in rotary electric machine M21, the first armature core H1 and the second armature core H2 are disposed opposite to each other with magnetic field portion Fs interposed therebetween. The magnetic field portion Fs has a tubular shape. The first armature core H1 is disposed radially outward (first direction) with respect to the outer peripheral surface (first surface) of the magnetic field portion Fs, and the second armature core H2 is disposed radially inward (second direction) with respect to the inner peripheral surface (second surface) of the magnetic field portion Fs. The magnetic field cores 22N and 22S of the magnetic field portion Fs are preferably exposed on both the inside and the outside thereof. This can reduce the magnetoresistance between the magnetic field portion Fs and the armature cores H1 and H2. Contrary to the rotary electric machine M21, the first armature core H1 may be disposed radially inward with respect to the inner peripheral surface of the magnetic field portion Fs, and the second armature core H2 may be disposed radially outward with respect to the outer peripheral surface of the magnetic field portion Fs.

As shown in FIG. 18B, the first armature core H1 has a plurality of magnetic pole groups G1 disposed in the rotation direction, which are magnetically coupled via the yoke portion 33c. The rotary electric machine M21 is driven by a three-phase alternating current, for example, and a U phase coil CLu, a V phase coil CLv, and a W phase coil CLw are provided in the first armature core H1. These three coils CLu, CLv, and CLw are respectively provided in the three magnetic pole groups G1u, G1v, and G1w. The winding directions of the three coils CL may be the same. The magnetic pole group G1 has a plurality of magnetic poles 33a that are opposed to the magnetic field cores 22N and 22S of the magnetic field portion Fs in the radial direction. The second armature core H2 also has a plurality of magnetic pole groups G2 disposed in the rotation direction, which are magnetically coupled via the yoke portion 34c. The magnetic pole group G2 has a plurality of magnetic poles 34a that are opposed to the magnetic field cores 22N and 22S of the magnetic field portion Fs in the radial direction. The two magnetic pole groups G1 and G2 facing each other across the magnetic field portion Fs constitute a magnetic pole group pair P. In the example shown in FIG. 18B, each magnetic pole group G1 is formed of five magnetic poles 33a each formed of six magnetic poles 34a. The number of magnetic poles 33a and 34a constituting the respective magnetic pole groups G1 and G2 is not limited to this example.

In the rotary electric machine M21, the number of poles of the magnetic field portion Fs is 76 (p=38), for example. The electrical angle between adjacent magnetic pole group pairs P is expressed as 360×(n+m/s), and is 2,280 degrees, for example. The mechanical angle between adjacent magnetic pole group pairs P is expressed as (360/p)×(n+m/s) and substantially matches the "360/s/c". This mechanical angle is 60 degrees, for example, in the rotary electric machine M21 (s=3, m=1, n=6, c=2 in rotary electric machine M21).

As shown in FIG. 18B, the armature portion Am21 has a plurality of core coupling portions L disposed at intervals in the rotation direction. The core coupling portions L are respectively provided in the magnetic pole group pairs P. The magnetic pole groups G1 and G2 is formed on the yoke portions 33c and 34c on the magnetic field portion Fs side. Each core coupling portion L magnetically couples the yoke portions 33c and 34c. The position of the core coupling portion L in the rotation direction corresponds to the position of the magnetic pole groups G1 and G2 constituting the magnetic pole group pairs P. Specifically, the center of the core coupling portion L in the rotation direction corresponds to the position of the center of the magnetic pole groups G1 and G2 in the rotation direction.

As shown in FIG. 18B, the yoke portion 33c has fitting holes 33h on the side opposite to the magnetic field portion Fs across the magnetic pole group G1, and the yoke portion 34c has fitting holes 34h on the side opposite to the magnetic field portion Fs across the magnetic pole group G2. The fitting holes 33h and 34h penetrate the armature cores H1 and H2 in the axis direction. The ends of the core coupling portion L are fitted into the fitting holes 33h and 34h in the axis direction to magnetically couple the yoke portions 33c and 34c. Both ends of the core coupling portion L are positioned opposite to each other across the coil CL. Each core coupling portion L has an extending portion L3 extending radially and fitting portions L1 and L2 extending in the axis direction from both ends of the extending portion L3. The fitting portion L1 is fitted into the fitting hole 33h of the first armature core H1, and the fitting portion L2 is fitted into the fitting hole 34h of the second armature core H2.

The magnetic flux formed in the armature portion Am21 is substantially the same as the magnetic flux described with reference to FIG. 3B. Specifically, as shown in FIG. 18C, when the angular difference between the magnetic field core 22N of the magnetic field portion Fs and the magnetic pole 33a of the magnetic pole group G1u is 0 degrees (electrical angle), the magnetic fluxes Φ1, Φ2, and Φ7 by the magnets Mg are formed on the armature portion Am21 and the magnetic field portion Fs. The magnetic circuit in which the magnetic flux Φ1 is formed includes the magnetic pole groups G1u and G1v of the first armature core H1, the magnetic pole groups G2u and G2v of the second armature core H2, the magnetic field cores 22N and 22S, and the magnets Mg between the magnetic field cores 22N and 22S. Similarly, the other one of the first magnetic circuits is a magnetic circuit in which the magnetic flux Φ2 is formed, and includes the magnetic pole groups G1u and G1w of the first armature core H1, the magnetic pole groups G2u and G2w of the second armature core H2, the magnetic field cores 22N and 22S, and the magnets Mg between the two magnetic field cores. One of the second magnetic circuit through which the magnetic flux Φ7 flows includes the magnetic pole group G1u of the first armature core H1, the core coupling portion L, the magnetic pole group G2u of the second armature core H2, the magnetic field cores 22N and 22S, and the magnets Mg between the two magnetic field cores 22N and 22S.

Unlike the conventional rotary electric machine, such a rotary electric machine M21 eliminates the need to magnetically divide the armature cores H1 and H2 in the rotation direction. As such, the intensity of the armature cores H1 and H2 can be increased. Further, magnetic fluxes are formed in two circuits of the magnetic circuit including the core coupling portion L and the magnetic circuit including two magnetic pole groups located away from each other in the rotation direction (e.g., magnetic pole groups G1u, G1v). As such, the magnetic saturation of the magnetic circuit can be reduced. This serves to narrow the width of the yoke portions 33c and 34c and easily reduce the armature portion Am21 in size and weight, for example. This is particularly advantageous when increasing the number of magnetic poles 33a and 34a constituting the magnetic pole groups G1 and G2. Further, the magnetic fluxes that saturate the magnetic circuit can be increased without increasing the width of the yoke portions 33c and 34c, and thus the current supplied to the coil CL can be increased and the output torque of the rotary electric machine can be increased.

In the first armature core H1 of the armature portion Am21, it is preferable that at least two magnetic poles 33a at both ends of the magnetic poles 33a constituting the magnetic pole group G1 are positioned outward (clockwise direction and counterclockwise direction) from the both ends of the core coupling portion L. Similarly, in the second armature core H2 of the armature portion Am21, it is preferable that at least two magnetic poles 34a at both ends of the magnetic poles 34a constituting the magnetic pole group G2 are positioned outward (clockwise direction and counterclockwise direction) from the both ends of the core coupling portion L. This serves to easily form the magnetic fluxes Φ1 and Φ2 flowing between the two magnetic pole groups located away from each other in the rotation direction.

As shown in FIG. 18A, a slit S3 extending from each fitting hole 33*h* and intersecting with a closed curve surrounding each fitting hole 33*h* is formed in the first armature core H1. Similarly, a slit S4 extending from each fitting hole 34*h* and intersecting with a closed curve surrounding each fitting hole 34*h* is formed in the second armature core H2. The slits S3 and S4 can prevent an induced current from occurring around the respective core coupling portions L. Preferably, as shown in FIG. 18A. the slits S3 and S4 reach the opening facing the magnetic field portion Fs.

A closed circuit passing between the fitting holes 33*h* and the magnetic pole groups G1 and passing through the entire first armature core H1 about the axis Ax is interrupted by the slit S3. Further, a closed circuit passing between the fitting holes 34*h* and the magnetic pole groups G2 and passing through the entire second armature core H2 about the axis Ax is interrupted by the slit S4. As such, the slits S3 and S4 can prevent an induced current from occurring in the rotation direction in the armature cores H1 and H2.

Figure 19:
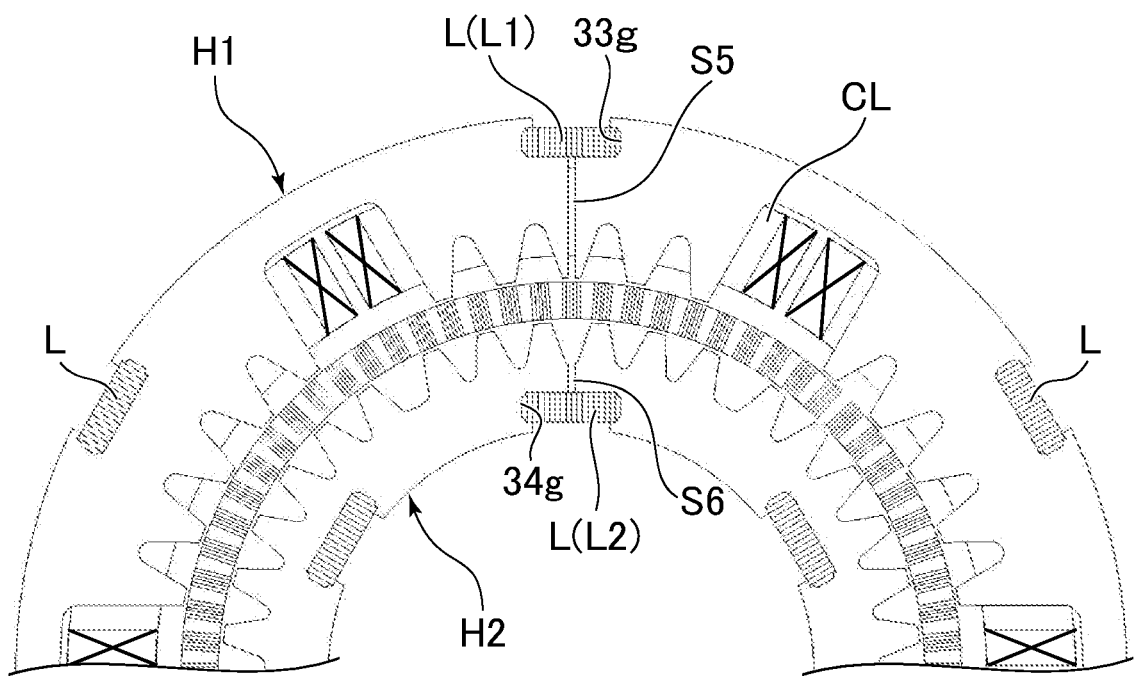
FIG. 19 is a modification of a mounting structure of the core coupling portion provided in rotary electric machine shown in FIG. 18A.

As shown in FIG. 19, the first armature core H1 may have a fitting hole 33*g* that is open so as to intersect the lamination direction of the steel sheets of the first armature core H1. In the example of FIG. 19, the fitting hole 33*g* is formed on the outer peripheral surface of the first armature core H1 and opens opposite to the magnetic field portion Fs. Further, as shown in FIG. 19, the second armature core H2 may also have a fitting hole 34*g* that is open so as to intersect the lamination direction of the steel sheets of the second armature core H2. In the example shown FIG. 19, the fitting hole 34*g* is formed on the outer peripheral surface of the second armature core H2 and opens opposite to the magnetic field portion Fs. This structure can also prevent an induced current from occurring around the respective core coupling portions L.

In the structure of FIG. 19, a slit S5 may be formed in the first armature core H1, and a slit S6 may be formed in the second armature core H2. The slits S5 and S6 intersect a closed curve passing between the magnetic pole groups G1 and G2 disposed in the rotation direction and the fitting holes 33*g* and 34*g* and surrounding the axis Ax. The slits S5 and S6 can prevent an induced current from occurring in the rotation direction in the armature cores H1 and H2. In the example shown FIG. 19, the slits S5 and S6 extend from the fitting holes 33*g* and 34*g* and reach the opening facing the magnetic field portion Fs.

Unlike the example of FIG. 19, the slit S5 may be formed between two adjacent magnetic pole groups G1 and open at a surface of the first armature core H1 opposite to the magnetic field portion Fs side. Further, the slit S6 may be formed between two adjacent magnetic pole groups G2 and open at a surface of the second armature core H2 opposite to the magnetic field portion Fs side.

Figure 20:
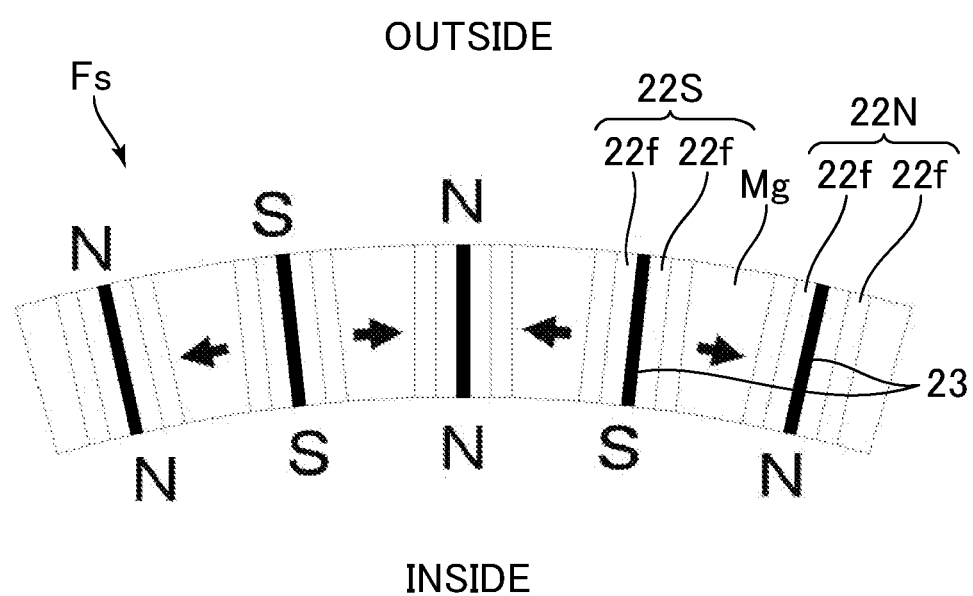
FIG. 20 is a cross-sectional view of the magnetic field portion of the rotary electric machine shown in FIG. 18A. The cross section is a plane orthogonal to the axis.

FIG. 20 is of a cross-sectional view of an example of the magnetic field portion Fs of the rotary electric machine M21. The cut plane is a plane orthogonal to the axis. The magnetic field portion Fs shown in FIG. 20 has magnetic field cores 22N and 22S formed of electrical steel sheets laminated in the machine moving direction (the rotation direction in FIG. 20). Unlike the magnetic field portion Fs shown in FIG. 16, the magnetic field cores 22N and 22S are exposed on the inner peripheral surface and the outer peripheral surface of the magnetic field portion Fs. This structure can reduce the magnetoresistance between the first armature core H1 and the magnetic field portion Fs and the magnetoresistance between the second armature core H2 and the magnetic field portion Fs.

In the magnetic field portion Fs, each of magnetic field cores 22N and 22S has two partial magnetic field cores 22*f* each formed of a plurality of electrical steel sheets. A fixing portion 23 is filled between the two partial magnetic field cores 22*f*. The fixing portion 23 is formed of, for example, a non-magnetic and insulating material, such as a resin. The width of the magnet Mg is gradually increased toward the outer peripheral surface. Alternatively, the width of the fixing portion 23 may gradually increase toward the outer peripheral surface, or the width of the partial magnetic field core 22*f* may gradually increase toward the outer peripheral surface.

[Linear Electric Machine where the Armature Core is Disposed on the Opposite Side]

Figure 21A:
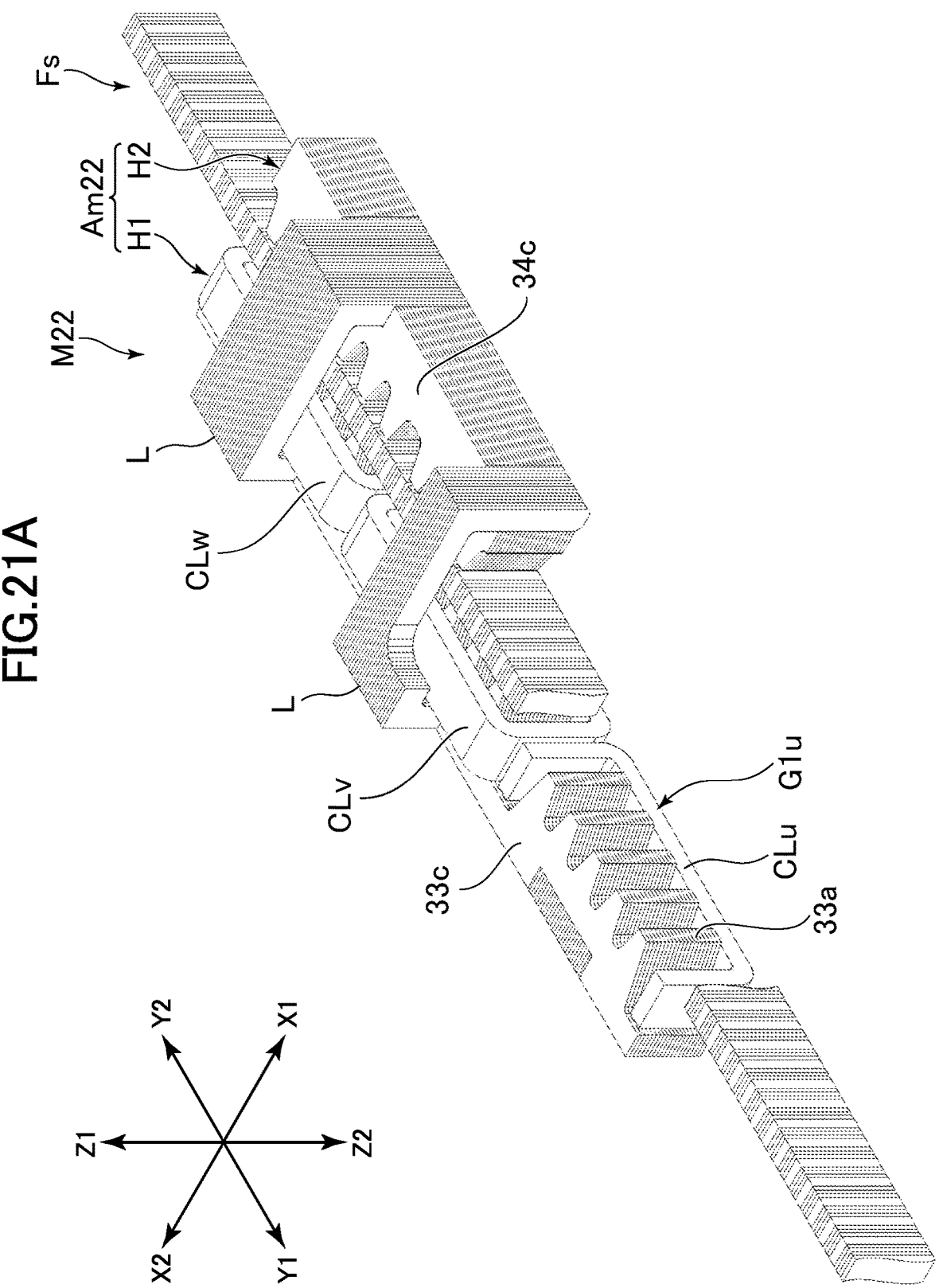
FIG. 21A is a perspective view of an electric machine according to an eleventh example, in which two armature cores positioned opposite to each other across the magnetic field portion.
Figure 21B:
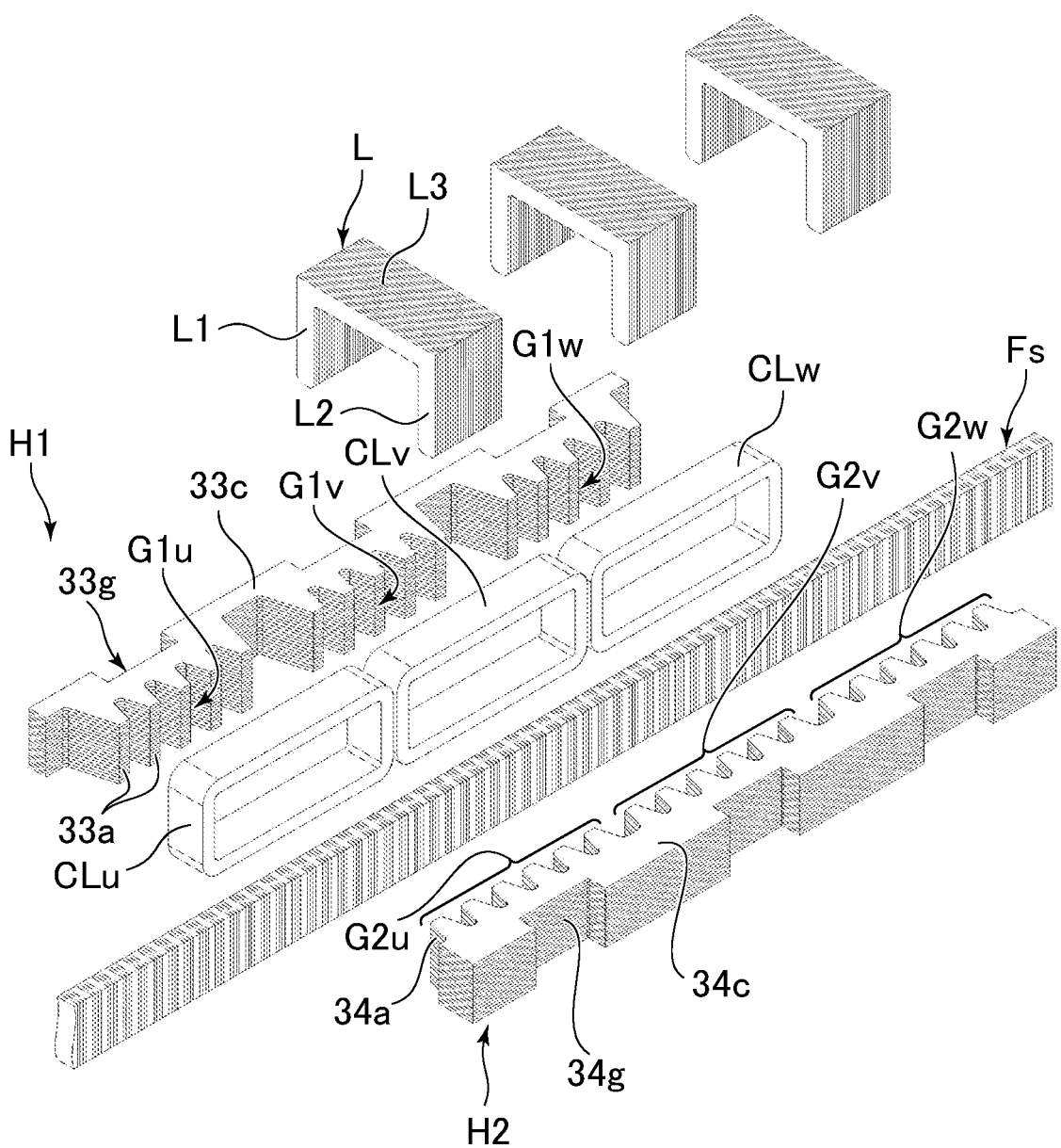
FIG. 21B is an exploded perspective view of the linear electric machine shown in FIG. 21A.

The arrangement of the armature cores disclosed in FIGS. 18A and 18B may be applied to a linear electric machine in which an armature portion and a magnetic field portion are relatively movable in a direction along a straight line. FIGS. 21A and 21B are diagrams illustrating an example of a linear electric machine. FIG. 21A is a perspective view of a linear electric machine M22 and FIG. 21B is an exploded perspective view of the linear electric machine M22. In FIG. 21A, a part of the magnetic field portion Fs and a part of the second armature core H2 are omitted. In the following, differences from the radial gap type rotary electric machine M21 shown in FIGS. 18A and 18B will be mainly described. The structure of the linear electric machine M21 may be applied to the matters that are not described about the rotary electric machine M22.

As shown in FIG. 21A, in the linear electric machine M22, the magnetic field portion Fs and the armature portion Am22 are relatively movable in a direction along the straight line (direction Y1-Y2 in FIG. 21A). In the linear electric machine M22, the Y1-Y2 direction is the machine moving direction and hereinafter referred to as the front-rear direction. For example, the position of the magnetic field portion Fs is fixed, and the armature portion Am22 moves both ways in the front-rear direction. In this case, the magnetic field portion Fs may have a length corresponding to the range of motion of the armature portion Am22.

As shown in FIG. 21A, the first armature core H1 and the second armature core H2 are disposed opposite to each other across the magnetic field portion Fs in the left-right direction (X1-X2 direction in FIG. 21A). The first armature core H1 is disposed leftward of the left surface (the surface facing the X2 direction in FIG. 21A) of the magnetic field portion Fs, and the second armature core H2 is disposed rightward of the right surface (the surface facing the X1 direction in FIG. 21A) of the magnetic field portion Fs. The magnetic field cores 22N and 22S may be exposed on both the right and left sides. This can reduce the magnetoresistance between the armature cores H1 and H2 and the magnetic field portion Fs.

As shown in FIG. 21B, the first armature core H1 has a plurality of magnetic pole groups G1 (G1*u*, G1*v*, G1*w*) arranged in the front-rear direction. Each of the magnetic pole groups G1 has a plurality of magnetic poles 33*a* disposed in the front-rear direction and protruding toward the magnetic field portion Fs. The linear electric machine M22 is a linear motor driven by a three-phase alternating current, for example, and a U phase coil CLu, a V phase coil CLv, and a W phase coil CLw are provided. These three coils CL are provided in each of the three magnetic pole groups G1. The winding directions of the three coils CL may be the same. The second armature core H2 also has a plurality of magnetic pole groups G2 arranged in the front-rear direction. Each of the magnetic pole groups G2 has a plurality of magnetic poles 34*a* disposed in the front-rear direction and protruding toward the magnetic field portion Fs. In the example shown in FIG. 21B, the coil CL is provided only in the first armature core H1, although the coil CL may be provided in both the first armature core H1 and the second armature core H2.

The armature cores H1 and H2 are formed of a plurality of electrical steel sheets laminated in a direction perpendicular (vertical direction) to the direction (left-right direction) to which the armature core H1 and H2 are opposed and the machine moving direction (front-rear direction). Alternatively, one or both of the armature cores H1 and H2 may be formed of a soft magnetic powder material.

As shown in FIG. 21A, the armature portion Am21 has a plurality of core coupling portions L disposed at intervals in the front-rear direction. The core coupling portions L are provided in each of magnetic pole group pairs P (pairs of magnetic pole groups G1 and G2 opposed to each other across the magnetic field portion Fs). The magnetic pole group G1 of the first armature core H1 is positioned on the magnetic field portion Fs side with respect to the yoke portion 33c, and the magnetic pole group G2 of the second armature core H2 is positioned on the magnetic field portion Fs side with respect to the yoke portion 34c. Each core coupling portion L magnetically couples the yoke portions 33c and 34c. The position of the core coupling portion L in the front-rear direction and the position of the magnetic pole group pair P in the front-rear direction correspond to each other.

As shown in FIG. 21B, the yoke portion 33c has fitting holes 33g on the side opposite to the magnetic field portion Fs across the magnetic pole group G1, and the yoke portion 34c has fitting holes 34g on the side opposite to the magnetic field portion Fs across the magnetic pole group G2. The fitting holes 33g and 34g open in the direction intersecting the lamination direction of the steel sheets of the armature cores H1 and H2 (i.e., toward the opposite side of the magnetic field portion Fs). The ends of the core coupling portion L are fitted into the fitting holes 33g and 34g and magnetically couple the yoke portions 33c and 34c. As shown in FIG. 21B, each core coupling portion L has an extending portion L3 extending in the left-right direction and fitting portions L1 and L2 extending downward from both ends of the extending portion L3. The fitting portions L1 and L2 are respectively fitted in the fitting holes 33g and 34g. The fitting holes 33g and 34g are open, and this can prevent an induced current from occurring around the respective core coupling portions L by the magnetic flux passing through the core coupling portions L.

As shown in FIG. 21A, the core coupling portion L is disposed above the coil CL. Alternatively, the armature portion Am22 may have, for each magnetic pole group pair P, a core coupling portion L disposed above the coil CL and a core coupling portion L disposed below the coil CL.

Similarly to the rotary electric machine described above (e.g., rotary electric machine M1), the linear electric machine M22 has two types of magnetic circuits. That is, a first magnetic circuit includes two magnetic pole groups G1 located away from each other in the front-rear direction, two magnetic pole groups G2 located away from each other in the front-rear direction, magnetic field cores 22N and 22S facing the magnetic pole groups G1 and G2, and magnets Mg between the magnetic field cores 22N and 22S. The second magnetic circuit includes a core coupling portion L, magnetic pole groups G1 and G2 facing in the left-right direction and magnetically coupled via the core coupling portion L, magnetic field cores 22N and 22S facing the magnetic pole groups G1 and G2, and magnets Mg between the magnetic field cores 22N and 22S.

As shown in FIG. 21A, the width of the core coupling portion L in the front-rear direction is smaller than the width of the magnetic pole groups G1 and G2 in the front-rear direction. For example, it is preferable that one or a plurality of magnetic poles 33a disposed at the front end of the magnetic poles 33a constituting the magnetic pole group G1 are disposed forward of the front end of the core coupling portion L, and one or a plurality of magnetic poles 33a disposed at the rear end of the plurality of magnetic poles 33a are disposed rearward of the rear end of the core coupling portion L. Similarly, it is preferable that one or a plurality of magnetic poles 34a disposed at the front end of the magnetic poles 34a constituting the magnetic pole group G2 are disposed forward of the front end of the core coupling portion L, and one or a plurality of magnetic poles 34a disposed at the rear end of the plurality of magnetic poles 34a are disposed rearward of the rear end of the core coupling portion L.

Figure 22:
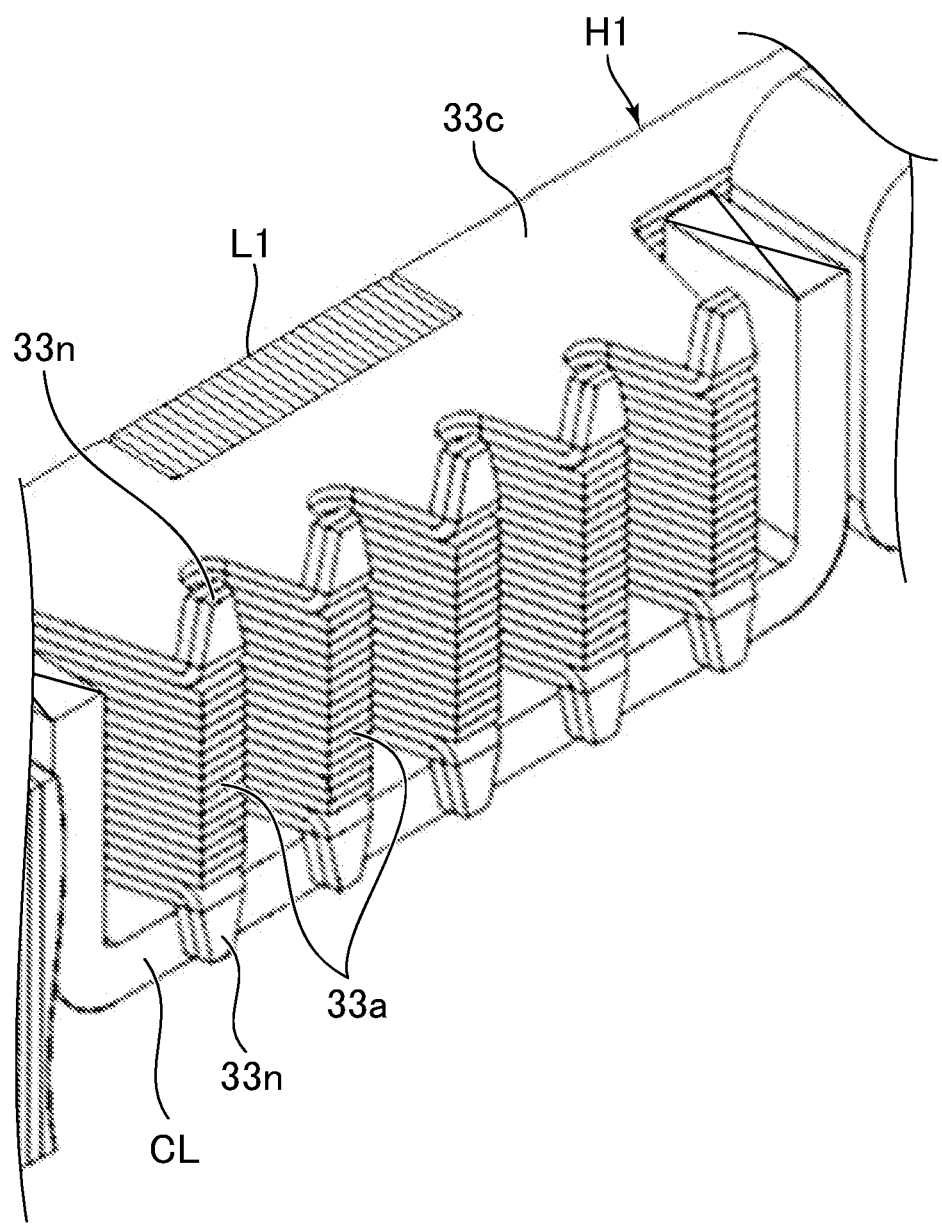
FIG. 22 is a perspective view of an armature core including a magnetic pole having a projecting portion.

The armature cores H1 and H2 of the linear electric machine M22 are laminated steel sheets as described above. Among the plurality of steel sheets laminated in the vertical direction, the steel sheet positioned at the end in the lamination direction may have a projecting portion extending upward or downward in each of the magnetic poles 33a and 34a. FIG. 22 shows an example of such magnetic poles 33a. In the example shown in FIG. 22, the steel sheets disposed at the ends of the magnetic pole 33a have projecting portions 33n extending in the lamination direction. The projecting portion 33n may be formed by bending a steel sheet. Such a projecting portion 33n may be formed on both or either of one or a plurality of steel sheets disposed at one end (e.g., the upper end) in the lamination direction (vertical direction) and one or a plurality of steel sheets disposed at the other end (e.g., the lower end) in the lamination direction. In other example, the projecting portion 33n may not necessarily be formed by bending of the steel sheet. For example, the end of the magnetic pole 33a in the lamination direction may be formed of a soft magnetic powder material having the projecting portion 33n rather than an electrical steel sheet. The structure shown in FIG. 22 may be applied to the second armature core H2.

[Example of Yoke Portion and Magnetic Pole that are Divided]

Figure 23:
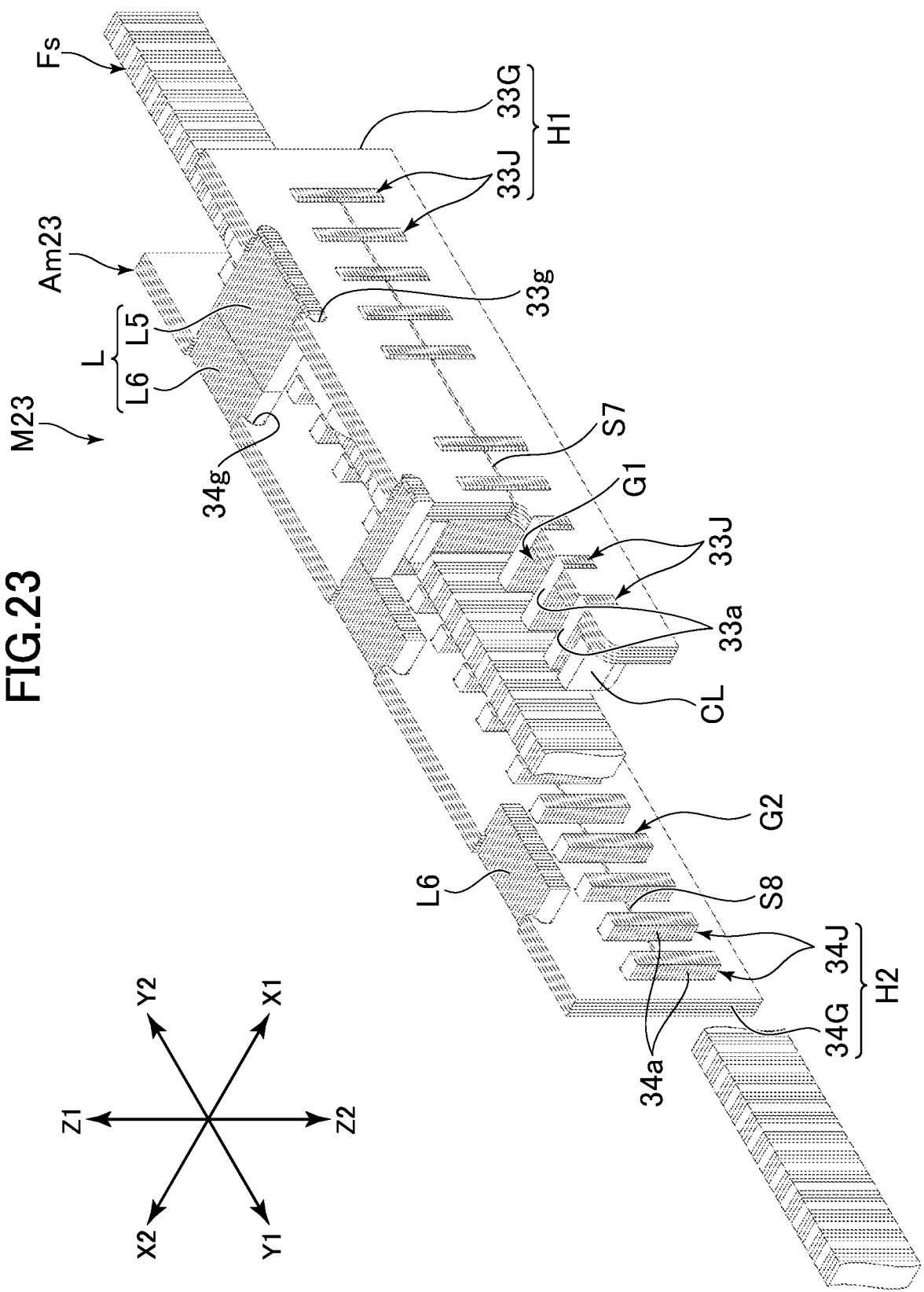
FIG. 23 is a perspective view illustrating an electric machine according to a twelfth example, in which a linear electric machine including an armature core having a yoke partial core and a magnetic pole core is shown.

In the linear electric machine, the armature cores H1 and H2 may have a yoke partial core formed of electrical steel sheets and a magnetic pole core formed of electrical steel sheets and fitted into a fitting hole formed in the yoke partial core. FIG. 23 shows a linear electric machine M23 having such armature cores H1 and H2. Here, the difference from the linear electric machine M22 described with reference to FIGS. 21A and 21B will be mainly described. The structures of the other electric machines described above may be applied to the matters that are not described with respect to the linear electric machine M23 shown in FIG. 23 (e.g., the distance (electrical angle) between the magnetic pole group pairs P and the structure of magnetic field portion Fs). In FIG. 23, a part of the first armature core H1 and a part of the magnetic field portion Fs are omitted in order to show the second armature core H2.

As shown in FIG. 23, the first armature core H1 includes a yoke partial core 33G, which is laminated steel sheets including a plurality of steel sheets laminated in the left-right direction (X1-X2 direction). The first armature core H1 includes a plurality of magnetic pole cores 33J disposed in the front-rear direction (Y1-Y2 direction). Each magnetic pole core 33J is laminated steel sheets including a plurality of steel sheets laminated in the vertical direction (Z1-Z2 direction). The steel sheets of the yoke partial core 33G and the steel sheets of the magnetic pole core 33J are perpendicular to each other. The yoke partial core 33G has a plurality of fitting holes disposed in the front-rear direction. The magnetic pole cores 33J are respectively fitted into the fitting holes and magnetically coupled to the yoke partial core 33G. A part of the magnetic pole core 33J protruding from the surface of the yoke partial core 33G toward the magnetic field portion Fs is a magnetic pole 33a. The magnetic poles 33a (five magnetic poles 33a) constitute a magnetic pole group G1, and a coil CL is provided to each magnetic pole group G1.

As shown in FIG. 23, the second armature core H2 includes a yoke partial core 34G, which is laminated steel sheets including a plurality of steel sheets laminated in the left-right direction. The second armature core H2 has a plurality of magnetic pole cores 34J disposed in the front-rear direction. Each magnetic pole core 34J is laminated steel sheets including a plurality of steel sheets laminated in the vertical direction. That is, the steel sheets of the yoke partial core 34G and the steel sheets of the magnetic pole cores 34J are perpendicular to each other. The yoke partial core 34G has a plurality of fitting holes disposed in the front-rear direction. The magnetic pole cores 34J are respectively fitted into the fitting holes and magnetically coupled to the yoke partial core 34G. A part of the magnetic pole core 34J protruding from the surface of the yoke partial core 34G toward the magnetic field portion Fs is a magnetic pole 34a. In the linear electric machine M23, the magnetic pole group G2 is composed of six magnetic poles 34a.

The steel sheets of magnetic pole cores 33J and 34J are laminated in a direction intersecting both the front-rear direction (machine moving direction) and the left-right direction (the direction facing the armature cores H1 and H2), specifically, in the vertical direction. Unlike the example of the linear electric machine M23, when the steel sheets of the magnetic pole core are laminated in the machine moving direction, an induced current is likely to be generated in the steel sheet located at the end in the machine moving direction. In contrast, in the linear electric machine M23, the steel sheets of the magnetic pole cores 33J and 34a are laminated in the vertical direction, and the generation of such an induced current can be thus prevented.

As shown in FIG. 23, slits S7 and S8 extending from the fitting holes, into which the magnetic pole cores 33J and 34J are fitted, are formed on the yoke partial cores 33g and 34g. In the example of the linear electric machine M23, the slit S7 is formed between two adjacent fitting holes in which the magnetic pole core 33J are respectively fitted. Similarly, the slit S8 is formed between two adjacent fitting holes in which the magnetic pole core 34J are respectively fitted. The slits S7 and S8 can prevent an induced current from occurring in the yoke partial cores 33G and 34G due to the magnetic flux flowing through the magnetic pole cores 33J and 34J. Unlike the example in FIG. 23, the slits S7 and S8 may extend from the fitting holes toward the edge of the yoke partial cores 33g and 34g.

As shown in FIG. 23, the armature portion Am23 has a plurality of core coupling portions L disposed at intervals in the front-rear direction. The core coupling portions L are provided in each of magnetic pole group pairs P (pairs of magnetic pole groups G1 and G2 opposed to each other across the magnetic field portion Fs). The position of the core coupling portion L in the front-rear direction and the position of the magnetic pole group pair P in the front-rear direction correspond to each other. The magnetic pole groups G1 and G2 (magnetic pole cores 33J and 34J protruding from the yoke partial cores 33G and 34G) are disposed on the magnetic field portion Fs side with respect to the yoke partial cores 33G and 34G. The core coupling portions L are magnetically coupled to the yoke partial cores 33G and 34G. Specifically, fitting holes 33g and 34g that penetrate the yoke partial cores 33G and 34G are formed on the upper surfaces of the yoke partial cores 33G and 34G. The core coupling portions L are fitted into and held in the fitting holes 33g and 34g.

The core coupling portion L is laminated steel sheets including a plurality of steel sheets laminated in the front-rear direction. Such arrangement and lamination of the steel sheets can prevent the generation of an induced current in the core coupling portion L.

As shown in FIG. 23, the fitting holes 33g and 34g are open in a direction intersecting with the lamination direction of the steel sheets constituting the yoke partial cores 33g and 34g. Specifically, the fitting hole 33g and 34g are open upward. This structure prevents an induced current from occurring around each core coupling portion L. The core coupling portion L is disposed above the coil CL and the magnetic field portion Fs. The armature portion Am23 may have a core coupling portion L disposed above the coil CL and the magnetic field portion Fs and a core coupling portion L disposed below the coil CL and the magnetic field portion Fs.

As shown in FIG. 23, in the linear electric machine M23, each core coupling portion L may have a first partial core L5 and a second partial core L6 that are arranged in the left-right direction (the direction facing the armature cores H1 and H2). The first partial core L5 is fitted into the fitting hole 33g of the first armature core H1, and the second partial core L6 is fitted into the fitting hole 34g of the second armature core H2. This structure simplifies the assembly operation of the linear electric machine M23.

Similarly to the rotary electric machine described above (e.g., rotary electric machine M1), the linear electric machine M23 also has two types of magnetic circuits. That is, a first magnetic circuit includes two magnetic pole groups G1 located away from each other in the front-rear direction, two magnetic pole groups G2 located away from each other in the front-rear direction, magnetic field cores 22N and 22S facing the magnetic pole groups G1 and G2, and magnets Mg between the magnetic field cores 22N and 22S. The second magnetic circuit includes a core coupling portion L, magnetic pole groups G1 and G2 facing in the left-right direction and magnetically coupled via the core coupling portion L, magnetic field cores 22N and 22S facing the magnetic pole groups G1 and G2, and magnets Mg between the magnetic field cores 22N and 22S.

[Linear Electric Machine Having Armature Core Formed of Powder Material]

Figure 24B:
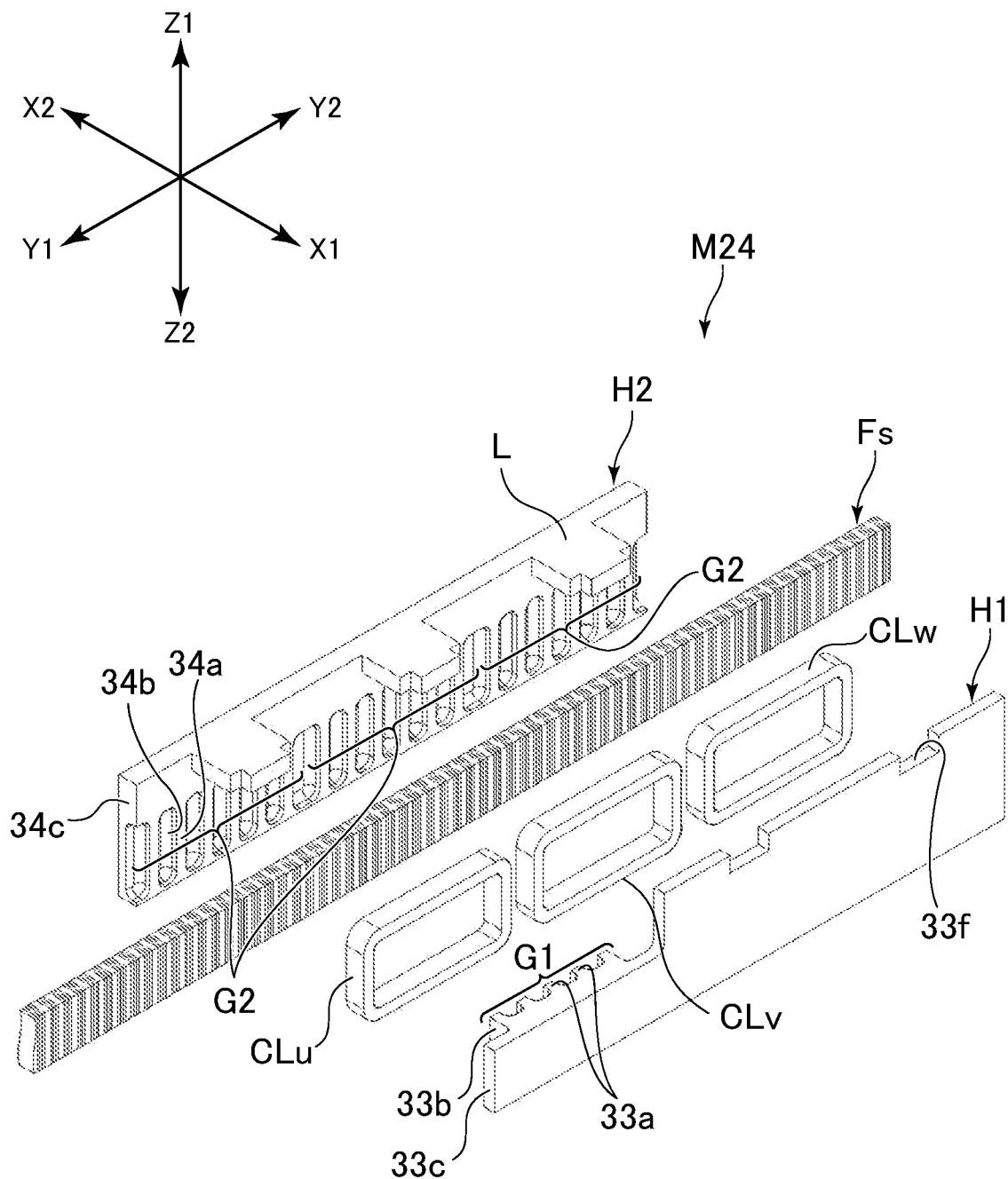
FIG. 24B is an exploded perspective view of the linear electric machine shown in FIG. 24A.

The armature cores H1 and H2 may be formed of a soft magnetic powder material. FIGS. 24A and 24B are perspective views of a linear electric machine M24 as an example of such an electric machine. In FIGS. 24A and 24B, a part of the magnetic field portion Fs and a part of the first armature core H1 are omitted. In the following, differences from the linear electric machine described above will be mainly described. The structures of the other electric machines described above may be applied to the matters that are not described with respect to the linear electric machine M24 shown in FIGS. 24A and 24B (e.g., the distance (electrical angle) between the magnetic pole group pairs P and the structure of magnetic field portion Fs).

As shown in FIG. 24B, the armature portion Am24 has a first armature core H1 and a second armature core H2 facing each other in the left-right direction (X1-X2 direction, the direction intersecting with the machine moving direction). The first armature core H1 has a plurality of magnetic pole groups G1 disposed in the front-rear direction (machine moving direction). The magnetic pole group G1 has a plurality of magnetic poles 33a. The first armature core H1 includes a common base 33b projecting from the inner surface of the yoke portion 33c (the surface facing the second armature core H2) toward the magnetic field portion Fs. The magnetic poles 33a protrude from the common base 33b toward the magnetic field portion Fs. The magnetic poles 33a are disposed in the front-rear direction in the common base 33b.

As shown in FIG. 24B, a plurality of recessed portions 34b arranged in the front-rear direction are formed on the surface of the second armature core H2 facing the magnetic field portion Fs. The part between two adjacent recessed portions 34b (convex portion) is a magnetic pole 34a. Such a structure in which the part between two adjacent recessed portions 34b functions as a magnetic pole 34a can increase the intensity of the magnetic pole 34a.

In the linear electric machine M24, the first armature core H1 and the second armature core H2 are formed of a soft magnetic powder material. The armature portion Am24 has a plurality of core coupling portions L disposed in the front-rear direction. As shown in FIG. 24B, the core coupling portion L is integrally formed with the second armature core H2. That is, a mold having a space corresponding to the entire shapes of the core coupling portion L and the second armature core is prepared, and a soft magnetic powder material is placed in the space in the mold so as to form the second armature core H2 and the core coupling portion L. As such, the second armature core H2 does not have a structure (specifically, a fitting hole) in which the core coupling portion L is fitted at a position corresponding to the core coupling portion L.

As shown in FIG. 24B, the core coupling portion L extends from the top portion of the yoke portion 34c toward the top portion of the yoke portion 33c of the first armature core H1 and connects to the top portion of the yoke portion 33c of the first armature core H1. A fitting hole 33f is formed on the upper edge of the yoke portion 33c, and the fitting hole 33f is fitted to the end portion of the core coupling portion L. In the example of the linear electric machine M24, the fitting hole 33f is a recessed portion that is open upward. The structure of the fitting hole 33f may be changed as appropriate.

In contrast to the example of the linear electric machine M24, the core coupling portion L may be integrally formed with the first armature core H1. In yet another example, the core coupling portion L may be divided into two partial cores, and one partial core may be integrally formed with the first armature core H1 and the other partial core may be integrally formed with the second armature core H2.

[Axial Gap Type]

Figure 25A:
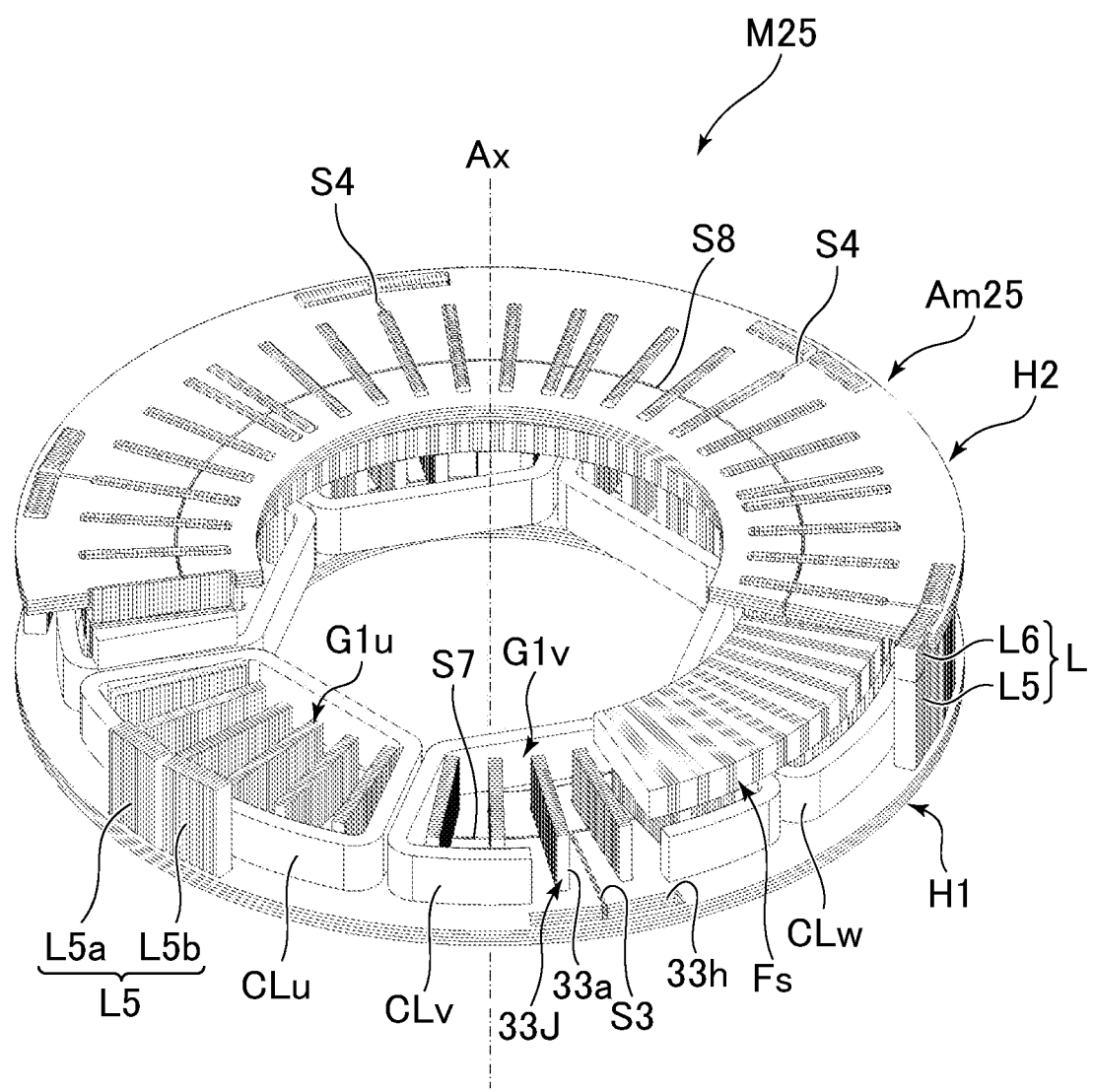
FIG. 25A is a perspective view showing of an electric machine according to a fourteenth example, in which an axial gap type rotary electric machine having two armature cores disposed opposite to each other across the magnetic field portion is shown; An axial gap type rotary electric machine is shown in which two armature cores are disposed oppositely to each other across a magnetic field portion.
Figure 25B:
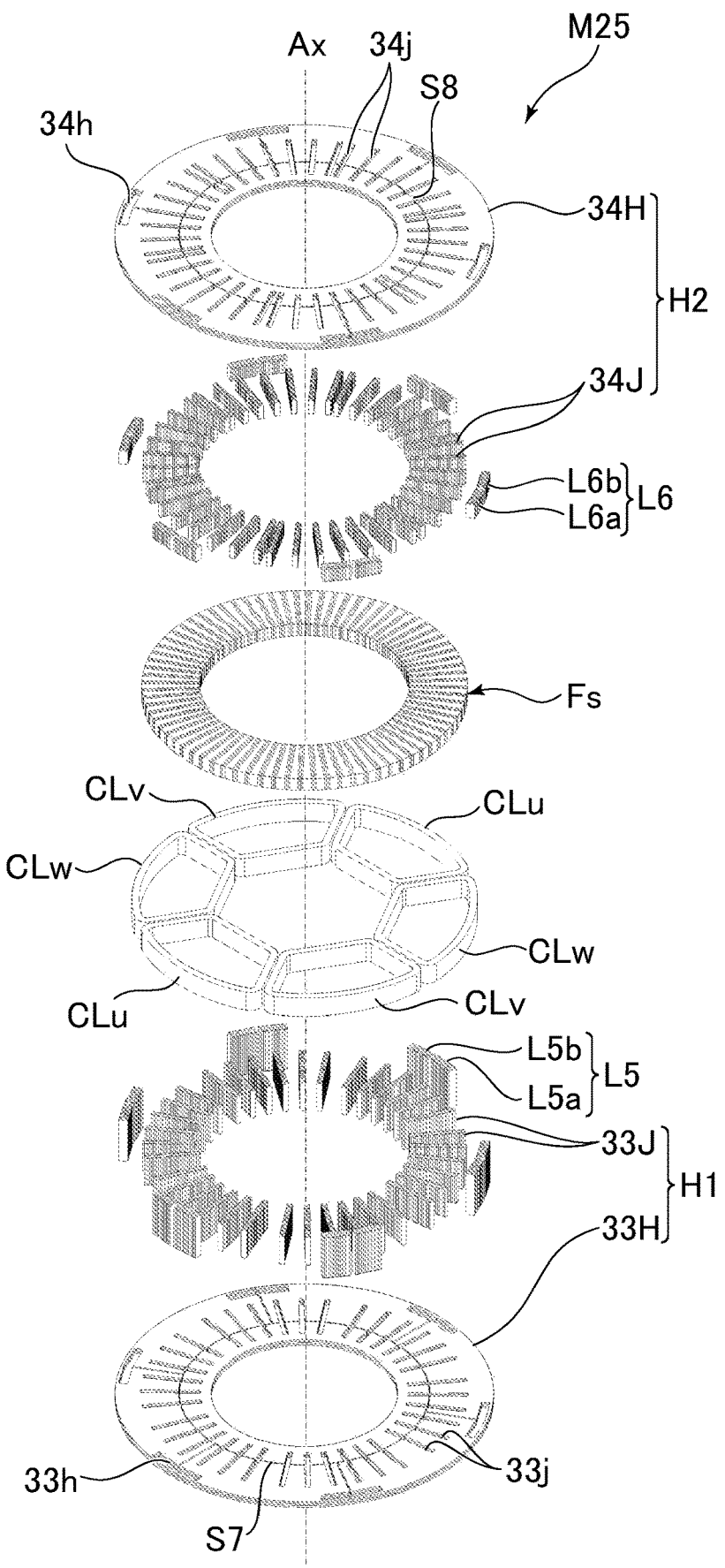
FIG. 25B is an exploded perspective view of the rotary electric machine shown in FIG. 25A.
Figure 25C:
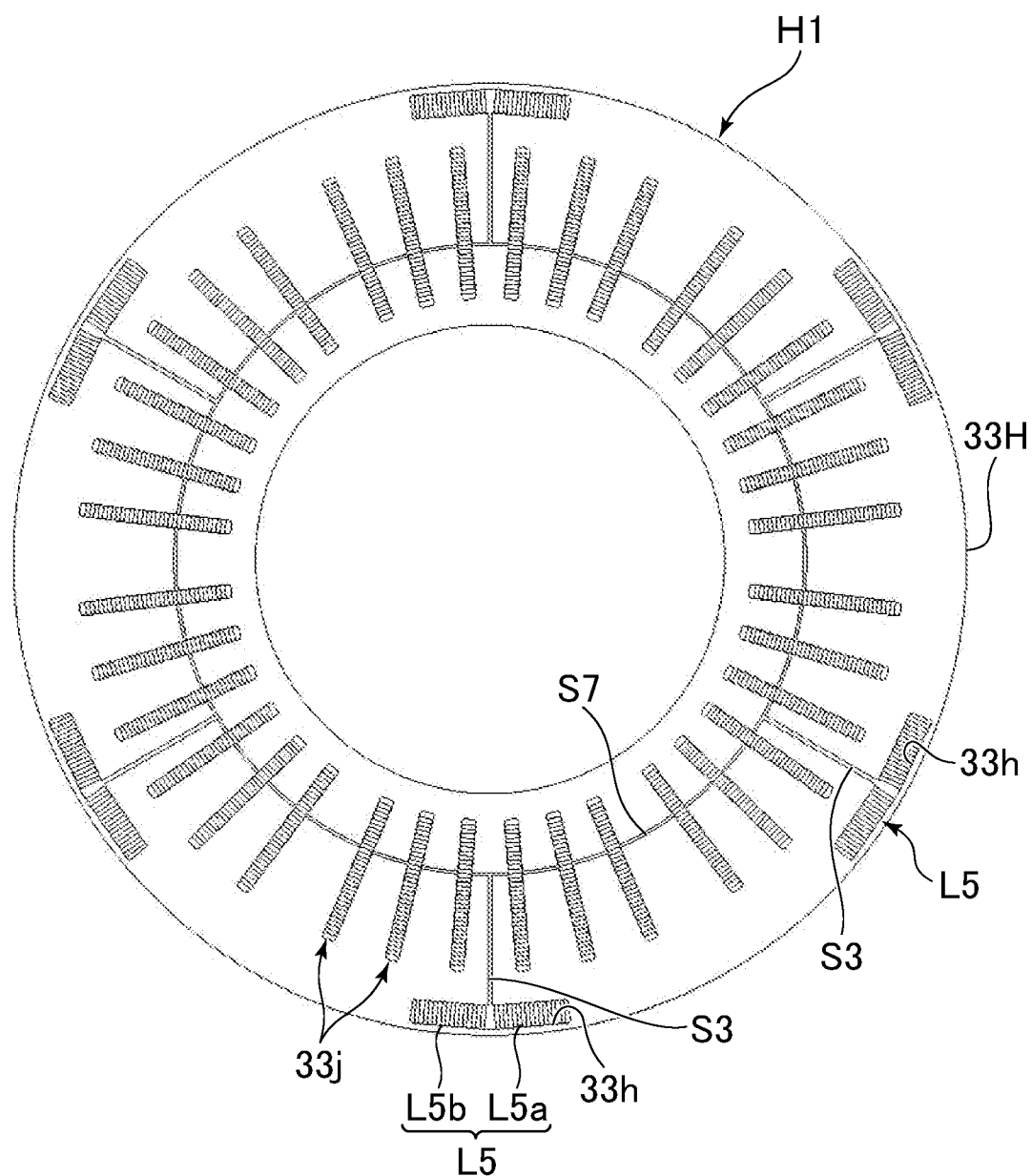
FIG. 25C is a bottom view of the rotary electric machine shown in FIG. 25A.

FIGS. 25A to 25C show an axial gap type rotary electric machine M25 as an example of the electric machine in which the first armature core H1 and the second armature core H2 are disposed opposite to each other across the magnetic field portion Fs. FIG. 25A is a perspective view of the rotary electric machine M25 and FIG. 25B is an exploded perspective view of the rotary electric machine M25. FIG. 25C is a bottom view of the rotary electric machine M25 showing the bottom surface of the first armature core H1. In the following, differences from the rotary electric machine M21 shown in FIGS. 18A and 18B will be mainly described. The examples of FIG. 18A may be applied to the matters that are not described in the electric machine M25 shown in FIGS. 25A to 25C.

As shown in FIG. 25A, the first armature core H1 and the second armature core H2 of the rotary electric machine M25 are disk-shaped and face each other in the axis direction. A disk-shaped magnetic field portion Fs is disposed between the two armature cores H1 and H2. The magnetic field cores 22N and 22S of the magnetic field portion Fs is preferably exposed on both the upper and lower sides thereof. This can reduce the magnetoresistance between the magnetic field portion Fs and the armature cores H1 and H2.

As shown in FIG. 25B, the first armature core H1 has a yoke partial core 33H and a plurality of magnetic pole cores 33J disposed in the rotation direction. The yoke partial core 33H is laminated steel sheets including a plurality of steel sheets laminated in the axis direction. Each magnetic pole 33J is laminated steel sheets including a plurality of steel sheets laminated in the radial direction. As such, the steel sheets of the yoke partial core 33H and the steel sheets of the magnetic pole core 33J are perpendicular to each other. A plurality of fitting holes 33j disposed in the rotation direction are formed in the yoke partial core 33H. The magnetic pole cores 33J are respectively fitted into the fitting holes 33j and magnetically coupled to the yoke partial core 33H. A part of the magnetic pole core 33J protruding from the surface of the yoke partial core 33H toward the magnetic field portion Fs is a magnetic pole 33a.

As shown in FIG. 25B, similarly to the first armature core H1, the second armature core H2 has a yoke partial core 34H and a plurality of magnetic poles 34J disposed in the rotation direction. The yoke partial core 34H is laminated steel sheets including a plurality of steel sheets laminated in the axis direction. Each magnetic pole 34J comprises laminated steel sheets including a plurality of steel sheets laminated in the radial direction. That is, the steel sheets of the yoke partial core 34H and the steel sheets of the magnetic pole cores 34J are perpendicular to each other. A plurality of fitting holes 34j disposed in the rotation direction are formed in the yoke partial core 34H. The magnetic pole cores 34J are respectively fitted into the fitting holes 34j and magnetically coupled to the yoke partial core 34H. A part of the magnetic pole core 34J protruding from the surface of the yoke partial core 34H toward the magnetic field portion Fs is a magnetic pole 34a.

In the magnetic pole cores 33J and 34J, the steel sheets are laminated in the radial direction of the rotary electric machine M25. Unlike the example of the linear electric machine M25, when the steel sheets of the magnetic pole core are laminated in the rotation direction, an induced current is likely to be generated in the steel sheet located at the end in the rotation direction. On the other hand, in rotary electric machine M25, since the steel sheets of magnetic pole core 33J and 34J are laminated radially, it is possible to suppress the generation of such an induced current.

As shown in FIGS. 25B and 25C, slits S7 and S8 are formed in the yoke partial cores 33h and 34h, in which the slits S7 and S8 intersect a closed curve surrounding the fitting holes 33J and 34J into which the magnetic pole cores 33J and 34J are fitted. In the example of the rotary electric machine M25, a slit S7 (see FIG. 25C) is formed between two adjacent fitting holes 33j into which the magnetic pole cores 33J are respectively fitted. A plurality of slits S7 are formed over the entire circumference of the yoke partial core 33H. Similarly, a slit S8 (see FIG. 25A) is formed between two adjacent fitting holes 34j into which the magnetic pole cores 34J are respectively fitted. A plurality of slits S8 are formed over the entire circumference of the yoke partial core 34H. The slits S7 and S8 can prevent an induced current from occurring in the yoke partial cores 33J and 34J due to the magnetic flux flowing through the magnetic pole cores 33J and 34J. The slits S7 and S8 may extend from the fitting holes 33j and 34j towards the inner or outer edge of the yoke partial cores 33H and 34H and may reach the edge.

As shown in FIG. 25A, the armature portion Am25 has a plurality of core coupling portions L disposed at intervals in the rotation direction. The core coupling portions L are provided in each of magnetic pole group pairs P (pairs of magnetic pole groups G1 and G2 opposed to each other across the magnetic field portion Fs). The position of the core coupling portion L in the rotation direction and the position of the magnetic pole group pair P in the rotation direction correspond to each other. The magnetic pole groups G1 and G2 including a plurality of magnetic poles 33a and 34a (magnetic pole cores 33J and 34J protruding from the yoke partial cores 33H and 34H) are disposed on the magnetic field portion Fs side with respect to the yoke partial cores 33H and 34H. The core coupling portions L are magnetically coupled to the yoke partial cores 33H and 34H. In the example of the rotary electric machine M25, fitting holes 33h and 34h (see FIG. 25B) are formed in the yoke partial cores 33H and 34H so as to pass through the yoke partial cores 33H and 34H in the lamination direction of the steel sheets. The core coupling portions L are fitted into and held in the fitting holes 33h and 34h.

As shown in FIG. 25B, each core coupling portion L may have a first partial core L5 and a second partial core L6 arranged in the axis direction. The first partial core L5 is fitted into the fitting hole 33h of the first armature core H1, and the second partial core L6 is fitted into the fitting hole 34h of the second armature core H2. This structure simplifies the assembly operation of the rotary electric machine M25. When the first armature core H1 and the second armature core H2 are combined, the distal end surface of the first partial core L5 is in contact with the distal end surface of the second partial core L6.

The core coupling portion L is laminated steel sheets including a plurality of steel sheets each disposed along the axis direction and laminated in the rotation direction (machine moving direction). Such arrangement and lamination of the steel sheets can prevent the generation of an induced current in the steel sheets of the core coupling portion L.

The core coupling portion L is disposed outward of the magnetic pole groups G1 and G2 (coils CL) in the radial direction. This structure facilitates securing the sufficient width of the core coupling portion L in the rotation direction. Alternatively, the core coupling portion L may be disposed inward of the magnetic pole groups G1 and G2 (coils CL) in the radial direction.

The core coupling portion L may also be divided into a plurality of parts in the rotation direction (machine moving direction). In the rotary electric machine M25, each core coupling portion L includes partial cores disposed in the rotation direction. Specifically, as shown in FIG. 25C, the first partial core L5 magnetically coupled to the first armature core H1 includes a partial cores L5a and L5b disposed in the rotation direction. This structure allows the partial core L5a to tilt against the partial core L5b, thereby adjusting the posture of the partial cores L5a and L5b to match with the magnetic poles 33a (magnetic pole cores 33J). The two partial cores L5a and L5b may be fitted in one fitting hole 33h. In this case, a space may be formed between the two partial cores L5a and L5b. Similarly, the second partial core L6 magnetically coupled to the second armature core H2 includes a partial cores L6a and L6b (see FIG. 25B) disposed in the rotation direction. This serves to adjust the posture of the partial cores L6a and L6b to match with the magnetic poles 34a (magnetic pole cores 34J).

Similarly to the rotary electric machine described above (e.g., rotary electric machine M1), the rotary electric machine M25 also has two types of magnetic circuits. That is, the first magnetic circuit includes two magnetic pole groups G1 that are located away from each other in the rotation direction, two magnetic pole groups G2 that are located away from each other in the rotation direction, magnetic field cores 22N and 22S facing the magnetic pole groups G1 and the magnetic pole group G2, and the magnets Mg between the magnetic field cores 22N and 22S. The second magnetic circuit includes a core coupling portion L, magnetic pole groups G1 and G2 facing in the axis direction and magnetically coupled via the core coupling portion L, magnetic field cores 22N and 22S facing the magnetic pole groups G1 and G2, and magnets Mg between the magnetic field cores 22N and 22S.

As shown in FIG. 25C, the yoke partial core 33H includes a slit S3 extending from the fitting hole 33h of the core coupling portion L in the direction intersecting with the lamination direction of the steel sheets of the yoke partial core 33H. The slit S3 intersects a closed curve surrounding the fitting holes 33h. This prevents the generation of an induced current around the core coupling portions L. The slit S3 extends radially inward and reaches an opening at a position facing the magnetic field portion Fs. In the first armature core H1, the slit S7 (opening toward the magnetic field portion Fs) is disposed at a position facing the magnetic field portion Fs, and the slit S3 reaches the slit S7. The slit S3 may reach the fitting hole 33j of the magnetic pole core 33J instead of the slit S7.

As shown in FIG. 25A, the yoke partial core 34H includes a slit S4 extending from the fitting hole 34h (see FIG. 25B) of the core coupling portion L in the direction intersecting with the lamination direction of the steel sheets of the yoke partial core 34H. The slit S4 intersects a closed curve surrounding the fitting holes 34h. This prevents the generation of an induced current around the core coupling portions L. The slit S4 extends radially inward and reaches an opening at a position facing the magnetic field portion Fs. The fitting hole 34j into which the magnetic pole core 34J is fitted is formed at a position facing the magnetic field portion Fs and is open toward the magnetic field portion Fs. The slit S4 reaches the fitting hole 34j (an opening at a position facing the magnetic field portion Fs). The slit S4 may reach a slit S8 formed between two adjacent fitting holes 34j.

As shown in FIG. 25C, the slit S3 of the first armature core H1 intersects a closed curve passing between the fitting holes 33h and the magnetic pole groups G1 and surrounding the axis Ax. The slit S3 prevents a closed circuit that circulates around the entire first armature core H1 from being formed between the plurality of core coupling portion L and the plurality of magnetic pole group G1. As such, it is possible to prevent the generation of an induced current in the first armature core H1 in the rotation direction due to the magnetic flux Φ7 (see FIG. 3B) formed in the magnetic circuit including the core coupling portion L. Similarly, the slit S4 of the second armature core H2 also intersects a closed curve passing between the fitting holes 34h and the magnetic pole groups G2 and surrounding the axis Ax. As such, it is possible to prevent the generation of an induced current in the second armature core H2 in the rotation direction due to the magnetic flux Φ7 (see FIG. 3B).

The fitting hole into which the core coupling portion L is fitted may be open to the outer peripheral surface of the yoke partial cores 33h and 34h. In this case, the slits S3 and S4 described above may not be formed in the core coupling portions L. Instead of the slits S3 and S4, a slit passing between the plurality of fitting holes into which the core coupling portions L are fitted and the magnetic pole groups G1 and G2 and intersecting with the closed curve surrounding the axis Ax may be formed at any position in the yoke partial cores 33h and 34h. Similarly to the slits S5 and S6 shown in FIG. 9A or FIG. 9B, such a slit may extend from any one of the fitting holes and may be connected to the fitting holes 33J and 34J in which the magnetic pole cores 33J and 34J are fitted, or to the slits S7 and S8 between two adjacent fitting holes 33J and 34J.

[Example of Armature Cores Disposed in Two Different Directions]

The relative positions of the armature cores H1 and H2 and the magnetic field portion Fs are not limited to the examples of the electric machine described above. For example, in the rotary electric machine, one of the armature cores may be disposed radially with respect to the outer peripheral surface or the inner peripheral surface of the magnetic field portion, and the other one of the armature cores may be disposed in the axis direction to the magnetic field portion Fs. In the linear electric machine, one of the armature cores may be disposed laterally relative to the right or left side surface of the magnetic field portion Fs (a first surface along the machine moving direction), and the other one of the armature cores may be disposed upward or downward relative to the upper surface or bottom surface of the magnetic field portion Fs (a second surface along the machine moving direction).

Figure 26A:
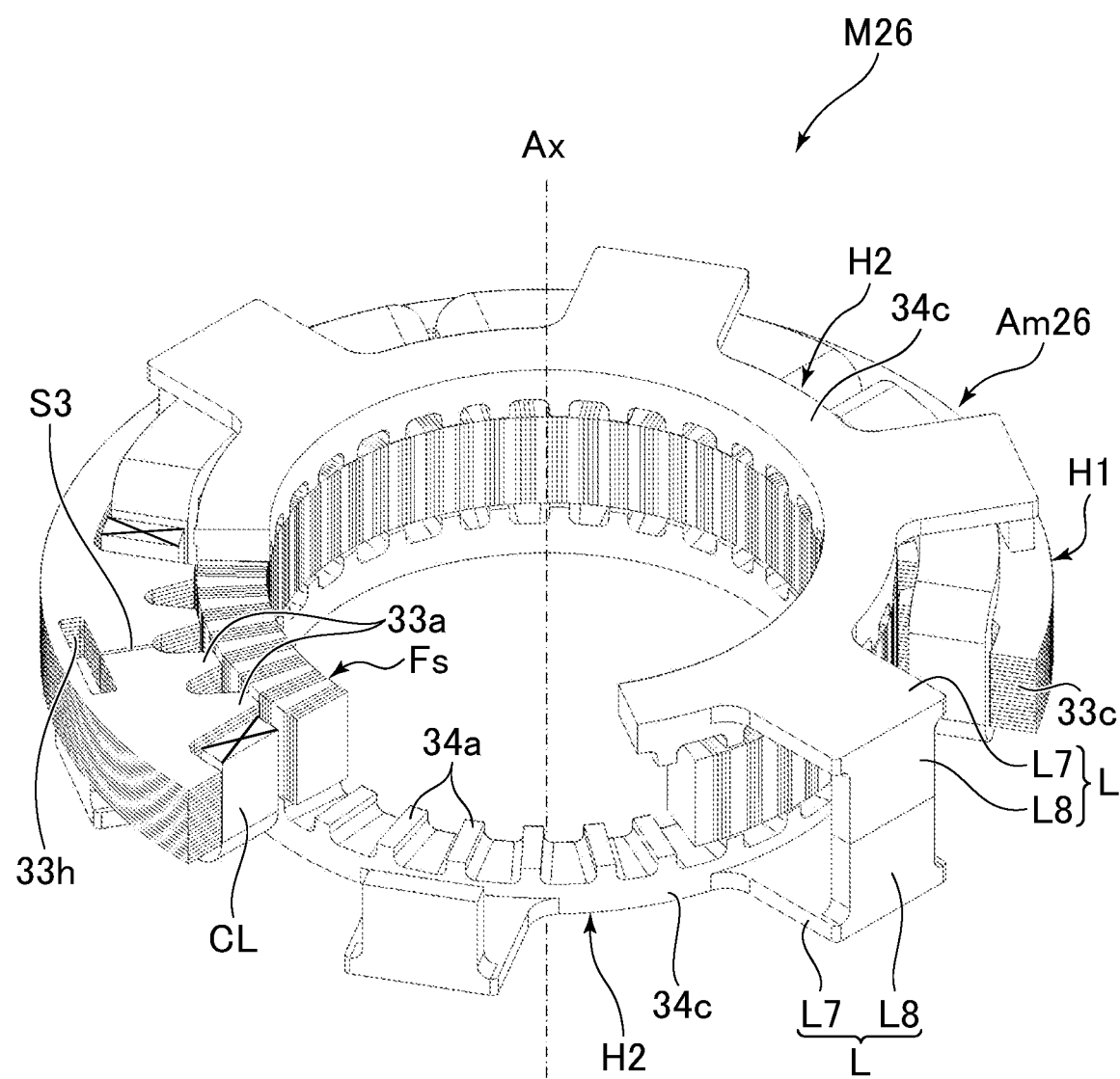
FIG. 26A is a perspective view of an electric machine according to a fifteenth example, in which a rotary electric machine including the armature cores disposed in two different directions with respect to the magnetic field portion is shown.
Figure 26B:
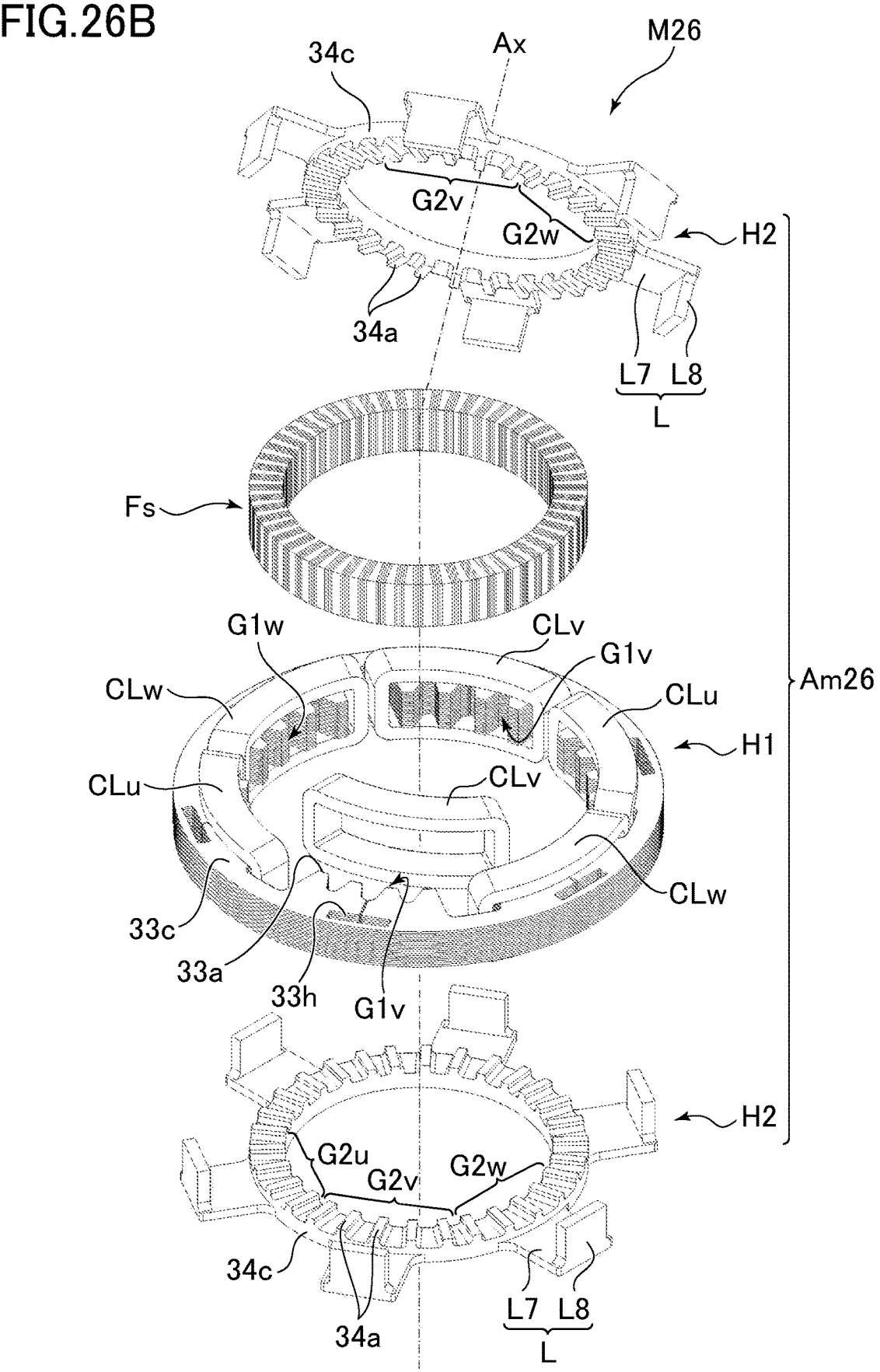
FIG. 26B is an exploded perspective view of the rotary electric machine shown in FIG. 26A.

FIGS. 26A and 26B are diagrams illustrating a rotary electric machine M26 as an example of such an electric machine. FIG. 26A is a perspective view and FIG. 26B is an exploded perspective view. In FIG. 26A, a part of the armature cores H1 and H2, the magnetic field portion Fs, and the coils CL are omitted. Here, the differences from the rotary electric machine M1 described with reference to FIG. 1A will be mainly described. The examples of FIG. 1A may be applied to the matters that are not described in the electric machine M26 shown in FIGS. 26A and 26B.

As shown in FIG. 26B, an armature portion Am26 includes one first armature core H1 and two second armature cores H2. The first armature core H1 is located outward of the outer peripheral surface of the magnetic field portion Fs in the radial direction. Unlike the rotary electric machine M26, the first armature core H1 may be disposed inside the magnetic field portion Fs. The two second armature cores H2 are disposed opposite to each other in the axis direction across the magnetic field portion Fs. That is, one of the second armature cores H2 is positioned above the upper surface of the magnetic field portion Fs (the surface facing in the axis direction), and the other one of the second armature cores H2 is positioned below the lower surface of the magnetic field portion Fs (the surface facing in the axis direction). The two armature cores H2 may have the same structure. This serves to reduce the manufacturing cost of the rotary electric machine M26. The magnetic field cores 22N and 22S may be preferably exposed at the outer peripheral surface of the magnetic field portion Fs and the upper and lower surfaces of the magnetic field portion Fs.

The first armature core H1 is formed of a plurality of steel sheets laminated in the axis direction, for example. The first armature core H1 may be formed of a soft magnetic powder material. In the illustrated example, the second armature core H2 is formed of a soft magnetic powder material. The second armature core H2 may be laminated steel sheets.

In use of the rotary electric machine M26, for example, the magnetic field portion Fs is fixed to the device on which the rotary electric machine M26 is mounted, and the armature portion Am26 rotates about the axis Ax. In contrast, the armature portion Am26 may be fixed to the device on which the rotary electric machine M26 is mounted, and the magnetic field portion Fs may rotate about the axis Ax.

As shown in FIG. 26B, the first armature core H1 has a plurality of magnetic pole groups G1 disposed in the rotation direction. The first armature core H1 includes, for example, a U phase coil CLu, a V phase coil CLv, and a W phase coil CLw, and the rotary electric machine M26 is an electric machine driven by a three-phase alternating current. The second armature core H2 includes a plurality of magnetic pole groups G2 disposed in the rotation direction on the side facing the magnetic field portion Fs. In the rotary electric machine M26, the number of poles of the magnetic field portion Fs is 56 (p=28), for example.

An electrical angle between adjacent magnetic pole group pairs P is expressed as 360×(n+m/s) as described referring to FIG. 2, and may be, for example, 1,680 degrees (in the rotary electric machine M26, s=3 and m=2, n=4). The mechanical angle between adjacent magnetic pole group pairs P is expressed as (360/p)×(n+m/s) and substantially matches the "360/s/c". This mechanical angle is 60 degrees, for example, in the rotary electric machine M26 (c=2 in the rotary electric machine M26).

As shown in FIG. 26B, the armature portion Am26 has a plurality of core coupling portions L spaced apart from one another in the rotation direction. The magnetic pole group G1 of the first armature core H1 is formed on the magnetic field portion Fs side with respect to the yoke portion 33c. The magnetic pole group G2 of the second armature core H2 is formed on the magnetic field portion Fs side with respect to the yoke portion 34c. The core coupling portion L magnetically couples the yoke portion 33c and the yoke portion 34c. The core coupling portions L are respectively provided in the magnetic pole group pairs P (pairs of magnetic pole groups G1 and G2 at positions corresponding to each other in the rotation direction).

In the armature portion Am26, the core coupling portion L is integrally formed with the second armature core H2. That is, a mold having a space corresponding to the entire shapes of the core coupling portion L and the second armature core H2 is prepared, and a soft magnetic powder material is placed in the space in the mold so as to form the second armature core H2 and the core coupling portion L.

As shown in FIG. 26B, the core coupling portion L is formed in each of the two second armature cores H2. The core coupling portion L has an extending portion L7 extending radially from the yoke portion 34c of the second armature core H2. The extending portion L7 extends radially beyond the position of the coil CL. The core coupling portion L has a fitting portion L8 extending in the axis direction from the end of the extending portion L7. The yoke portion 33c of the first armature core H1 has a fitting hole 33h extending through the yoke portion 33c in the axis direction. The fitting portion L8 is fitted into the fitting hole 33h, and the yoke portion 33c and the yoke portion 34c are magnetically coupled via the core coupling portion L. The fitting portion L8 of the core coupling portion L of the upper armature core H2 and the fitting portion L8 of the core coupling portion L of the lower armature core H2 are fitted into the common fitting hole 33h.

A slit S3, which extends from the fitting hole 33h in the direction intersecting with the lamination direction of the steel sheets of the first armature core H1, is formed in the first armature core H1. Specifically, the slit S3 extends toward the magnetic field portion Fs. This structure prevents an induced current from occurring around the core coupling portions L due to the magnetic flux formed in the core coupling portions L.

The shape of the core coupling portion L is not limited to the example of the armature portion Am26. For example, if the width of the yoke portion 34c is large in the radial direction so that the yoke portion 34c includes a portion in the axis direction with respect to the magnetic pole group G1 and the coil CL, the core coupling portion L may not have the extending portion L7 extending radially.

The second armature core may have laminated steel sheets including a plurality of steel sheets laminated in the axis direction. In this case, the yoke portion 34c may include a portion located in the axis direction with respect to the magnetic pole group G1 and the coil CL, and a hole to pass through such a portion of the yoke portion 34c may be formed in the axis direction. The core coupling portion L may be fitted into such a hole of yoke portion 34c and the fitting hole 33h of the first armature core H1.

Similarly to the rotary electric machine described above (e.g., rotary electric machine M1), the rotary electric machine M26 also has two types of magnetic circuits. That is, the first magnetic circuit includes two magnetic pole groups G1 that are located away from each other in the rotation direction, two magnetic pole groups G2 that are located away from each other in the rotation direction, magnetic field cores 22N and 22S facing the magnetic pole groups G1 and the magnetic pole group G2, and the magnets Mg between the magnetic field cores 22N and 22S. The second magnetic circuit includes a core coupling portion L, magnetic pole groups G1 and G2 having angle positions corresponding to each other in the rotation direction and magnetically coupled via the core coupling portion L, magnetic field cores 22N and 22S opposite to the magnetic pole group G1 and the magnetic pole group G2, and magnets Mg between the magnetic field cores 22N and 22S. The magnetic flux passing through the two magnetic circuits passes inside the coil CL provided in the magnetic pole group G1.

The arrangement of the armature cores H1 and H2 is not limited to electric machine described above. For example, when a direction in which the first armature core H1 is located with respect to the magnetic field portion Fs is a first direction and a direction in which the second armature core H2 is located with respect to the magnetic field portion Fs is a second direction, the angle between the first direction and the second direction may be 120 degrees instead of 90 degrees or 180 degrees, for example. In this case, the cross section of the magnetic field portion Fs may be triangular.

The cross section of the magnetic field portion Fs may be circular. In this case, the end face of the magnetic poles 33a and 34a of the armature cores H1 and H2 may be curved to conform to the outer peripheral surface of the magnetic field portion Fs.

[Other Examples of Core Coupling Structure]

Figure 27A:
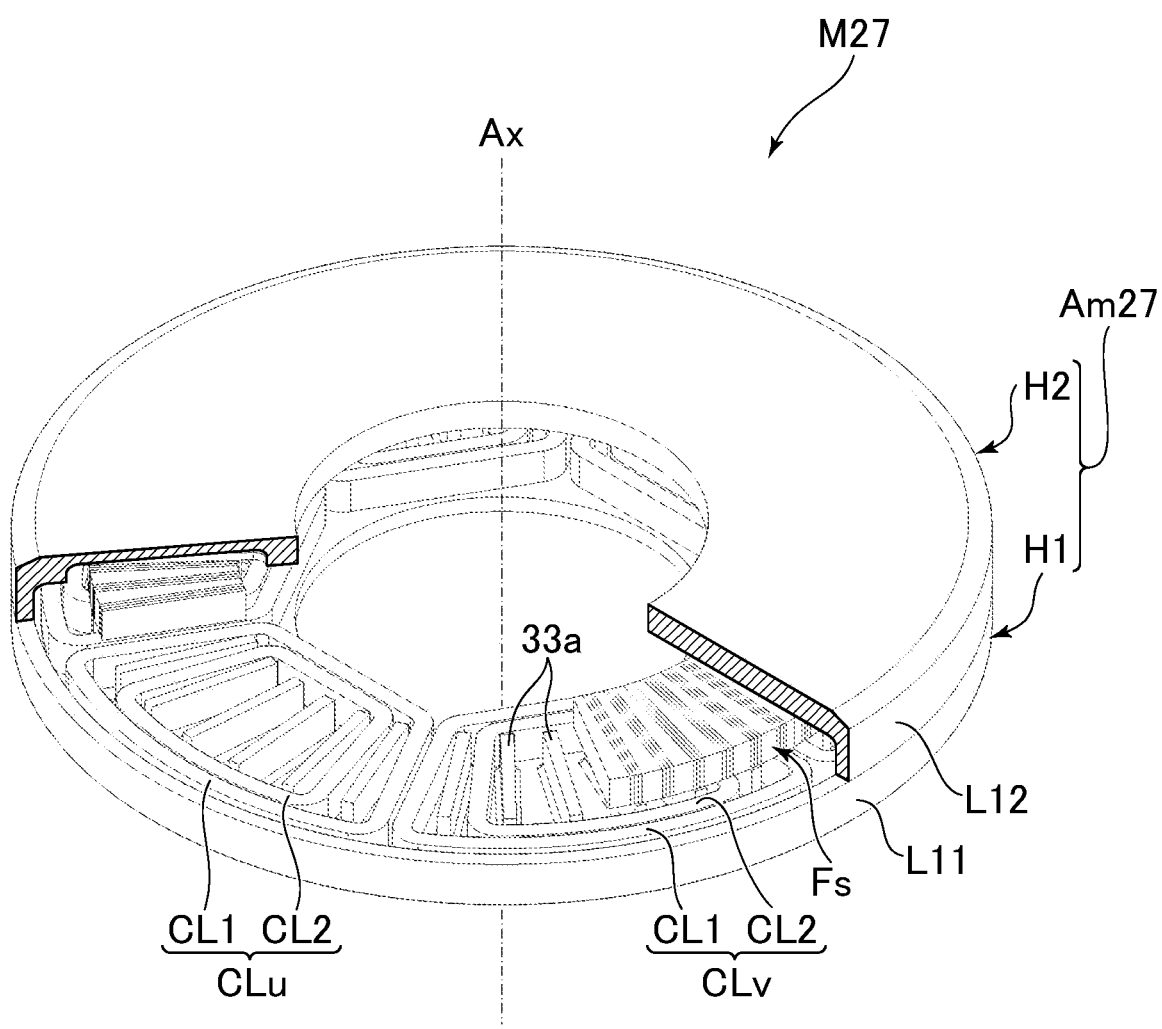
FIG. 27A is a perspective view of an electric machine according to a sixteenth example, in which an axial gap type rotary electric machine including one core coupling portion extending in the machine moving direction is shown as a core coupling structure for magnetically coupling yoke portions of two armature cores.
Figure 27B:
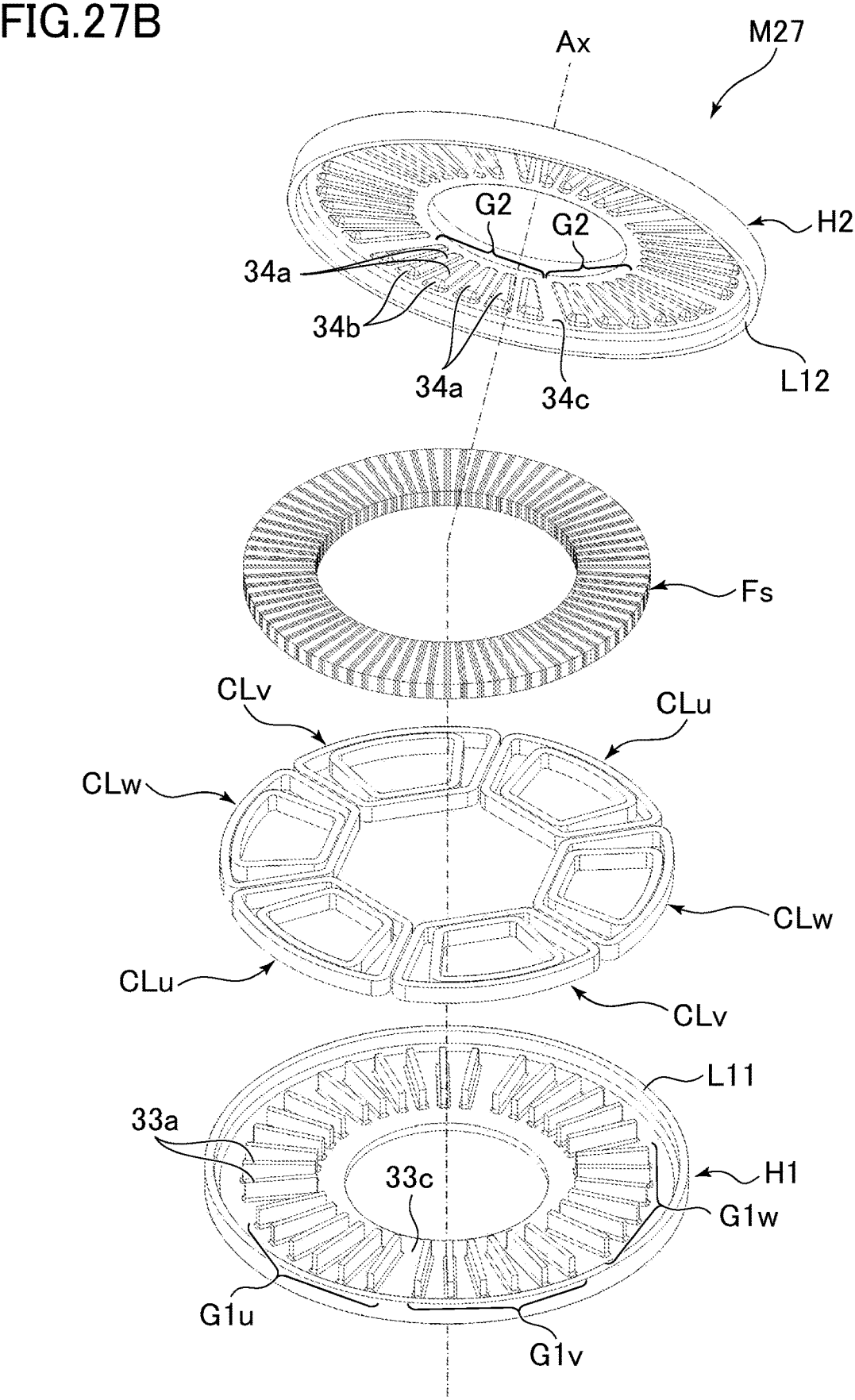
FIG. 27B is an exploded perspective view of the rotary electric machine shown in FIG. 27A.

In the electric machine described above, a plurality of core coupling portions L spaced apart from one another in the machine moving direction are used as core coupling structures for magnetically coupling the first armature core H1 and the second armature core H2. The core coupling structure is not limited to this example, and a single core coupling portion L extending in the machine moving direction may be used. FIGS. 27A and 27B show an axial gap type rotary electric machine M27 as an example of such an electric machine. FIG. 27A is a perspective view and FIG. 27B is an exploded perspective view. In the following, differences from the rotary electric machine M25 shown in FIGS. 25A to 25C will be mainly described. The examples of FIGS. 25A to 25C may be applied to the matters that are not described in the electric machine M27 shown in FIGS. 27A and 27B.

As shown in FIG. 27B, the first armature core H1 has a plurality of magnetic pole groups G1 disposed in the rotation direction. The magnetic pole group G1 has magnetic poles 33a projecting towards the second armature core H2 in the axis direction. The first armature core H1 has a disk-shaped yoke portion 33c. The magnetic poles 33a are formed on the upper surface of the yoke portion 33c (the surface facing the second armature core H2). The width of the yoke portion 33c in the radial direction is uniform over the entire circumference of the armature core H1. The first armature core H1 is formed of a soft magnetic powder material, for example.

As shown in FIG. 27A, coils CL provided in each magnetic pole group G1 may include a first coil that is wound around all magnetic poles 33a constituting the magnetic pole group G1 and a second coil CL2 that is wound around only some of the magnetic poles 33a. This serves to effectively utilize the space between the magnetic poles 33a. The winding directions of the two coils CL1 and CL2 are the same and are connected in series.

As shown in FIG. 27B, a plurality of recessed portions 34b arranged in the rotation direction are formed on the surface of the second armature core H2 facing the magnetic field portion Fs. The part between two adjacent recessed portions 34b (convex portion) is a magnetic pole 34a. The second armature core H2 has a disk-shaped yoke portion 34c. The magnetic poles 34a are formed on the lower surface of the yoke portion 34c (the surface facing the first armature core H1). The width of the yoke portion 34c in the radial direction is uniform over the entire circumference of the armature core H2. In the second armature core H2, each magnetic pole group G2 is formed of a plurality of magnetic poles 34a (e.g., seven magnetic poles 34a). The second armature core H2 is formed of a soft magnetic powder material, for example.

In the rotary electric machine M27, the number of poles of the magnetic field portion Fs is 76 (p=38), for example. As described with reference to FIG. 2, an electrical angle between adjacent magnetic pole group pairs P is represented as 360×(n+m/s), and is 2,280 degrees in the rotary electric machine M25 (s=3, m=1, n=6 in this rotary electric machine M25), for example. The mechanical angle between adjacent magnetic pole group pair P is expressed as (360/p)×(n+m/s) and substantially matches the "360/s/c". In the rotary electric machine M25, such a mechanical angle is, for example, 60 degrees (c=2 in the rotary electric machine M25).

As shown in FIG. 27A, the first armature core H1 has a core coupling portion L11 extending from the outer peripheral edge of the yoke portion 33c toward the second armature core H2. The core coupling portion L11 has an annular shape formed over the entire circumference of the first armature core H1. Similarly, the second armature core H2 has a core coupling portion L12 extending from the outer peripheral edge of the yoke portion 34c toward the first armature core H1. The core coupling portion L12 has an annular shape formed over the entire circumference of the second armature core H2.

The end surface of the core coupling portion L11 of the first armature core H1 in the axis direction (the upper surface of the core coupling portion L11 in FIG. 27A) and the end surface of the core coupling portion L12 of the second armature core H2 in the axis direction (the lower surface of the core coupling portion L12 in FIG. 27A) may be in contact with each other. This structure can reduce the magnetoresistance of the magnetic path formed through the core coupling portions L11 and L12.

In the armature portion Am27, the core coupling structure is not limited to the examples shown in FIGS. 27A and 27B. For example, an annular core coupling portion may be formed only on one of the armature cores H1 and H2. In this case, the end surface of the core coupling portion in the axis direction is preferably in contact with the outer peripheral portion of the yoke portion of the other armature core. As yet another example, the core coupling portions L11 and L12 may be formed at the inner periphery of the yoke portions 33c and 34c rather than at the outer periphery of the yoke portion 33c and 34c. Further, the core coupling portions L11 and L12 may not be formed over the entire circumference. For example, the core coupling portions L11 and L12 may be partially cut out to be used as a lead-out port of the electric wire connecting the external drive circuit that supplies electric power to the rotary electric machine M27 with the coil CL.

In the rotary electric machine M27 where the core coupling structure is core coupling portions L11 and L12 that extend in the machine moving direction (the rotation direction in the rotary electric machine M27), similarly to the rotary electric machine described above (e.g., rotary electric machine M1), two magnetic circuits in which two types of magnetic fluxes are respectively formed are formed. That is, the first magnetic circuit includes two magnetic pole groups G1 that are located away from each other in the rotation direction, two magnetic pole groups G2 that are located away from each other in the rotation direction, magnetic field cores 22N and 22S facing the magnetic pole groups G1 and the magnetic pole group G2, and the magnets Mg between the magnetic field cores 22N and 22S. The second magnetic circuit includes the core coupling portions L11 and L12, magnetic pole groups G1 and G2 having angle positions corresponding to each other in the rotation direction and magnetically coupled via the core coupling portions L11 and L12, magnetic field cores 22N and 22S opposite to the magnetic pole group G1 and the magnetic pole group G2, and magnets Mg between the magnetic field cores 22N and 22S.

The armature cores H1 and H2 are formed of a soft magnetic powder material as described above. Such armature cores H1 and H2 have a high electrical resistivity, and thus, it is possible to prevent the induced current regardless of the direction of the magnetic flux passing through the armature cores H1 and H2. As such, unlike the electric machine described above, a slit to prevent the generation of an induced current may not be formed in the armature cores H1 and H2.

[Application and Combination of Modifications]

The core coupling portions L11 and L12, described in FIGS. 27A and 27B, may be applied not only to the axial gap type rotary electric machine but also to the linear electric machine shown FIG. 24A, the rotary electric machine shown in FIG. 26A, and the radial gap type rotary electric machine. When the core coupling portions L11 and L12 are applied to the linear electric machine M24, the length of the core coupling portions L11 and L12 in the front-rear direction may correspond to the total length of the magnetic pole groups G1 and G2 of the armature cores H1 and H2.

In any of the electric machines described above, a plurality of coils CL may be provided in each magnetic pole group G1 as in the example of FIG. 27A. That is, in any of the electric machines, the armature portion may include, for each magnetic pole group G1, a first coil entirely surrounding a plurality of magnetic poles 33a constituting each magnetic pole group G1 and a second coil disposed inside the first coil and surrounding only some of the magnetic poles 33a. In this case, the center of the first coil in the machine moving direction may coincide with the center of the second coil in the machine moving direction.

In the armature portion described in FIGS. 1A to 3B, the number of phases of the coil CL is an odd number (e.g., three phases), and the winding directions of the coils of the phases are the same. Such arrangement of the coils may be applied to any of the radial gap type rotary electric machine, the axial gap type rotary electric machine, the linear electric machine, and the rotary electric machine described with reference to FIG. 26A.

The arrangement of the coils described with reference to FIGS. 14A and 14B may be applied to any of the radial gap type rotary electric machine, the axial gap type rotary electric machine, the linear electric machine, and the rotary electric machine described with reference to FIG. 26A. That is, in the electric machine other than the electric machines in FIGS. 14A and 14B as well, the number of phases of the coil CL is an odd number (e.g., three phases), and two coils having opposite winding directions may be provided for each phase (e.g., U+ phase coil CLu+, U− phase coil CLu−).

The arrangement of the coils described with reference to FIGS. 15A and 15B may also be applied to any of the radial gap type rotary electric machine, the axial gap type rotary electric machine, the linear electric machine, and the rotary electric machine described with reference to FIG. 26A. That is, in the electric machine other than the electric machines in FIGS. 15A and 15B as well, the number of phases of the coil CL is an even number (e.g., two phases), and two coils having opposite winding directions may be provided for each phase (e.g., A+ phase coil CLa+, A− phase coil CLa−).

In any of the electric machines described above, as shown in FIGS. 13A and 22, the magnetic poles 33a and 34a may have the projecting portion 33n that intersects the body of magnetic pole in the machine moving direction and extends along the surface of the magnetic field portion Fs. When the armature core having the magnetic pole on which the projecting portion 33n is formed is laminated steel sheets, the edge of the steel sheet disposed at the end of the lamination sheets may be bent to form the projecting portion. If the armature core is a soft magnetic powder material, the projecting portion 33n may be integrally formed with the body of magnetic pole. As yet another example, the armature core may have a portion that is laminated steel sheets and a portion that is disposed at the end in the lamination direction and is formed of a soft magnetic powder material. In this case, the projecting portion 33n may be integrally formed with the portion formed of the soft magnetic powder material.

In the electric machine in which the core coupling portion L is laminated steel sheets fitted into the fitting holes 33h and 34h having a closed inner surface, the steel sheets of the core coupling portion L may be laminated in the machine moving direction. This structure can prevent an induced current from occurring in the steel sheets due to the magnetic flux Φ7 passing through the core coupling portion L.

The armature portion having the armature core made of laminated steel sheets may be solidified by a material having non-magnetic and insulating property. For example, the armature portion may be molded with resin. In this case, the distal end surfaces of the magnetic poles 33a and 34a may be preferably exposed from the resin.

In the examples described above, the coil CL is provided only in the first armature core H1. However, the coil CL may be provided in both the first armature core H1 and the second armature core H2.

Referring to FIGS. 13A and 13B, the armature portion has been described in which the armature core is composed of a plurality of partial cores 33A and 33D that are combined with each other. This structure may be applied not only to a radial gap type rotary electric machine but to other electric machines, such as a linear electric machine. Further, as shown in FIGS. 13A and 13B, the armature core may have the partial cores 33A and 33D that are combined in the radial direction or may have the partial cores that are combined in the machine moving direction.

The linear electric machine may have two magnetic field portions that are located away from each other in the left-right direction (the direction facing the armature cores H1 and H2). In this case, the armature portion may then have three armature cores. One of the armature cores may be disposed between the two magnetic field portions, and the other two armature cores may be respectively disposed on the left and right of the two magnetic field portions. The armature core disposed between the two magnetic field portions may have such magnetic pole groups on the right and left sides. In this case, the armature core disposed between the two magnetic field portions may have a yoke portion that allows the magnetic flux to flow in the front-rear direction (machine moving direction), or may allow the magnetic flux to flow only in the left-right direction (the direction in which the armature core faces).

Conclusion of Embodiment

As shown in FIGS. 1A and 18A, rotary electric machines M1 and M21 include armature portions Am1 and Am21 and a magnetic field portion Fs relatively movable with respect to the armature portions Am1 and Am21. The magnetic field portion Fs includes a plurality of magnetic field cores 22N and 22S arranged in a rotation direction (machine moving direction) and a plurality of magnets, the rotation direction being a direction of a relative movement between the armature portions Am1 and Am21 and the magnetic field portion Fs, each magnet being disposed between two adjacent magnetic field cores 22N and 22S. The armature portion includes a first armature core H1 and a second armature core H2 that are located away from each other in a direction (axis direction in armature portion Am1 and radial direction in armature portion Am21) intersecting with the machine moving direction, a core coupling structure that magnetically couples the first armature core H1 to the second armature core H2, and a plurality of coils CL. The first armature core H1 includes a magnetic pole group G1u and a magnetic pole group G1v that are arranged in the rotation direction and magnetically coupled together. The second armature core H2 includes a magnetic pole group G2u and a magnetic pole group G2v that are arranged in the rotation direction and magnetically coupled together. A position of the magnetic pole group G1u in the rotation direction corresponds to a position of the magnetic pole group G2u in the rotation direction. A position of the magnetic pole group G1v in the rotation direction corresponds to a position of the magnetic pole group G2v in the rotation direction. The plurality of coils CL include a U phase coil CLu provided in the magnetic pole group G1u. As shown in FIGS. 3B and 18C, a first magnetic flux $\Phi 1$ that passes through the U phase coil CLu and a second magnetic flux $\Phi 7$ that passes through the U phase coil CLu are formed by one or some of the magnets Mg. A first magnetic circuit through which the first magnetic flux $\Phi 1$ flows includes the magnetic pole group G1u, the magnetic pole group G1v, the magnetic pole group G2u, the magnetic pole group G2v, the magnetic field cores 22N and 22S, and the magnets Mg. The second magnetic circuit through which the second magnetic flux $\Phi 7$ flows includes the magnetic pole group G1u, the core coupling structure, the magnetic pole group G2u, the magnetic field cores 22N and 22S, and the magnets Mg. The rotary electric machines M1 and M21 can prevent the magnetic circuit from being magnetically saturated. As a result, the current supplied to the coils CL can be increased, and a large amount of power can be obtained from the rotary electric machines M1 and M21. Further, the armature cores H1 and H2 do not need to be magnetically divided in the rotation direction, and the intensity of the armature cores H1 and H2 can be thereby increased. Other electric machines proposed in the present disclosure have the first magnetic circuit and the second magnetic circuit as described above, and provide the same advantageous effects.

(1) In the rotary electric machine M1 shown in FIG. 1A, the magnetic field portion Fs includes an inner peripheral surface along the rotation direction. The first armature core H1 and the second armature core H2 are located radially inside with respect to the inner peripheral surface of the magnetic field portion Fs. The core coupling structure includes a plurality of core coupling portions L arranged in the rotation direction. The plurality of core coupling portions L includes a core coupling portion L positioned radially inward with respect to the magnetic pole group G1u, the magnetic pole group G2u, and the U phase coil provided in the magnetic pole group G1u. The rotary electric machine or the linear electric machine shown in FIGS. 10 to 17 also have armature cores H1 and H2 positioned in the same direction with respect to the magnetic field portion Fs.

(2) In the rotary electric machine M21 shown in FIGS. 18A, the magnetic field portion Fs includes an inner peripheral surface and an outer peripheral surface as surfaces along the rotation direction. The first armature core H1 is located radially outward with respect to the outer peripheral surface of the magnetic field portion Fs, and the second armature core H2 is located radially inward with respect to the inner peripheral surface of the magnetic field portion Fs. Similarly to the rotary electric machine M21, the rotary electric machine or the linear electric machine shown in FIGS. 21A to 27B also has the armature cores H1 and H2 that are located in different directions with respect to the magnetic field portion Fs. This structure increases a flexibility in the arrangement of the armature cores H1 and H2.

(3) In the rotary electric machine M1 shown in FIG. 1A, for each of the plurality of fitting holes 33h and 34h into which the plurality of core coupling portions L are respectively fitted, slits S3 and S4 extending from the fitting holes 33h and 34h in a direction intersecting with the lamination direction of the steel sheets Sp1 are formed. In the armature portion Am2 shown in FIG. 7, the fitting holes 33g and 34g of the armature cores H1 and H2 are open in a direction intersecting with the lamination direction of the steel sheets Sp1 (radially inside). This can prevent generation of an induced current around each core coupling portion L.

(4) In the rotary electric machine M1 shown in FIG. 1A, the slits S3 and S4 extending from the respective fitting holes 33h and 34h intersect a closed curve passing between the plurality of fitting holes 33h and 34h arranged in the rotation direction (machine moving direction) and the plurality of magnetic pole groups G1 and G2 arranged in the rotation direction (machine moving direction) and surrounding the axis Ax. Further, in the armature portion Am2 shown in FIG. 7, slits S5 and S6 intersect a closed curve passing between the plurality of fitting holes 33g and 34g and the magnetic pole groups G1 and G2 arranged in the rotation direction (machine moving direction) and surrounding the axis Ax. The slits S3, S4, S5, and S6 can prevent generation of an induced current (see FIG. 8) in the rotation direction in the armature core H1 and H2.

(5) In the example of FIG. 18A, the armature cores H1 and H2 have, for the respective fitting holes 33h and 34h, the slits S3 and S4 extending from the fitting holes 33h and 34h in a direction intersecting with the lamination direction of the steel sheets. In the example of FIG. 19, the fitting holes 33g and 34g formed in the armature cores H1 and H2 are open in a direction intersecting with the lamination direction of the steel sheets. This can prevent generation of an induced current around each core coupling portion L.

(6) In the example of FIG. 18A, the slits S3 and S4 extending from the respective fitting holes 33h and 34h intersect a closed curve passing between the plurality of fitting holes 33h and 34h arranged in the rotation direction (machine moving direction) and the plurality of magnetic pole groups G1 and G2 arranged in the rotation direction (machine moving direction) and surrounding the axis Ax. In the example of FIG. 19, the slits S5 and S6 intersect a closed curve passing between the plurality of fitting holes 33g and 34g and the magnetic pole groups G1 and G2 arranged in the rotation direction (machine moving direction) and surrounding the axis Ax. The slits S3, S4, S5, and S6 can prevent generation of an induced current in the rotation direction in the armature core H1 and H2.

(7) As shown in FIGS. 24A and 27A, the core coupling portion L is integrally formed with one or both of the first armature core H1 and the second armature core H2. This can simplify the assembly of the armature portion.

(8) As shown in FIG. 18A, the first armature core H1 includes a yoke portion 33c, and the magnetic pole groups G1u and G1v are formed in the yoke portion 33c on the magnetic field portion Fs side. The second armature core H2 includes a yoke portion 34c, and the magnetic pole groups G2v and G2v are formed in the yoke portion 34c on the magnetic field portion Fs side. The plurality of core coupling portions L include a core coupling portion L that magnetically couples the yoke portions 33c and 34c and is disposed at a position corresponding to the position of the magnetic pole group G1u and the position of the magnetic pole group G2u in the rotation direction.

(9) The magnetic pole groups G1 and G2 include a plurality of magnetic poles 33a and 34a arranged in the machine moving direction. This can increase power that is output from the electric machine.

(10) The magnetic poles 33a and 34a have a shape projecting toward the magnetic field portion Fs.

(11) As shown in FIGS. 13A and 22, the magnetic pole 33a includes a projecting portion 33n extending from the body of the magnetic pole 33a in a direction intersecting with the machine moving direction. This can reduce the magnetoresistance caused by the space between the magnetic field portion Fs and the magnetic pole 33a.

(12) As shown in FIG. 1A, the number of phases of the rotary electric machine M1 is an odd number of three or more, and the armature portion may have two or more coils CL having the same winding direction for each phase. In this structure, the magnetic pole group pair Pu and the magnetic pole group pair Pv are located away substantially by "360×(n+m/s)" degrees in electrical angle. Here, s, m, and n each represent the following numbers:

s: number of phases m: an integer equal to or greater than 1 and equal to or less than s−1, where the integer is other than a divisor of s (except 1) and other than multiples of the divisor (except 1), n: an integer equal to or greater than 1.

(13) In the rotary electric machine M1 of (12), when (a number of phases of magnetic field portion)/2 is defined as "p", and a number of coils of each phase is defined as "c", "(360/p)×(n+m/s)" is substantially equal to "360/s/c".

(14) As shown in FIG. 14A, the number of phases of the rotary electric machine is an odd number of three or more, and the armature portion Am7 may include, for each phase, a coil pair (e.g., CLu+, CLu−) including two coils having different winding directions. For example, the winding direction of the coil of the first magnetic pole group pair Pu+ and the winding direction of the coil of the second magnetic pole group pair Pv+ are the same, and the coil of the first magnetic pole group pair Pu+ and the coil of the third magnetic pole group pair Pu− constitute a coil pair. In this structure, (i) the first magnetic pole group pair Pu+ and the second magnetic pole group pair Pv+ are located away substantially by "360×(n+m/s)" degrees in electrical angle, and (ii) the first magnetic pole group pair Pu+ and the third magnetic pole group pair Pu− are located away substantially by "360×(q+1/2)" degrees in electrical angle. Here, s, m, n, and q each represent the following numbers:

s: number of phases m: an integer equal to or greater than 1 and equal to or less than s−1, where the integer is other than a divisor of s (except 1) and other than multiples of the divisor (except 1)

n: an integer equal to or greater than 1 q: an integer equal to or greater than 1.

(15) In the rotary electric machine of (14), when (a number of phases of magnetic field portion)/2 is defined as "p", and a number of coil pairs of each phase is defined as "c", "(360/p)×(n+m/s)" is substantially equal to "360/s/c".

(16) As shown in FIG. 15A, the number of phases of the rotary electric machine is an even number of two or more, and the armature portion Am8 may include, for each phase, a coil pair (e.g., CLa+, CLa−) including two coils having different winding directions. As shown in FIG. 15B, the winding direction of the coil of the first magnetic pole group pair Pa+ and the winding direction of the coil of the second magnetic pole group pair Pv+ are the same, and the coil of the first magnetic pole group pair Pa+ and the coil of the third magnetic pole group pair Pa− constitute a coil pair. In this structure, (i) the first magnetic pole group pair and the second magnetic pole group pair are located away substantially by "360×(n+m/s/2)" degrees in electrical angle, and (ii) the first magnetic pole group pair and the third magnetic pole group pair are relatively located away from each other substantially by "360×(q+1/2)" degrees in electrical angle. Here, s, m, n, and q each represent the following numbers:

s: number of phases n: an integer equal to or greater than 1 m: an integer equal to or greater than 1 and equal to or less than s−1, where the integer is other than a divisor of s (except 1) and other than multiples of the divisor (except 1)

q: an integer equal to or greater than 1.

(17) In the rotary electric machine of (16), when (a number of poles of magnetic field portion)/2 is defined as "p", a number of coil pairs for each phase is defined as "c", "(360/p)×(n+m/s/2)" is substantially equal to "180/s/c".

(18) As shown in FIGS. 16 and 20, each of the magnetic field cores 22N and 22S may include two partial magnetic field cores 22f that are disposed between two adjacent magnets Mg and located away from each other in the machine moving direction. This structure serves to reduce accumulated dimensional errors in the magnetic field cores 22N and 22S and the magnets Mg, thereby improving the positional accuracy of the magnetic field cores 22N and 22S and the magnets Mg.

REFERENCE SIGNS LIST 22N, 22S: magnetic field core, 22f: partial magnetic field core, 23: fixing portion, 33A: magnetic pole group partial core, 33A1: first partial core, 33A2: second partial core, 33D: yoke partial core, 33E: end steel sheet, 33F: body steel sheet, 33G, 33H: yoke partial core, 33J: magnetic pole core, 33a: magnetic pole, 33b: common base, 33c: yoke portion, 33d: recessed portion, 33e: slit surface, 33f, 33g, 33h: fitting hole, 33i: coupling surface, 33j: fitting hole, 33m: space, 33n: projecting portion, 33u: side surface, 34E: end steel sheet, 34F: body steel sheet, 34G, 34H: yoke partial core, 34J: magnetic pole core, 34a: magnetic pole, 34b: recessed portion, 34c: yoke portion, 34g, 33h: fitting hole, 34j: fitting hole, 34n: projecting portion, 55a: engaging portion, 55b: engaged portion, Am1 to Am8, Am10, Am21 to Am27: armature portion, CL: coil, Fs: magnetic field portion, G1,G2: magnetic pole group, H1: first armature core, H2: second armature core, L, L11, L12: core coupling portion, L1, L2: fitting portion, L3: extending portion, L5: first partial core, L5a, L5b: partial core, L6: second partial core, L6a, L6b: partial core, L7: extending portion, L8: fitting portion, Le: end portion of core coupling portion, L1: coupling mechanism, M1 to M5, M8: rotary electric machine, M10: linear electric machine, M21: rotary electric machine, M22 to M24: linear electric machine, M25 to M27: rotary electric machine, Mg: magnet, P: magnetic pole group pair, Sp1, Sp2: electrical steel sheet, Φ1, Φ2, Φ7: magnetic flux.

The invention claimed is:

1. An electric machine comprising:
an armature portion; and
a magnetic field portion that is relatively movable with respect to the armature portion, wherein
the magnetic field portion includes a plurality of magnetic field cores, arranged in a machine moving direction, and a plurality of magnets, the machine moving direction being a direction of a relative movement between the armature portion and the magnetic field portion, each magnet being disposed between two adjacent magnetic field cores,
the armature portion includes a first armature core and a second armature core that are located away from each other in a direction intersecting with the machine moving direction, a core coupling structure that magnetically couples the first armature core to the second armature core, and a plurality of coils,
the first armature core includes a first magnetic pole group and a second magnetic pole group that are arranged in the machine moving direction and magnetically coupled together,
the second armature core includes a third magnetic pole group and a fourth magnetic pole group that are arranged in the machine moving direction and magnetically coupled together,
a position of the first magnetic pole group in the machine moving direction corresponds to a position of the third magnetic pole group in the machine moving direction,
a position of the second magnetic pole group in the machine moving direction corresponds to a position of the fourth magnetic pole group in the machine moving direction,
the plurality of coils include a first coil that is provided in one of the first magnetic pole group or the third magnetic pole group,
a first magnetic flux that passes through the first coil and a second magnetic flux that passes through the first coil are formed by one or some of the magnets,
a first magnetic circuit through which the first magnetic flux passes includes the first magnetic pole group, the second magnetic pole group, the third magnetic pole group, the fourth magnetic pole group, the magnetic field core, and the magnets,
a second magnetic circuit through which the second magnetic flux passes includes the first magnetic pole group, the core coupling structure, the third magnetic pole group, the magnetic field core, and the magnets,
the magnetic field portion includes a first surface along the machine moving direction,
the first armature core and the second armature core are positioned in a first direction intersecting with the machine moving direction with respect to the first surface of the magnetic field portion,
the core coupling structure includes a plurality of core coupling portions that are arranged in the machine moving direction, and
the plurality of core coupling portions include a core coupling portion that is positioned in the first direction with respect to the first magnetic pole group, the third magnetic pole group, and the first coil.

2. The electric machine according to claim 1, wherein
at least one of the first armature core or the second armature core is lamination steel including a plurality of laminated steel sheets and includes a plurality of fitting holes into which the plurality of core coupling portions are fitted in a lamination direction of the steel sheets, and
in the at least one of the armature cores, each of the plurality of fitting hole has a slit extending from the fitting hole in a direction intersecting with the lamination direction of the steel sheets or an opening that is open in a direction intersecting with the lamination direction of the steel sheets.

3. The electric machine according to claim 1, wherein
the magnetic field portion is relatively rotatable to the armature portion about an axis,
at least one of the first armature core or the second armature core is lamination steel including a plurality of laminated steel sheets and includes a plurality of fitting holes into which the plurality of core coupling portions are fitted in a lamination direction of the steel sheets, and
the at least one of the armature cores includes a slit intersecting with a closed curve that passes between the plurality of fitting holes and the plurality of magnetic pole groups formed on the at least one of the armature cores, and surrounds the axis.

4. The electric machine according to claim 1, wherein the core coupling structure is integrally formed with one of the first armature core or the second armature core.

5. The electric machine according to claim 1, wherein each of the first magnetic pole group, the second magnetic pole group, the third magnetic pole group, and the fourth magnetic pole group includes a plurality of magnetic poles arranged in the machine moving direction.

6. The electric machine according to claim 5, wherein each of the plurality of magnetic poles has a shape projecting toward the magnetic field portion.

7. The electric machine according to claim 5, wherein each of the plurality of magnetic poles includes:
  a body having a shape projecting toward the magnetic field portion and
  a projecting portion extending from the body in a direction intersecting with the machine moving direction.

8. The electric machine according to claim 1, wherein a number of phases of the electric machine is an odd number of three or more,
the armature portion includes, for each phase, one coil or two or more coils having a same winding direction,
the first magnetic pole group and the third magnetic pole group constitute a first magnetic pole group pair,
the second magnetic pole group and the fourth magnetic pole group constitute a second magnetic pole group pair,
the coil is provided to each of the first magnetic pole group pair and the second magnetic pole group pair,
when an angle between two magnetic field cores that are adjacent and have a same polarity is defined as 360 degrees in an electrical angle, the first magnetic pole group pair and the second magnetic pole group pair are located away from each other substantially by 360×(n+m/s) degrees in the electrical angle, where
"s" is a number of phases,
"m" is an integer equal to or greater than 1 and equal to or less than s−1, where the integer is other than a divisor of "s" (except 1) and other than multiples of the divisor (except 1), and
"n" is an integer equal to or greater than 1.

9. The electric machine according to claim 8, wherein the magnetic field portion and the armature portion are relatively rotatable, and
when "(a number of phases of magnetic field portion)/2" is defined as "p", and a number of coils of each phase is defined as "c", "(360/p)×(n+m/s)" is substantially equal to "360/s/c".

10. The electric machine according to claim 1, wherein a number of phases of the electric machine is an odd number of three or more,
the armature portion includes a coil pair for each phase, the coil pair including two coils having different winding directions,
the first armature core includes a first magnetic pole group, the second magnetic pole group, and a fifth magnetic pole group,
the second armature core includes the third magnetic pole group, the fourth magnetic pole group, and a sixth magnetic pole,
the first magnetic pole group and the third magnetic pole group constitute a first magnetic pole group pair,
the second magnetic pole group and the fourth magnetic pole group constitute a second magnetic pole group pair,
the fifth magnetic pole group and the sixth magnetic pole group constitute a third magnetic pole group pair,
a winding direction of a coil of the first magnetic pole group pair is a same direction as a winding direction of a coil of the second magnetic pole group pair, and the coil of the first magnetic pole group pair and a coil of the third magnetic pole group pair constitute the coil pair,
when an angle between two magnetic field cores that are adjacent and have a same polarity is defined as 360 degrees in an electrical angle, (i) the first magnetic pole group pair and the second magnetic pole group pair are located away from each other substantially by 360×(n+m/s) degrees in the electrical angle, and (ii) the first magnetic pole group pair and the third magnetic pole group pair are located away from each other substantially by 360×(q+1/2) degrees in the electrical angle, where
"s" is a number of phases,
"m" is an integer equal to or greater than 1 and equal to or less than "s−1", where the integer is not a divisor of "s" (except 1) or multiples of the divisor (except 1),
"n" is an integer equal to or greater than 1, and
"q" is an integer equal to or greater than 1.

11. The electric machine according to claim 10, wherein the magnetic field portion and the armature portion are relatively rotatable, and
when "(a number of phases of magnetic field portion)/2" is defined as "p", and a number of coil pairs of each phase is defined as "c", "(360/p)×(n+m/s)" is substantially equal to "360/s/c".

12. The electric machine according to claim 1, wherein a number of phases of the electric machine is an even number of two or more,
the armature portion includes a coil pair for each phase, the coil pair being constituted by two coils having different winding directions,
the first armature core includes the first magnetic pole group, a second magnetic pole group, and a fifth magnetic pole group,
the second armature core includes the third magnetic pole group, a fourth magnetic pole group, and a sixth magnetic pole group,
the first magnetic pole group and the third magnetic pole group constitute a first magnetic pole group pair,
the second magnetic pole group and the fourth magnetic pole group constitute a second magnetic pole group pair,
the fifth magnetic pole group and the sixth magnetic pole group constitute a third magnetic pole group pair,
a winding direction of a coil of the first magnetic pole group pair is a same direction as a winding direction of a coil of the second magnetic pole group pair, and the coil of the first magnetic pole group pair and a coil of the third magnetic pole group pair constitute the coil pair,
when an angle between two magnetic field cores that are adjacent and have a same polarity is defined as 360 degrees in an electrical angle, (i) the first magnetic pole group pair and the second magnetic pole group pair are located away from each other substantially by 360×(n+m/2) degrees in the electrical angle, and (ii) the first magnetic pole group pair and the third magnetic pole group pair are relatively located away from each other substantially by 360×(q+1/2) degrees in the electrical angle, where "s" is a number of phases, "m" is an integer equal to or greater than 1 and equal to or less than "s−1", where the integer is other than a divisor of "s" (except 1) and other than multiples of the divisor (except 1), "n" is an integer equal to or greater than 1, and "q" is an integer equal to or greater than 1.

13. The electric machine according to claim 12, wherein the magnetic field portion and the armature portion are relatively rotatable, when "(a number of poles of magnetic field portion)/2" is defined as "p", a number of coil pairs for each phase is defined as "c", "(360/p)×(n+m/s/2)" is substantially equal to "180/s/c".

14. The electric machine according to claim 1, wherein each of the plurality of magnets is magnetized in the machine moving direction, and each of the plurality of magnetic field cores includes two partial magnetic field cores that are disposed between two adjacent magnets and are located away from each other in the machine moving direction.

15. The electric machine according to claim 1, wherein a number of phases of the electric machine is an odd number of three or more, the armature portion includes a coil pair for each phase, the coil pair including two coils having different winding directions, the first armature core includes a first magnetic pole group, the second magnetic pole group, and a fifth magnetic pole group, the second armature core includes the third magnetic pole group, the fourth magnetic pole group, and a sixth magnetic pole, the first magnetic pole group and the third magnetic pole group constitute a first magnetic pole group pair, the second magnetic pole group and the fourth magnetic pole group constitute a second magnetic pole group pair, the fifth magnetic pole group and the sixth magnetic pole group constitute a third magnetic pole group pair, a winding direction of a coil of the first magnetic pole group pair is a same direction as a winding direction of a coil of the second magnetic pole group pair, and the coil of the first magnetic pole group pair and a coil of the third magnetic pole group pair constitute the coil pair, when an angle between two magnetic field cores that are adjacent and have a same polarity is defined as 360 degrees in an electrical angle, (i) the first magnetic pole group pair and the second magnetic pole group pair are located away from each other substantially by 360×(n+ m/s) degrees in the electrical angle, and (ii) the first magnetic pole group pair and the third magnetic pole group pair are located away from each other substantially by 360×(q+1/2) degrees in the electrical angle, where "s" is a number of phases, "m" is an integer equal to or greater than 1 and equal to or less than "s−1", where the integer is not a divisor of "s" (except 1) or multiples of the divisor (except 1), "n" is an integer equal to or greater than 1, and "q" is an integer equal to or greater than 1.

16. The electric machine according to claim 1, wherein a number of phases of the electric machine is an even number of two or more, the armature portion includes a coil pair for each phase, the coil pair being constituted by two coils having different winding directions, the first armature core includes the first magnetic pole group, a second magnetic pole group, and a fifth magnetic pole group, the second armature core includes the third magnetic pole group, a fourth magnetic pole group, and a sixth magnetic pole group, the first magnetic pole group and the third magnetic pole group constitute a first magnetic pole group pair, the second magnetic pole group and the fourth magnetic pole group constitute a second magnetic pole group pair, the fifth magnetic pole group and the sixth magnetic pole group constitute a third magnetic pole group pair, a winding direction of a coil of the first magnetic pole group pair is a same direction as a winding direction of a coil of the second magnetic pole group pair, and the coil of the first magnetic pole group pair and a coil of the third magnetic pole group pair constitute the coil pair, when an angle between two magnetic field cores that are adjacent and have a same polarity is defined as 360 degrees in an electrical angle, (i) the first magnetic pole group pair and the second magnetic pole group pair are located away from each other substantially by 360×(n+ m/2) degrees in the electrical angle, and (ii) the first magnetic pole group pair and the third magnetic pole group pair are relatively located away from each other substantially by 360×(q+1/2) degrees in the electrical angle, where "s" is a number of phases, "m" is an integer equal to or greater than 1 and equal to or less than "s−1", where the integer is other than a divisor of "s" (except 1) and other than multiples of the divisor (except 1), "n" is an integer equal to or greater than 1, and "q" is an integer equal to or greater than 1.

17. An electric machine comprising:

an armature portion; and a magnetic field portion that is relatively movable with respect to the armature portion, wherein the magnetic field portion includes a plurality of magnetic field cores, arranged in a machine moving direction, and a plurality of magnets, the machine moving direction being a direction of a relative movement between the armature portion and the magnetic field portion, each magnet being disposed between two adjacent magnetic field cores, the armature portion includes a first armature core and a second armature core that are located away from each other in a direction intersecting with the machine moving direction, a core coupling structure that magnetically couples the first armature core to the second armature core, and a plurality of coils, the first armature core includes a first magnetic pole group and a second magnetic pole group that are arranged in the machine moving direction and magnetically coupled together, the second armature core includes a third magnetic pole group and a fourth magnetic pole group that are arranged in the machine moving direction and magnetically coupled together, a position of the first magnetic pole group in the machine moving direction corresponds to a position of the third magnetic pole group in the machine moving direction, a position of the second magnetic pole group in the machine moving direction corresponds to a position of the fourth magnetic pole group in the machine moving direction, the plurality of coils include a first coil that is provided in one of the first magnetic pole group or the third magnetic pole group, a first magnetic flux that passes through the first coil and a second magnetic flux that passes through the first coil are formed by one or some of the magnets, a first magnetic circuit through which the first magnetic flux passes includes the first magnetic pole group, the second magnetic pole group, the third magnetic pole group, the fourth magnetic pole group, the magnetic field core, and the magnets, a second magnetic circuit through which the second magnetic flux passes includes the first magnetic pole group, the core coupling structure, the third magnetic pole group, the magnetic field core, and the magnets, the magnetic field portion includes a first surface and a second surface along the machine moving direction, the first armature core is positioned in a first direction intersecting with the machine moving direction with respect to the first surface of the magnetic field portion, the second armature core is positioned in a second direction intersecting with the machine moving direction with respect to the second surface of the magnetic field portion.

18. The electric machine according to claim 17, wherein the core coupling structure includes a plurality of core coupling portions that are arranged in the machine moving direction, at least one of the first armature core or the second armature core is lamination steel including a plurality of laminated steel sheets and includes a plurality of fitting holes into which the plurality of core coupling portions are fitted in a lamination direction of the steel sheets, and in the at least one of the armature cores, each of the plurality of fitting hole has a slit extending from the fitting hole in a direction intersecting with the lamination direction of the steel sheets or an opening that is open in a direction intersecting with the lamination direction of the steel sheets.

19. The electric machine according to claim 17, wherein the magnetic field portion is relatively rotatable to the armature portion about an axis, the core coupling structure includes a plurality of core coupling portions that are arranged in a rotation direction, at least one of the first armature core or the second armature core is lamination steel including a plurality of laminated steel sheets and includes a plurality of fitting holes into which the plurality of core coupling portions are fitted in a lamination direction of the steel sheets, and the at least one of the armature cores includes a slit intersecting with a closed curve that passes between the plurality of fitting holes and the plurality of magnetic pole groups formed on the at least one of the armature cores, and surrounds the axis.

20. The electric machine according to claim 17, wherein the core coupling structure includes a plurality of core coupling portions that are arranged in the machine moving direction, the first armature core includes a first yoke portion, and the first magnetic pole group and the second magnetic pole group are formed in the first yoke portion on a magnetic field portion side, the second armature core includes a second yoke portion, and the third magnetic pole group and the fourth magnetic pole group are formed in the second yoke portion on the magnetic field portion side, and the plurality of core coupling portions include a core coupling portion that magnetically couples the first yoke portion to the second yoke portion and is disposed at a position corresponding to a position of the first magnetic pole group and a position of the third magnetic pole group in the machine moving direction.

21. The electric machine according to claim 17, wherein the core coupling structure is integrally formed with one of the first armature core or the second armature core.

22. The electric machine according to claim 17, wherein each of the first magnetic pole group, the second magnetic pole group, the third magnetic pole group, and the fourth magnetic pole group includes a plurality of magnetic poles arranged in the machine moving direction.

23. The electric machine according to claim 17, wherein a number of phases of the electric machine is an odd number of three or more, the armature portion includes, for each phase, one coil or two or more coils having a same winding direction, the first magnetic pole group and the third magnetic pole group constitute a first magnetic pole group pair, the second magnetic pole group and the fourth magnetic pole group constitute a second magnetic pole group pair, the coil is provided to each of the first magnetic pole group pair and the second magnetic pole group pair, when an angle between two magnetic field cores that are adjacent and have a same polarity is defined as 360 degrees in an electrical angle, the first magnetic pole group pair and the second magnetic pole group pair are located away from each other substantially by 360×(n+m/s) degrees in the electrical angle, where "s" is a number of phases, "m" is an integer equal to or greater than 1 and equal to or less than s−1, where the integer is other than a divisor of "s" (except 1) and other than multiples of the divisor (except 1), and "n" is an integer equal to or greater than 1.

24. The electric machine according to claim 17, wherein each of the plurality of magnets is magnetized in the machine moving direction, and each of the plurality of magnetic field cores includes two partial magnetic field cores that are disposed between two adjacent magnets and are located away from each other in the machine moving direction.

* * * * *